United States Patent
Takanashi

(10) Patent No.: US 11,659,276 B2
(45) Date of Patent: May 23, 2023

(54) IMAGE PICKUP APPARATUS, IMAGE PICKUP ACCESSORY, AND INTERMEDIATE ACCESSORY

(71) Applicant: CANON KABUSHIKI KAISHA, Tokyo (JP)

(72) Inventor: Hideya Takanashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/101,329

(22) Filed: Nov. 23, 2020

(65) Prior Publication Data
US 2021/0168278 A1 Jun. 3, 2021

(30) Foreign Application Priority Data
Nov. 29, 2019 (JP) .............................. JP2019-216648

(51) Int. Cl.
*H04N 23/67* (2023.01)
*G03B 17/14* (2021.01)
(Continued)

(52) U.S. Cl.
CPC .............. *H04N 23/67* (2023.01); *G03B 17/14* (2013.01); *H04N 23/75* (2023.01); *G03B 9/02* (2013.01)

(58) Field of Classification Search
CPC .... H04N 5/23212; H04N 5/238; G03B 17/14; G03B 9/02
See application file for complete search history.

(56) References Cited

U.S. PATENT DOCUMENTS

| 2013/0107063 A1 | 5/2013 | Yano |
| 2017/0180638 A1* | 6/2017 | Saito ...................... G03B 17/14 |
| 2018/0224721 A1* | 8/2018 | Pan ....................... G03B 17/565 |

FOREIGN PATENT DOCUMENTS

| CN | 102460271 A | 5/2012 |
| CN | 103209296 A | 7/2013 |

(Continued)

OTHER PUBLICATIONS

Feb. 3, 2023 Chinese Office Action, enclosed with an English Translation, that issued in Chinese Patent Application No. 202011356374.9.

*Primary Examiner* — Nicholas G Giles
(74) *Attorney, Agent, or Firm* — Cowan, Liebowitz & Latman, P.C.

(57) ABSTRACT

An image pickup apparatus to which an image pickup accessory having a focus lens and a diaphragm is detachably attachable includes a communication unit configured to communicate with the image pickup accessory, an image pickup unit, an exposure control unit, and a focus control unit. The communication unit transmits a request for diaphragm control to the image pickup accessory, and receives first information on a relationship between a diaphragm position and a variation in a light amount during the diaphragm control, second information corresponding to the diaphragm position, and third information corresponding to the diaphragm position and light transmittance of the image pickup accessory. The exposure control unit controls the exposure based on the first information and the second information. The focus control unit controls the driving of the focus lens based on the defocus amount calculated based on the third information.

39 Claims, 35 Drawing Sheets

(51) Int. Cl.
*H04N 23/75* (2023.01)
*G03B 9/02* (2021.01)

(56) References Cited

FOREIGN PATENT DOCUMENTS

| | | |
|---|---|---|
| JP | 10-268382 A | 10/1998 |
| JP | 2016-048318 A | 4/2016 |
| JP | 6171106 B2 | 7/2017 |

\* cited by examiner

COMMUNICATION CMD1

F-NUMBER/T-NUMBER CONVERSION TABLE DATA SIZE COMMUNICATION

F-NUMBER/T-NUMBER CONVERSION TABLE DATA COMMUNICATION

2101

INFINITY ← FOCUS POSITION → CLOSE

| F-NUMBER | FOCUS 1 | FOCUS 2 | FOCUS 3 | FOCUS 4 | ... | FOCUS31 | FOCUS32 |
|---|---|---|---|---|---|---|---|
| F1.0 | T2.2 | T2.2 | T2.3 | T2.3 | --- | T2.9 | T3.0 |
| F1.0 + 1/1-STOP | T2.2 | T2.3 | T2.3 | T2.4 | --- | T3.0 | T3.1 |
| F1.0 + 2/16-STOP | T2.3 | T2.3 | T2.4 | T2.5 | --- | T3.1 | T3.2 |
| ... | ... | ... | ... | ... | ... | ... | ... |
| F2.0 | T2.8 | T2.9 | T2.9 | T3.0 | ... | T3.6 | T3.8 |
| ... | ... | ... | ... | ... | ... | ... | ... |
| F4.0 | T4.6 | T4.6 | T4.7 | T4.8 | ... | T5.1 | T5.1 |
| ... | ... | ... | ... | ... | ... | ... | ... |
| ... | ... | ... | ... | ... | ... | ... | ... |
| ... | ... | ... | ... | ... | ... | ... | ... |
| F64 | T64.2 | T64.2 | T64.3 | T64.3 | ... | T64.5 | T64.5 |

F-NUMBER/T-NUMBER CONVERSION TABLE FOR FILTER A

FIG. 21A 2102  2103

INFINITY ← FOCUS POSITION → CLOSE

| F-NUMBER | FOCUS 1 | FOCUS 2 | FOCUS 3 | FOCUS 4 | ... | FOCUS31 | FOCUS32 |
|---|---|---|---|---|---|---|---|
| F1.0 | T2.3 | T2.3 | T2.4 | T2.4 | --- | T3.0 | T3.1 |
| F1.0 + 1/8-STOP | T2.3 | T2.4 | T2.4 | T2.4 | --- | T3.1 | T3.2 |
| F1.0 + 2/8-STOP | T2.4 | T2.4 | T2.4 | T2.5 | --- | T3.1 | T3.3 |
| ... | ... | ... | ... | ... | ... | ... | ... |
| F2.0 | T2.9 | T2.9 | T3.0 | T3.0 | ... | T3.7 | T3.8 |
| ... | ... | ... | ... | ... | ... | ... | ... |
| F4.0 | T4.6 | T4.7 | T4.8 | T4.9 | ... | T5.1 | T5.2 |
| ... | ... | ... | ... | ... | ... | ... | ... |
| ... | ... | ... | ... | ... | ... | ... | ... |
| ... | ... | ... | ... | ... | ... | ... | ... |
| F64 | T64.2 | T64.3 | T64.3 | T64.4 | ... | T64.6 | T64.7 |

F-NUMBER/T-NUMBER CONVERSION TABLE FOR FILTER B

FIG. 21B

| 2104 | FOCUS 1 | FOCUS 2 | FOCUS 3 | FOCUS 4 | ... | FOCUS31 | FOCUS32 |
|---|---|---|---|---|---|---|---|
| T1.0 | --- | --- | --- | --- | --- | --- | --- |
| T1.0 + 1/16-STOP | --- | --- | --- | --- | --- | --- | --- |
| T1.0 + 2/16-STOP | --- | --- | --- | --- | --- | --- | --- |
| ... | ... | ... | ... | ... | ... | ... | ... |
| T2.8 | F2.0 | F2.1 | F2.1 | F2.2 | ... | F2.4 | F2.5 |
| ... | ... | ... | ... | ... | ... | ... | ... |
| T4.0 | F3.5 | F3.5 | F3.6 | F3.6 | ... | F3.8 | F3.8 |
| ... | ... | ... | ... | ... | ... | ... | ... |
| ... | ... | ... | ... | ... | ... | ... | ... |
| ... | ... | ... | ... | ... | ... | ... | ... |
| T64 | F63.7 | F63.7 | F63.7 | F63.8 | ... | F63.9 | F63.9 |

T-NUMBER/F-NUMBER CONVERSION TABLE FOR FILTER A

FIG. 21C

| 2105 / 2106 | FOCUS 1 | FOCUS 2 | FOCUS 3 | FOCUS 4 | ... | FOCUS31 | FOCUS32 |
|---|---|---|---|---|---|---|---|
| T1.0 | --- | --- | --- | --- | --- | --- | --- |
| T1.0 + 1/8-STOP | --- | --- | --- | --- | --- | --- | --- |
| T1.0 + 2/8-STOP | --- | --- | --- | --- | --- | --- | --- |
| ... | ... | ... | ... | ... | ... | ... | ... |
| T2.8 | F2.2 | F2.3 | F2.3 | F2.4 | ... | F2.5 | F2.7 |
| ... | ... | ... | ... | ... | ... | ... | ... |
| T4.0 | F3.7 | F3.7 | F3.7 | F3.8 | ... | F3.8 | F3.9 |
| ... | ... | ... | ... | ... | ... | ... | ... |
| ... | ... | ... | ... | ... | ... | ... | ... |
| ... | ... | ... | ... | ... | ... | ... | ... |
| T64 | F63.7 | F63.8 | F63.8 | F63.9 | ... | F63.9 | F64 |

T-NUMBER/F-NUMBER CONVERSION TABLE FOR FILTER B

FIG. 21D

F-NUMBER/T-NUMBER CONVERSION TABLE DATA SIZE COMMUNICATION

IMAGE PICKUP APPARATUS, IMAGE PICKUP ACCESSORY, AND INTERMEDIATE ACCESSORY

BACKGROUND OF THE INVENTION

Field of the Invention

The present invention relates to an image pickup apparatus to which an accessory such as an interchangeable lens is attachable.

Description of the Related Art

Conventionally, a lens interchangeable camera system is known that controls a variation in a light amount (light amount variation) caused by an image pickup optical system, by performing communication of a diaphragm control instruction from a camera main body (image pickup apparatus) to an interchangeable lens (lens apparatus), and that controls exposure (performs AE control) according to the change in light amount. A lens interchangeable camera is known that performs various correction processing such as defocus correction during autofocus control (AF control) based on information on pupil intensity distribution of an image sensor, the information being acquired by a diameter determined according to a position of a diaphragm of an image pickup optical system.

A lens apparatus is known in which a variation in a light amount input to an image pickup apparatus via an image pickup optical system does not have a linear relationship with a diaphragm control amount. As an example of such a lens apparatus, a lens apparatus is known which includes a filter for giving a blurring effect to a captured image. Such a lens apparatus has a configuration in which transmittance varies from an optical center in a radial direction of a diameter, and in which a linearity between the diaphragm control amount and the light amount entering the image pickup apparatus is not maintained particularly near an open diameter. Hence, such a lens apparatus cannot properly perform AE control which assumes that the light amount varies linearly during diaphragm control, and cannot properly perform AF control which assumes that pupil intensity distribution change varies linearly.

Japanese Patent Application Laid-Open No. ("JP") No. H10-268382 discloses an image pickup system that changes diaphragm control by selecting stored diaphragm characteristic data according to a type of an attached filter inserted into a normal optical system to generate a blurring effect. JP 6171106 discloses a method of performing AF control by referring to variation information on a pupil intensity distribution of an apodization filter.

The image pickup system disclosed in JP H10-268382 stores data indicating a relationship between a diaphragm driving pulse, and an F-number and a T-number. However, JP H10-268382 does not describe a lens interchangeable camera system. If the configuration disclosed in JP H10-268382 is applied to a lens interchangeable camera system and a lens system, it is necessary to make the interchangeable lens store the above-mentioned data, the interchangeable lens being configured to control the diaphragm. However, in this method, the camera main body cannot know how much the light amount varies if the F-number changes according to a user setting. In a camera mode such as an Av priority mode in which a user changes an F-number setting, it is impossible to correctly grasp the light amount variation caused by controlling the diaphragm, and thus exposure cannot be properly controlled. It becomes necessary to transmit the light amount variation according to the change amount of the F-number by the communication between the camera and the interchangeable lens, which particularly affects a frame-capturing rate during continuous image pickup.

Japanese Patent No. 6171106 does not disclose to acquire information on a plurality of F-numbers required for AF control from an interchangeable lens and to selectively use the information. Thus, it is impossible to optimize the AF control including lens driving control as well as function of defocus amount detection. Further, neither JP H10-268382 nor Japanese Patent No. 6171106 discloses a communication method in a lens interchangeable camera system that is optimum for AE control and AF control.

SUMMARY OF THE INVENTION

The present invention provides an image pickup apparatus, an image pickup accessory, and an intermediate accessory each of which can realize proper AE control and AF control.

An image pickup apparatus according to one aspect of the present invention is an image pickup apparatus to which an image pickup accessory is detachably attachable, the image pickup accessory having a focus lens and a diaphragm. The image pickup apparatus includes a communication unit configured to communicate with the image pickup accessory, an image pickup unit configured photoelectrically convert an optical image formed by an image pickup optical system of the image pickup accessory, and to output image data, an exposure control unit configured to control exposure, and a focus control unit configured to control driving of the focus lens based on a defocus amount. The communication unit transmits a request for diaphragm control to the image pickup accessory. The communication unit receives first information on a relationship between a diaphragm position and a variation in a light amount during the diaphragm control, second information corresponding to the diaphragm position, and third information corresponding to the diaphragm position and light transmittance of the image pickup accessory. The exposure control unit controls the exposure based on the first information and the second information. The focus control unit controls the driving of the focus lens based on the defocus amount calculated based on the third information.

An image pickup apparatus according to one aspect of the present invention is an image pickup apparatus to which an image pickup accessory is detachably attachable, the image pickup accessory having a focus lens and a diaphragm. The image pickup apparatus includes a communication unit configured to communicate with the image pickup accessory, an image pickup unit configured to output image data by photoelectrically converting an optical image formed by an image pickup optical system of the image pickup accessory, and a focus control unit configured to control driving of the focus lens based on a defocus amount. The communication unit acquires fifth information on a relationship between second information corresponding to a diaphragm position and third information corresponding to the diaphragm position and light transmittance of the image pickup accessory. The focus control unit controls driving of the focus lens based on the defocus amount calculated based on the fifth information.

An image pickup accessory detachably attachable to the above image pickup apparatus, and an intermediate accessory attachable between the image pickup apparatus and the image pickup accessory are also constitute other aspects of the present invention.

Further features of the present invention will become apparent from the following description of exemplary embodiments with reference to the attached drawings.

BRIEF DESCRIPTION OF THE DRAWINGS

FIG. 21A to 21D are explanatory diagrams illustrating table data configurations for converting an F-number and a T-number according to the second embodiment.

DESCRIPTION OF THE EMBODIMENTS

Referring now to the accompanying drawings, a description will be given of embodiments according to the present invention.

First Embodiment

First, a description will be given of AE control, AF control, and a communication control method in an interchangeable lens as an accessory and a camera main body as an image pickup apparatus, according to a first embodiment of the present invention.

Configuration Diagram

Figure 1:
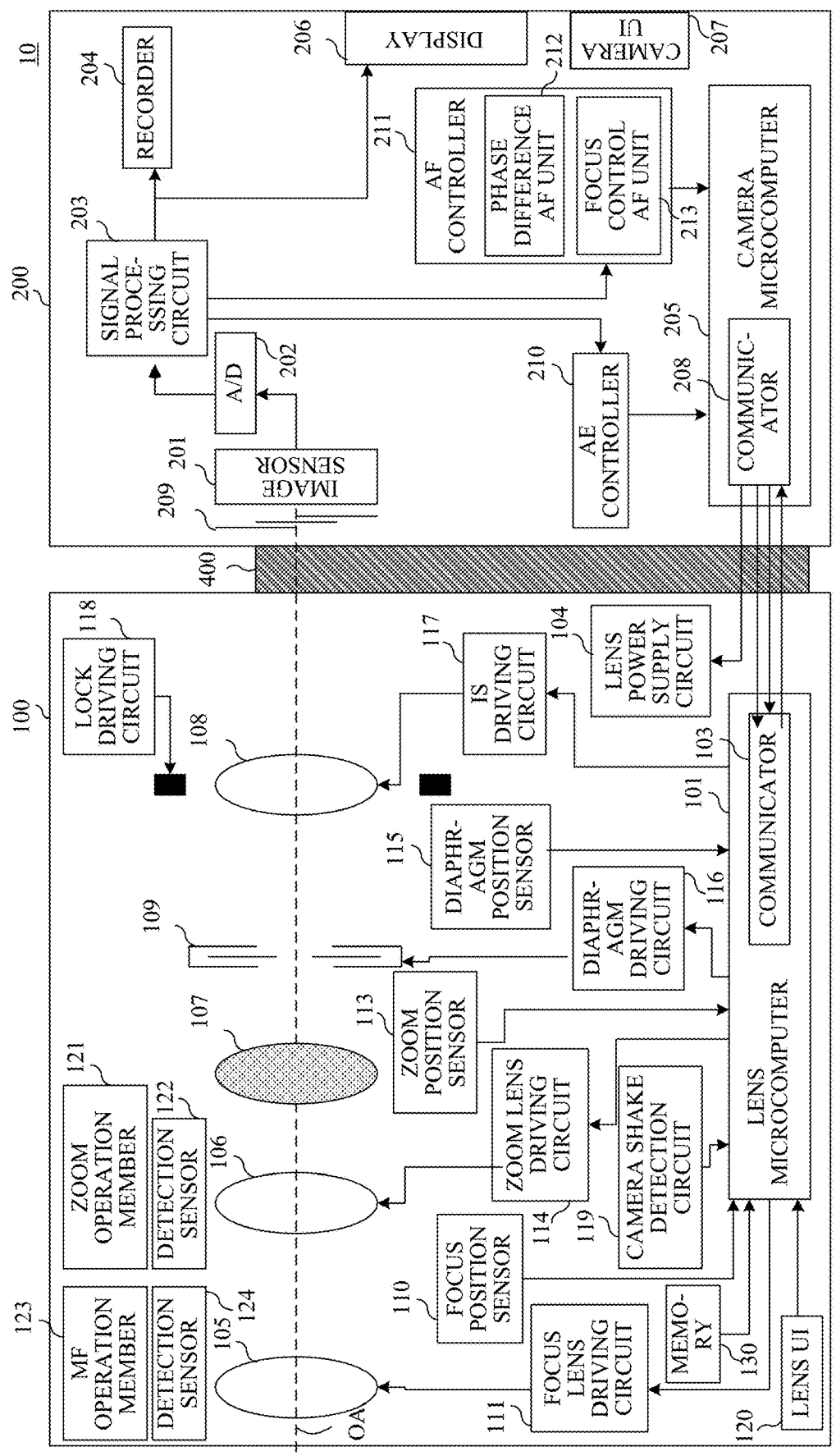
FIG. 1 is a configuration diagram illustrating a camera system including an image pickup apparatus and an accessory according to a first embodiment.

FIG. 1 is a configuration diagram illustrating an image pickup system (camera system) 10 including a camera main body 200 as an image pickup apparatus and an interchangeable lens (lens apparatus) 100 as an image pickup accessory detachably attachable to the camera main body 200, according to this embodiment. The camera main body 200 and the interchangeable lens 100 are configured to transmit each control instruction and internal information via their respective communicators 208 and 103 as communication units.

First, a specific configuration will be described of the interchangeable lens 100 and the camera main body 200. The interchangeable lens 100 and the camera main body 200 are mechanically and electrically connected via a mount 40, which is a connection mechanism. The interchangeable lens 100 is configured to receive power supplied from the camera main body 200 via a power supply terminal (not illustrated) provided on the mount 400, and to control various actuators and a lens microcomputer 101 which are described later. The interchangeable lens 100 and the camera main body 200 communicate with each other via a communication terminal provided on the mount 400 (refer to FIG. 2).

The interchangeable lens 100 includes a focus lens 105 configured to move during focusing, a zoom lens 106 configured to move during zooming, and a diaphragm 109. The interchangeable lens 100 includes an image stabilizing lens 108 configured to correct camera shake and the like, and an image pickup optical system having an optical element 107 in which transmittance varies in a direction from a center of an optical axis, that is an optical axis OA, in a radial direction. A lens power supply circuit 104 is a power supply circuit unit configured to manage driving power for controlling the lens microcomputer 101 and various driving circuits in the lens, and is supplied with power from the communicator 208 of the camera main body 200.

The optical element 107 includes a lens or a filter which is also referred to as an ND filter or an apodization filter. The filter may be configured to be detachably attachable. The optical element 107 is configured so that the transmittance varies from the center of the optical axis in the radial direction. Specifically, the transmittance of a central portion is higher than that of a peripheral portion. The diaphragm 109 is capable of adjusting an aperture diameter by a diaphragm driving circuit 116. That is, the diaphragm 109 has a function as a light amount adjuster that adjusts a light amount of light which reaches an image sensor 201 as an image pickup unit in the camera main body 200. A diaphragm position sensor 115 is configured to detect a position of the diaphragm 109. Here, a diaphragm position refers to the aperture diameter of the diaphragm 109 or a driving amount of the diaphragm 109 corresponding to the aperture diameter. The diaphragm driving circuit 116 is configured to drive the diaphragm 109.

A focus position sensor 110 is configured to detect a position of the focus lens 105, that is also referred to as a focus position. A focus lens driving circuit 111 is configured to drive the focus lens 105. A zoom position sensor 113 is configured to detect a position of the zoom lens 106, that is also referred to as a zoom position. A zoom lens driving circuit 114 is configured to drive the zoom lens 106. An MF operation member 123 as a manual focus operation member is an operation member including a barrel-shape manual focus ring which rotates around the optical axis OA of the image pickup optical system and which is provided on an exterior of the interchangeable lens 100. A detection sensor 124 is configured to control the focus lens driving circuit 111 according to an operation amount for the MF operation member 123, and to drive the focus lens 105 to a predetermined position. A zoom operation member 121 is an operation member including a barrel-shape manual zoom ring which rotates around the optical axis OA and which is provided on the exterior of the interchangeable lens 100. A detection sensor 122 is configured to detect an operation amount for the zoom operation member 121. The lens microcomputer 101 is configured to control the zoom lens driving circuit 114 according to an operation amount for the zoom operation member 121, the operation amount being detected by the detection sensor 122, and to drive the zoom lens 106 to a predetermined position.

A memory 130 is configured to store characteristic information and optical information each of which is specific to the interchangeable lens 100. These pieces of information are transmitted to the camera main body 200 via the communicator 103. The memory 130 may be built in the lens microcomputer 101 or may have an external configuration. The characteristic information includes a name of the interchangeable lens 100, that is ID information for identifying a model, a communication speed, an open F-number, whether or not the lens is a zoom lens, a compatible AF system, and an image height to which AF can be performed. The characteristic information includes information such as a data table indicating a relationship between an F-number as a refining position of the diaphragm 109 and a light amount T-number, information on pupil intensity distribution relative to the image sensor 201 in the camera main body 200, and light beam information indicating a depth of field, the table data being information specific in this embodiment. The optical information includes sensitivity information on the focus lens 105, a focus correction amount which is a designed value, and information on focus correction manufacturing error, each piece of information is acquired as matrix such as a focus position, a zoom position, and a state of diaphragm 109. In addition to these characteristic information and optical information, the communicator 103 in the interchangeable lens 100 is configured to transmit operation information on the MF operation member 123, an operation state and setting information on each of units in various lenses, and the like to the camera microcomputer 205. The operation state and setting information include a permission signal that allows the focus lens 105 to be driven by operating a focus preset drive switch.

The interchangeable lens 100 includes a lens user interface 120 as an operation member. The lens user interface 120 includes an AF/MF selection switch for selecting whether to perform autofocus (AF) or manual focus (MF) in in-focus operation, and an IS_ON/OFF switch for selecting whether or not to perform camera shake correction. The camera microcomputer 205 is notified of the operation information on the lens user interface 120 via the communicator 103 as described above. The camera microcomputer 205 performs AF operation when confirming that the AF is selected by the AF/MF selection switch.

The camera main body 200 includes an image sensor 201 such as a CCD sensor and a CMOS sensor, an A/D conversion circuit 202, a signal processing circuit 203, a recorder 204, a camera microcomputer 205, and a display 206. The camera main body 200 includes a communicator 208 configured to control communication with the interchangeable lens 100, a shutter 209, an AE controller (auto exposure controller or exposure control unit) 210, and an AF controller (autofocus controller or focus control unit) 211.

The image sensor 201 is configured to photoelectrically convert an object image that is an optical image formed by the image pickup optical system in the interchangeable lens 100 and to output an electrical signal that is an analog signal. The A/D conversion circuit 202 is configured to convert the analog signal from the image sensor 201 into a digital signal. The signal processing circuit 203 is configured to perform various image processing on the digital signal from the A/D conversion circuit 202 and to generate an image signal. The image sensor 201 has a structure including a plurality of photoelectric converters for one pixel, and thereby it is possible to simultaneously output a phase difference signal and an image signal as defocus information of an object. The signal processing circuit 203 is also configured to generate a contrast state of the object image from the image signal, that is, focus information indicating a focus state of the image pickup optical system and luminance information indicating an exposure state of the image pickup optical system. The signal processing circuit 203 is configured to output the image signal to a display 206. The display 206 is configured to display the image signal as a live view image used for checking framing, the focus state, and the like.

From the signal processing circuit 203, the luminance information is output to an AE controller 210, and the defocus information is output to an AF controller 211.

The live view image displayed on the display 206 includes various setting information such as an image pickup mode, a shutter speed, and a diaphragm set value, each of which is set in the camera main body 200. The image pickup mode is, for example, a still image pickup mode, a motion image pickup mode, a diaphragm priority mode, a shutter speed priority mode, or the like. For example, during still image pickup, the shutter 209 is controlled according to the shutter speed set in the camera. A camera user interface (camera UI) 207 is an operation member including a release switch, and can be used for changing a mode and for changing a set value. For example, the camera user interface 207 can switch the diaphragm priority mode and the shutter speed priority mode for the AE control.

The controller 210 includes a photometry sensor as a photometry unit (not illustrated) and is configured to measure the light amount entering the image sensor 201. The AE controller 210 is configured to acquire information on the image pickup mode such as the diaphragm priority mode or the shutter priority mode set in the camera main body 200. For example, when the diaphragm priority mode is selected, the AE controller 210 requests, via the communicator 208, the lens microcomputer 101 to control the diaphragm so as to adjust the F-number to a diaphragm control value set by the user. The AE controller 210 realizes proper exposure control by adjusting the shutter speed and an ISO sensitivity based on the light amount variation expected to be caused by the change in the F-number. Since the optical element 107 of this embodiment is configured so that the transmittance varies from the center of the optical axis in the radial direction, it is necessary for the AE controller 210 to grasp a correspondence between the F-number and the variation in the light amount during the diaphragm control. The details of this control will be described later.

The AF controller 211 includes a phase difference AF unit (image pickup plane phase difference focus detector) 212 and a focus control AF unit 213. The phase difference AF unit 212 is configured to perform focus detection processing by a phase difference detection method based on the image signal of a pixel signal for the focus detection, the image signal being acquired from the image sensor 201 and from the signal processing circuit 203. More specifically, the signal processing circuit 203 generates, as focus detection data, a pair of image signal data formed by a light beam passing through a pair of pupil areas in the image pickup optical system. The phase difference AF unit 212 detects a focus shift amount based on an image shift amount of the pair of image signal data. As described above, the phase difference AF unit 212 in this embodiment performs phase difference AF (image pickup plane phase difference AF) based on the output from the image sensor 201 without using a dedicated AF sensor. The image shift amount explained here is a shift amount as image signal information, and is converted to the defocus amount of the object in the optical system by calculation using a conversion coefficient which is calculated based on a base length. A base length is generally determined by a centroid difference of an area that can receive light by a pixel for phase difference detection, the light being a light beam passes through a pair of pupil areas of the image pickup optical system. However, in the optical system of this embodiment in which the transmittance varies from the center of the optical axis in the radial direction, a center-of-gravity position of a light-receiving area changes when transmittance distribution changes, and thus it is necessary to take variation information on the pupil intensity distribution into consideration. As described later, in this embodiment, calculation accuracy of the defocus amount is improved by communicating the variation information on the pupil intensity distribution from the lens microcomputer 101 to the phase difference AF unit 212 in the AF controller 211.

The camera microcomputer 205 as a camera controller is configured to control the camera main body 200 in response to input from an image pickup instruction switch, various setting switches and the like of the camera user interface 207. The above-described AE control is one of camera control, and when the diaphragm position is to be changed by the image pickup mode and by user operation of the camera, the diaphragm request command is transmitted to the lens microcomputer 101 via the communicator 208. The AF control is one of camera control, and a control command relating to focus adjustment operation of the focus lens 105 is transmitted to the lens microcomputer 101 based on the defocus amount acquired from the image sensor 201 described above.

The camera microcomputer 205 is configured to transmit a control command for starting image stabilization to the lens microcomputer 101 via the communicator 208 in response to a half-depression operation on the release switch. When receiving the request for starting the image stabilization, the lens microcomputer 101 controls an IS driving circuit (image stabilization driving circuit) 117 to hold the image stabilizing lens 108 in a central control position. Subsequently, the lens microcomputer 101 controls a lock driving circuit 118 to drive a mechanical lock mechanism and to release a locked state. After that, the lens microcomputer 101 controls the IS driving circuit 117 according to a detection result from the camera shake detection circuit 119 to drive the image stabilizing lens 108 and stabilize an image. The camera microcomputer 205 drives the shutter 209 in response to full-depression operation on the release switch, the light beam from the image pickup optical system enters the image sensor 201, and image pickup is performed. The camera microcomputer 205 generates image data based on the output from the image sensor 201 and store the image data on a memory medium. A captured image is displayed on the display 206.

During live view, the camera microcomputer 205 performs various control in the image sensor 201 in a cycle determined by a frame rate. The various control includes the AF control, the AE control, communication processing with interchangeable lens 100, image processing, and the like. At this time, sensitivity in AF is effectively improved by increasing a live view control cycle (frame rate). On the other hand, if the frame rate increases, the control cycle is shortened, and thus a communication band decreases between the communicator 208 of the camera main body 200 and the communicator 103 of the interchangeable lens 10. In order to ensure responsiveness in communication, it is necessary to reduce an amount of communication between the camera main body 200 and the interchangeable lens 100 during the live view. When a continuous frame-capturing rate increases, time between frames decreases similarly to that during the live view, and thus it is also necessary to reduce the amount of communication between the camera and lens during continuous image-pickup.

This embodiment controls communication to realize the AE control and the AF control specific in the image pickup optical system including the optical element 107 in which the transmittance varies from the center of the optical axis in the radial direction. Specifically, control is provided so that optical data for AE is communicated when the camera power supply is started up or when the interchangeable lens 100 is attached, and so that the optical data for AF is acquired at the same timing as other AF control data. Thereby, it is possible to suppress consumption in the communication band during live view and between continuous image-pickup frames. A description will be given later of the communication processing of the optical data for AE and the communication processing of data for AF control.

Description for Communication Processor

Figure 2:
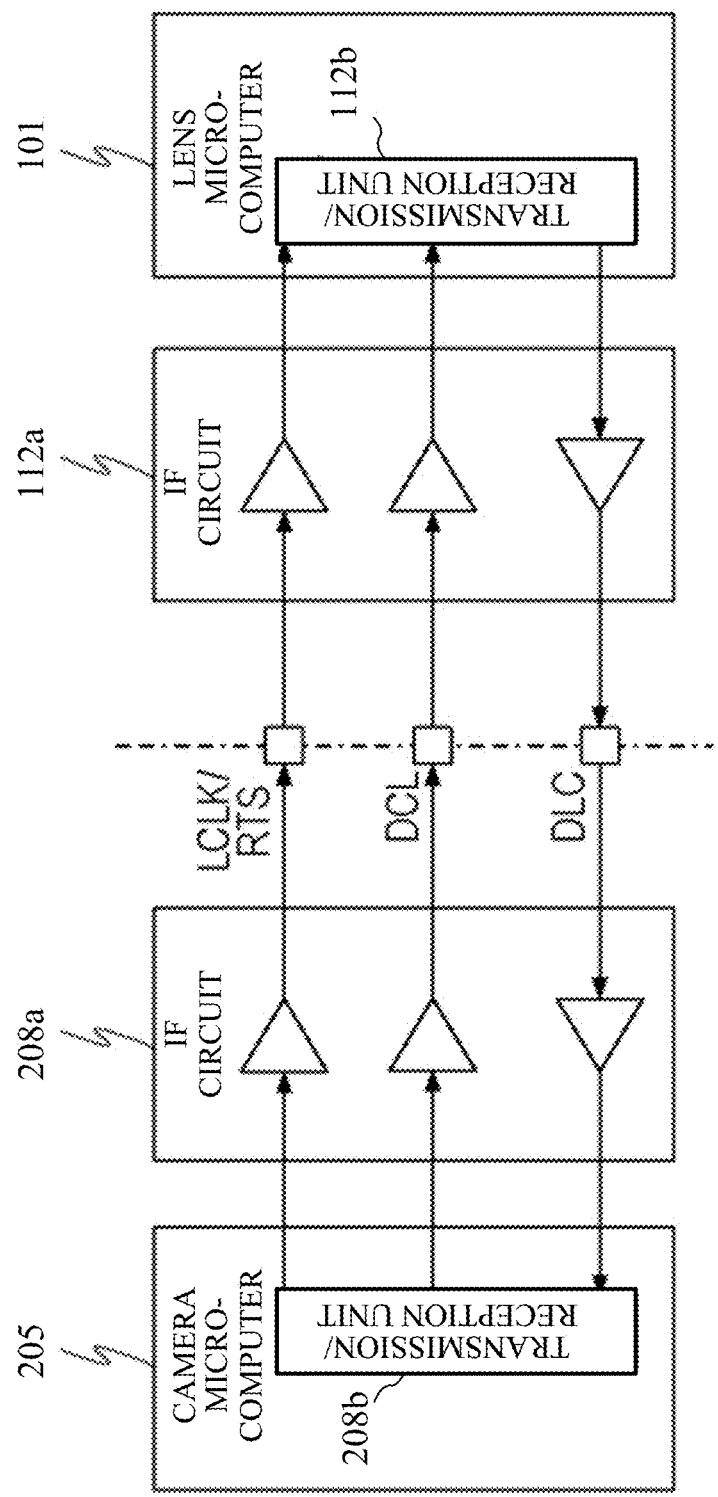
FIG. 2 is a block diagram illustrating a communication circuit between an image pickup apparatus and an accessory according to the first embodiment.
Figure 3A:
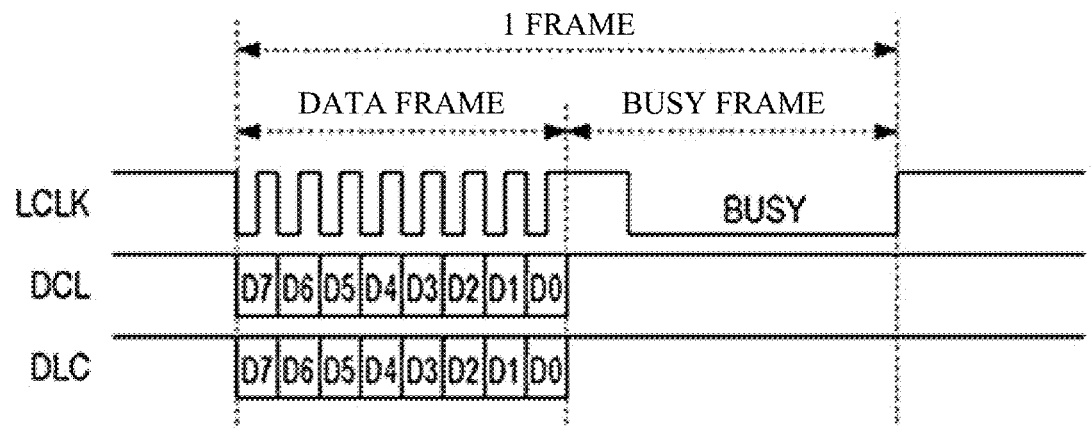
FIGS. 3A and 3B are communication waveform charts in a communication mode M1 according to the first embodiment.
Figure 3B:
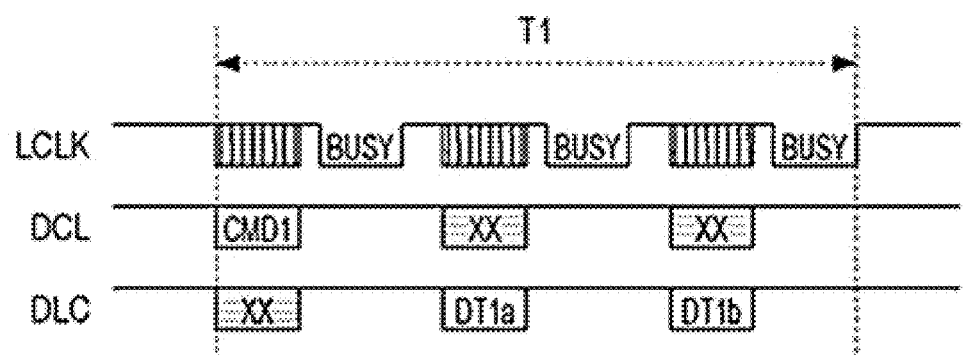
Figure 4:
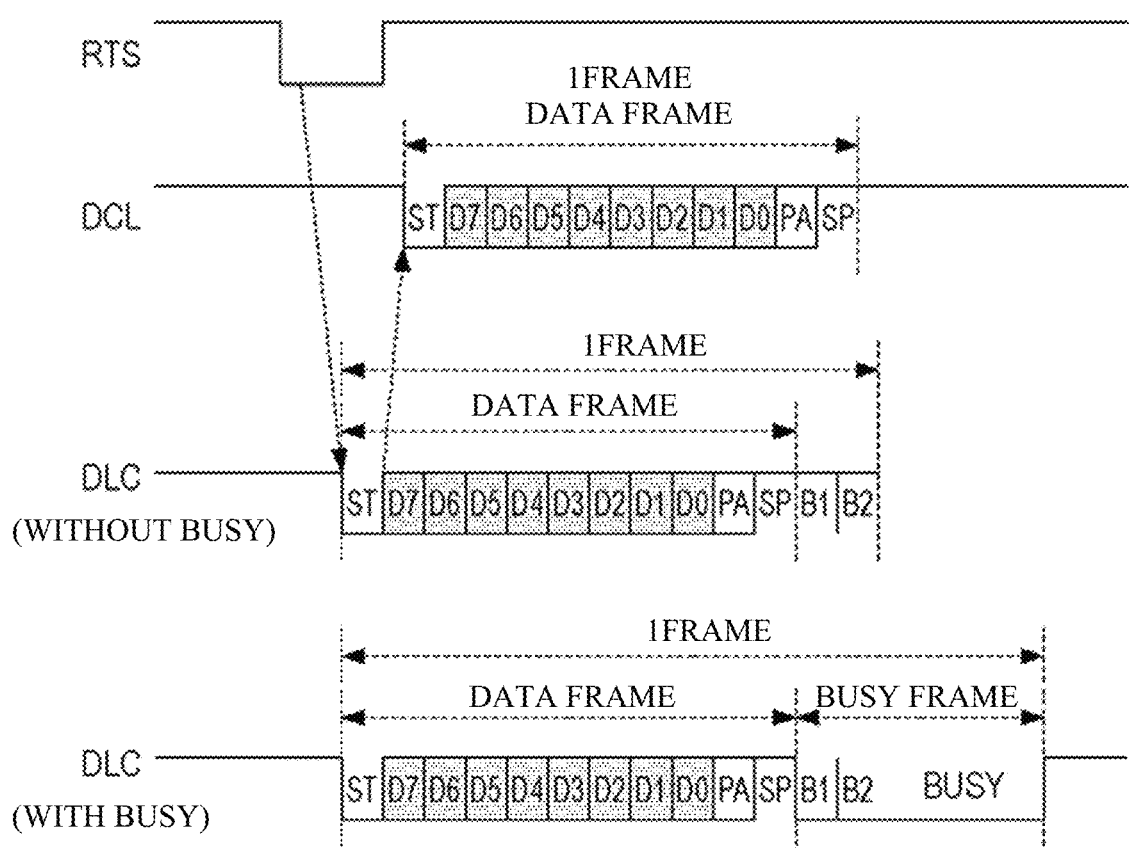
FIG. 4 is a communication waveform chart in a communication mode M2 according to the first embodiment.

Next, control will be described of communication between the camera main body 200 and the interchangeable lens 100 in this embodiment with reference to FIGS. 2 to 4. FIG. 2 is a block diagram illustrating a communication circuit between the camera main body 200 and the interchangeable lens 100. FIGS. 3A and 3B is a communication waveform chart in a communication mode M1. FIG. 4 is a communication waveform chart in a communication mode M2. FIGS. 3A, 3B and 4 provide explanatory diagrams illustrating switching processing to a high-speed communication method for communicating data for the AE control and the AF control.

The camera microcomputer 205 has a function of managing a communication format with the lens microcomputer 101 and a function of notifying the lens microcomputer 101 of a transmission request or the like. The lens microcomputer 101 has a function of generating lens data and a function of transmitting the lens data. The camera microcomputer 205 and the lens microcomputer 101 communicate with each other via the communication terminal provided on the mount 400 and via interface circuits (I/F circuits) 208a and 112a respectively provided on the camera microcomputer 205 and the lens microcomputer 101. The communicator 208 includes the interface circuit 208a and a transmission/reception unit (camera data transmission/reception unit) 208b a in the camera main body 200. Similarly, the communicator 112 includes the interface circuit 112a and a transmission/reception unit (lens data transmission/reception unit) 112b in the interchangeable lens 100.

In this embodiment, the camera microcomputer 205 and the lens microcomputer 101 perform serial communication by a communication method A and a communication method B each of which are three-wire communication using three channels. One of the three channels is a notification channel used as a clock channel in the communication method A and as a transmission request channel in the communication method B. One of the other two channels is a first data communication channel used for lens data transmission from the lens microcomputer 101 to the camera microcomputer 205. The other channel is a second data communication channel used for camera data transmission from the camera microcomputer 205 to the lens microcomputer 101.

A lens data signal DLC is lens data transmitted as a signal from the lens microcomputer 101 to the camera microcomputer 205 via the first data communication channel. A camera data signal DCL is camera data transmitted as a signal from the camera microcomputer 205 to the lens microcomputer 101 via the second data communication channel.

Description for Communication Mode

First, a description will be given of communication by the communication method A. In the communication method A, a clock signal LCLK is output from the camera microcomputer 205 as a communication master to the lens microcomputer 101 as a communication slave via the clock channel. The camera data signal DCL includes a control command, a transmission request command, and the like from the camera microcomputer 205 to the lens microcomputer 101. On the other hand, the lens data signal DLC includes various data transmitted from the lens microcomputer 101 to the camera microcomputer 205 in synchronization with the clock signal LCLK. The camera microcomputer 205 and the lens microcomputer 101 can communicate with each other by a full-duplex communication method in which transmission and reception are performed simultaneously and mutually, in synchronization with the common clock signal LCLK.

FIGS. 3A and 3B illustrates waveforms of the communication signals communicated between the camera microcomputer 205 and the lens microcomputer 101. A communication protocol specifies a procedure for this communication.

FIG. 3A illustrates signal waveform in one frame that is a minimum communication unit. First, the camera microcomputer 205 outputs a clock signal LCLK including a set of clock pulses of eight periods, and transmits the camera data signal DCL to the lens microcomputer 101 in synchronization with the clock signal LCLK. At the same time, the camera microcomputer 205 receives the lens data signal DLC output from the lens microcomputer 101 in synchronization with the clock signal LCLK.

As described above, one-byte (eight-bit) data is transmitted and received between the lens microcomputer 101 and the camera microcomputer 205 in synchronization with a set of clock signals LCLK. This transmission/reception period for one-byte data is referred to as a data frame. After transmitting and receiving this one-byte data, the lens microcomputer 101 transmits a signal (BUSY signal) notifying the camera microcomputer 205 of a communication standby request BUSY, and a communication standby period is inserted. This communication standby period is referred to as a BUSY frame. While receiving the BUSY frame, the camera microcomputer 205 is in a communication standby state. A communication unit of a set of the data frame period and the BUSY frame period is assumed to be one frame. Depending on a communication condition, the BUSY frame may not be added, and in this case, one frame is composed only of the data frame period.

Next, control will be described of communication when the camera microcomputer 205 is in the communication standby state during the BUSY frame. The camera microcomputer 205 outputs the clock signal LCLK via the clock channel as Data Frame for eight periods, and thereafter switches the clock channel on the camera microcomputer side (camera main body side) from an output setting to an input setting. When switching is completed of the clock channel on the camera microcomputer side, the lens microcomputer 101 switches the clock channel on the lens microcomputer side (interchangeable lens side) from the input setting to the output setting. Thereafter, the lens microcomputer 101 sets a voltage level of the clock channel to Low so as to notify the camera microcomputer 205 of the communication standby request BUSY. The BUSY signal is superimposed on the clock channel. The camera microcomputer 205 maintains the input setting of the clock channel during a period in which the communication standby request BUSY is transmitted, and stops the communication to the lens microcomputer 101.

The lens microcomputer 101 generates lens data DT1 corresponding to a transmission request command CMD1 during a period of transmitting the communication standby request BUSY. When completing a preparation of transmitting the lens data DT1 as the lens data signal DLC for a next frame, the lens microcomputer 101 switches the signal level of the clock channel on the lens microcomputer side to high, and cancels the communication standby request BUSY.

When recognizing the cancellation of the communication standby request BUSY, the camera microcomputer 205 transmits one-frame clock signal LCLK to the lens microcomputer 101 and receives the lens data DT1a from the lens microcomputer 101. In a next frame, the camera microcomputer 205 outputs eight periods of the clock signal LCLK again, and the camera microcomputer 205 and the lens microcomputer 101 repeat the same operation as above description, so that the camera microcomputer 205 receives lens data DT1b from the lens microcomputer 101.

FIG. 3B illustrates signal waveform when the camera microcomputer 205 transmits the request command CMD1 to the lens microcomputer 101 and receives two bytes of the corresponding lens data DT1 (DT1a, DT1b) from the lens microcomputer 101. FIG. 3B illustrates an example in which data communication is executed in response to "communication CMD1".

Between the camera microcomputer 205 and the lens microcomputer 101, a type and the number of bytes of the lens data DT corresponding to each of a plurality of types of command CMDs are determined in advance. The camera microcomputer 205 as the communication master outputs the command CMD and the clock signal LCLK for frames of the number of data number (byte number) required for a specific command CMD. The lens microcomputer 101 transmits the required number of data (number of bytes) corresponding to the command CMD to the camera microcomputer 205. The processing on the lens microcomputer 101 for the command CMD1 includes the process of superimposing the BUSY signal on the clock signal LCLK of each frame. The above-mentioned BUSY frame is inserted between the data frames. For example, in the communication CMD1 of FIG. 3B, when the camera main body 200 acquires two bytes of DT1a and DT1b from the interchangeable lens 100, two bytes indicates invalid data, the two bytes following the CMD1 that is transmitted from the camera microcomputer 205 to the lens microcomputer 101 via the DCL signal line. In the communication CMD1, one byte indicates invalid, the one byte being transmitted by the lens microcomputer 101 to the camera microcomputer 205 via the DLC signal line at the timing when the camera microcomputer 205 transmits the CMD1 on the DCL signal line.

Next, a description will be given of communication by the communication method B. In the communication method B, two different communication modes M1 and M2 are provided. The communication mode M1 is a communication mode used in cases where processing occurs in the lens microcomputer 101 when a communication request is transmitted from the camera main body 200 to the interchangeable lens 100 (for example, a case where a driving request for a diaphragm or a driving request for a focus lens is transmitted). The communication mode M2 is a communication mode used in a case where data is continuously transmitted from the interchangeable lens 100 to the camera main body 200 (for example, a case where data for image stabilization processing is transmitted). FIG. 4 illustrates waveforms of the communication signals communicated between the camera microcomputer 205 and the lens microcomputer 101 in the communication mode M1.

In the communication method B, the transmission request channel is used for notifying the lens microcomputer 101 as the communication slave of the transmission request for the lens data from the camera microcomputer 205 as the communication master. Notification via the transmission request channel is performed by switching the signal level (voltage level) on the transmission request channel between high (first level) and Low (second level). In the following description, the signal supplied to the transmission request channel in the communication method B is referred to as a transmission request signal RTS.

Similarly to the communication method A, the first data communication channel is used for transmitting the lens data signal DLC including various data from the lens microcomputer 101 to the camera microcomputer 205. Similarly to the communication method A, the second data communication channel is also used for transmitting the camera data signal DCL including the control command from the camera microcomputer 205, the transmission request command, and the like to the lens microcomputer 101.

In the communication method B, unlike the communication method A, the camera microcomputer 205 and lens microcomputer 101 do not transmit and receive data in synchronization with a common clock signal, but transmit and receive data using a communication bit rate based on a communication speed set in advance. The communication bit rate indicates an amount of data that can be transmitted in one second, and unit of the communication bit rate is bps (bit per second).

In this embodiment, also in this communication method B, as well as in the communication method A, the camera microcomputer 205 and the lens microcomputer 101 communicate with each other by the full-duplex communication method in which transmission and reception are mutually performed.

FIG. 4 illustrates a signal waveform of one frame, which is the minimum communication unit. Configurations of one-frame data formats are partially different between the camera data signal DCL and the lens data signal DLC.

First, the lens data signal DLC data format will be described. The one-frame lens data signal DLC is composed of the data frame and the subsequent BUSY frame. The lens data signal DLC maintains the signal level to high in the state where data transmission is not performed.

The lens microcomputer 101 sets the voltage level of the lens data signal DLC to low for a one-bit period so as to notify the camera microcomputer 205 of the start of transmission of one-frame lens data signal DLC. This one-bit period is referred to as a start bit ST, and the data frame starts from the start bit ST. Subsequently, the lens microcomputer 101 transmits one-byte lens data for an eight-bit period from a second bit to a ninth bit following the start bit ST.

A bit array of data is an MSB (Most Significant Bit) first format, starts from highest data D7, continues with data D6 and data D5 in this order, and ends with lowest data D0. The lens microcomputer 101 adds one-bit parity information (PA) to a tenth bit, sets the period of a stop bit SP indicating the end of one frame, and sets the voltage level of the lens data signal DLC to high. Thereafter, the data frame period started from the start bit ST ends. The parity information does not have to be one bit, and parity information of a plurality of bits may be added. In addition, parity information is not essential, and the format may be such that parity information is not added.

Subsequently, as represented by "DLC (with BUSY)" in the drawing, the lens microcomputer 101 adds a BUSY frame after the stop bit SP. The BUSY frame represents the period of the communication standby request BUSY transmitted from the lens microcomputer 101 to the camera microcomputer 205, similarly to that in the communication method A. The lens microcomputer 101 holds the signal level of the lens data signal DLC in low until the communication standby request BUSY is cancelled.

On the other hand, there is a case where it is not necessary to transmit the communication standby request BUSY from the lens microcomputer 101 to the camera microcomputer 205. For this case, as represented by "DLC (without BUSY)" in the drawing, a data format is also provided that constitutes one frame without adding the BUSY frame. Hereinafter, the BUSY frame is also referred to as a BUSY notification. That is, as the data format of the lens data signal DLC, it is possible to select one with the BUSY notification or one without the BUSY notification according to a processing condition on the lens microcomputer side.

A method will be described of identifying presence or absence of the BUSY notification (with BUSY or without BUSY), the identification being performed by the camera microcomputer 205. The signal waveform illustrated as "DLC (without BUSY)" FIG. 4 and the signal waveform illustrated as "DLC (with BUSY)" FIG. 4 include bit positions B1 and B2. The camera microcomputer 205 selects one of the bit positions of B1 and B2 as a BUSY identification position P for identifying the presence or absence of the BUSY notification. As described above, in this embodiment, a data format is used in which the BUSY identification position P is selected from the bit positions of B1 and B2. Thereby, it is possible to deal with a problem that processing time from the transmission of the lens data signal DLC data frame to the confirmation of the BUSY notification (Low in DLC) differs depending on the processing performance of the lens microcomputer 101.

Whether the BUSY identification position P is the bit position of B1 or the bit position of B2 is determined by communication between the camera microcomputer 205 and the lens microcomputer 101 before the communication by the communication method B is performed. The BUSY identification position P is not necessarily fixed to either the bit position of B1 or B2, and may change according to a processing ability of the camera microcomputer 205 and the lens microcomputer 101. The BUSY identification position P is not limited to B1 and B2, and can be set to a predetermined position after the stop bit SP.

Here, the reason will be described why the BUSY frame added to the clock signal LCLK in the communication method A is used as the data format added to the lens data signal DLC in the communication method B.

In the communication method A, it is necessary to communicate, via the same clock channel, the clock signal LCLK output by the camera microcomputer 205 as the communication master, and the BUSY signal output by the lens microcomputer 101 as the communication slave. Thus, by using a time division method, a collision is prevented between the output from the camera microcomputer 205 and the lens microcomputer 101. That is, the collision between the output can be prevented by properly assigning output enable periods to the camera microcomputer 205 and to the lens microcomputer 101, on the clock channel.

However, in this time division method, it is necessary to surely prevent the collision between the output from the camera microcomputer 205 and the lens microcomputer 101. Thus, an output inhibition period is inserted, in which the output from both microcomputers 205 and 101 is prohibited, from the time when the camera microcomputer 205 completes the output of the eight-pulse clock signal LCLK to the time when the lens microcomputer 101 is allowed to output the BUSY signal. This output inhibition period is a communication invalid period during which the camera microcomputer 205 and the lens microcomputer 101 cannot communicate with each other, which may cause a decrease in an effective communication speed.

In order to solve such a problem, the communication method B uses a data format in which a BUSY frame from the lens microcomputer 101 is added to the lens data signal DLC transmitted via the first data communication channel which is an exclusive output channel for the lens microcomputer 101.

Next, a description will be given of a data format of camera data signal DCL. The configuration of the one-frame data frame is the same as that of the lens data signal DLC. However, unlike the lens data signal DLC, the camera data signal DCL is prohibited from adding a BUSY frame.

Next, a process will be described of communication by the communication method B between the camera microcomputer 205 and the lens microcomputer 101. First, when an event occurs to start the communication with the lens microcomputer 101, the camera microcomputer 205 notifies the lens microcomputer 101 of the communication request by setting the voltage level of the transmission request signal RTS to Low (by asserting the transmission request signal RTS).

When the lens microcomputer 101 detects a communication request by the voltage level of the transmission request signal RTS changing to Low, the lens microcomputer 101 performs generation processing for the lens data signal DLC to be transmitted to the camera microcomputer 205. When a preparation is completed for transmitting the lens data signal DLC, the lens microcomputer 101 starts transmitting one-frame lens data signal DLC via the first data communication channel. The lens microcomputer 101 starts transmitting the lens data signal DLC within a set time, which is set mutually between the camera microcomputer 205 and the lens microcomputer 101, from the time when the voltage level of the communication request signal RTS becomes Low. That is, in the communication method B, the lens data to be transmitted may be determined within the time from when the voltage level of the communication request signal RTS becomes Low to when the transmission starts of the lens data signal DLC. Unlike the communication method A, there is no strict restriction that it is necessary to determine the lens data to be transmitted by the time when the first clock pulse is input. Thus, the communication method B can give a degree of freedom to the timing to start transmitting the lens data signal DLC.

Next, the camera microcomputer 205 returns the voltage level of the transmission request signal RTS to high in response to a detection of the start bit ST added to the head of the lens data signal DLC data frame received from the lens microcomputer 101. Hereinafter, returning the transmission request signal RTS to high is referred to as negating the transmission request signal RTS. Thereby, the transmission request is canceled and the camera microcomputer 205 starts transmitting the camera data signal DCL via the second communication channel. It does not matter which starts first between negating the transmission request signal RTS and transmitting the camera data signal DCL, and these may be performed by a time when a reception of the lens data signal DLC data frame is completed.

After transmitting the lens data signal DLC data frame, the lens microcomputer 101 adds the BUSY frame to the lens data signal DLC when it is necessary to notify the camera microcomputer 205 of the communication standby request BUSY. The camera microcomputer 205 monitors the presence or absence of the transmission of the communication standby request BUSY. While the communication standby request BUSY is transmitted, it is prohibited to assert the transmission request signal RTS for the next transmission request.

The lens microcomputer 101 executes necessary processing during a period in which the communication from the camera microcomputer 205 is kept standby by the communication standby request BUSY. The lens microcomputer 101 cancels the communication standby request BUSY after completing a preparation for the next communication. The camera microcomputer 205 is permitted to assert the transmission request signal RTS for the next transmission request when the communication standby request BUSY is cancelled and the transmission of the data frame of the camera data signal DCL is completed.

As described above, in this embodiment, the lens microcomputer 101 starts transmitting the lens data signal DLC data frame to the camera microcomputer 205 in response to the assertion of the transmission request signal RTS triggered by the communication start event in the camera microcomputer 205. The camera microcomputer 205 starts transmitting the data frame of the camera data signal DCL to the lens microcomputer 101 in response to detecting the start bit ST of the lens data signal DLC.

Here, the lens microcomputer 101 adds the BUSY frame after the lens data signal DLC data frame for the communication standby request BUSY if necessary. When the communication standby request BUSY is cancelled, one-frame communication processing completes. By this communication processing, one-byte communication data is transmitted to and received from each other between the camera microcomputer 205 and the lens microcomputer 101.

Figure 5:
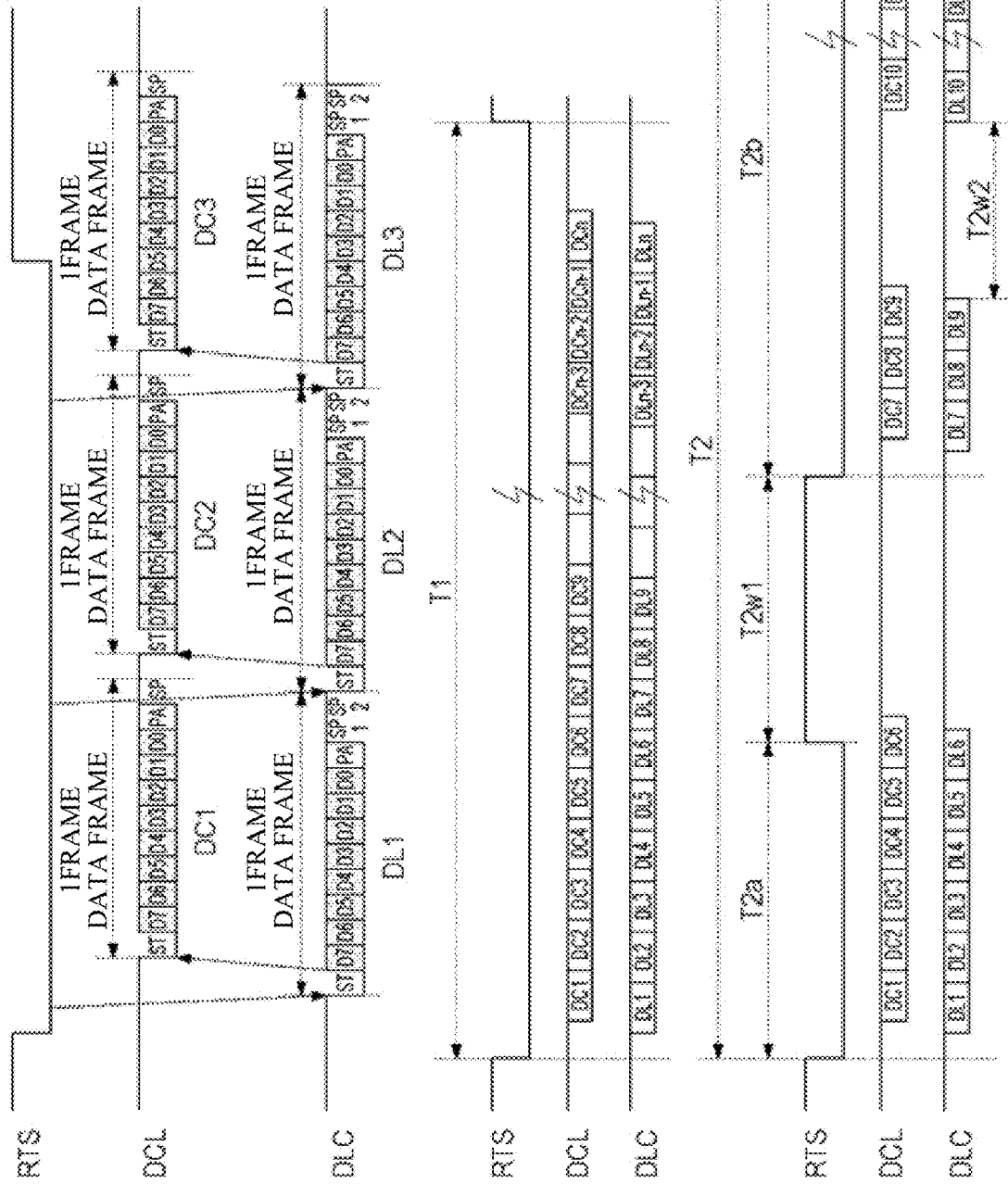
FIGS. 5A to 5C are communication waveform charts in a communication mode M3 according to the first embodiment.

Next, a description will be given of the communication mode M2 of the communication method B. FIG. 5A illustrates a waveforms of communication signals communicated between the camera microcomputer 205 and the lens microcomputer 101 in the communication mode M2. FIG. 5A illustrates the waveforms of the communication signals when three-frame data is continuously transmitted. The communication mode M2 is performed for data communication at high speed as described above, and it is prohibited to add the communication standby request BUSY to the lens data signal DLC.

Next, communication control processing will be described between the camera microcomputer 205 and the lens microcomputer 101, as a characteristic of this embodiment. FIG. 5B illustrates waveforms of communication signals when the camera microcomputer 205 and the lens microcomputer 101 continuously transmit and receive n-frame camera data signal DCL and lens data signal DLC, respectively. The camera microcomputer 205 asserts the transmission request signal RTS when an event occurs of starting communication with the lens microcomputer 101. In the communication mode M2, unlike communication mode M1, the camera microcomputer 205 does not need to negate the transmission request signal RTS frame by frame. The asserted state is maintained of the transmission request signal RTS while the data can be continuously transmitted and received.

When the lens microcomputer 101 detects the communication request by the transmission request signal RTS being asserted, the lens microcomputer 101 performs the generation processing for the lens data signal DLC to be transmitted to the camera microcomputer 205. When completing the preparation for transmitting the lens data signal DLC, the lens microcomputer 101 starts transmitting the first frame of the lens data signal DLC (DL) via the first data communication channel.

After transmitting the first frame of the lens data signal DLC, the lens microcomputer 101 checks the transmission request signal RTS again. At this time, if the transmission request signal RTS is in the asserted state, the lens microcomputer 101 transmits, to the camera microcomputer 205, the second frame of the next lens data signal DLC (DL2) following the first frame for which the transmission is completed. In this way, the lens microcomputer 101 continuously transmits the lens data signal DLC (DL1 to DLn) to the camera microcomputer 205 while the asserted state of the transmission request signal RTS is maintained. When the transmission is completed of predetermined number n frames, the transmission of the lens data signal DLC is stopped.

The camera microcomputer 205 starts transmitting n-frame camera data signal DCL (DC1 to DCn) via the second communication channel in response to the detection of the start bit ST for each frame of the lens data signal DLC from the lens microcomputer 101.

FIG. 5C illustrates waveforms of the communication signals when a temporary communication standby is instructed from the camera microcomputer 205 or the lens microcomputer 101 during the continuous data transmission/reception communication illustrated in FIG. 5B. When the camera microcomputer 205 asserts the communication request signal RTS, the lens microcomputer 101 starts transmitting the lens data signal DLC, and the camera microcomputer 205 starts transmitting the camera data signal DCL in response to the detection of the start bit ST of the lens data signal DLC.

T2w1 represents a communication standby period for which the communication standby is instructed by the camera microcomputer 205. The camera microcomputer 205 notifies the lens microcomputer 101 of this standby instruction by temporarily negating the transmission request signal RTS. When the lens microcomputer 101 detects the transmission request signal RTS being negated, the lens microcomputer 101 stops the transmission after completing the transmission of the lens data signal DLC frame being transmitted at the time of detection, this lens data signal DLC frame here being a dormant frame represented as DL6 in the drawing.

In response to the dormancy of lens data signal DLC transmission, the camera microcomputer 205 also stops the transmission of the camera data signal DCL after transmitting the frame (DC6) of the camera data signal DCL, this frame corresponding to the above dormant frame. With such communication control, even if a communication standby instruction is generated during continuous data transmission/reception communication, it is possible to manage the number of transmitted frames so that the number of the transmitted frames are the same between the lens data signal DLC and the camera data signal DCL.

When the request event stops of the communication standby, the camera microcomputer 205 can instruct the lens microcomputer 101 to restart the communication by asserting the transmission request signal RTS again (transmits a communication restart instruction). In response to the communication restart instruction, the lens microcomputer 101 restarts transmitting the lens data signal DLC from a frame next to the dormant frame, this frame being represented by DL and being hereinafter referred to as a restart frame. In response to the detection of the start bit ST of the restart frame, the camera microcomputer 205 restarts transmitting the camera data signal DCL from a frame (DC7) corresponding to the restart frame.

On the other hand, T2w2 represents the communication standby period for which the communication standby is instructed by the lens microcomputer 101. In the drawing, after the end of the communication standby period T2w1, the camera microcomputer 205 and the lens microcomputer 101 do not instruct the communication standby, and perform the continuous data transmission/reception of the restart frame DL7, DC7, and subsequent frames DL8, DC8 to DL9, and DC9 in this order. When the lens microcomputer 101 completes the transmission of the frame DL9, that is, when the camera microcomputer 205 completes the reception of the frame DC9, the communication standby request event occurs. Thereby, the lens microcomputer 101 notifies the camera microcomputer 205 of the communication standby instruction. When the transmission request signal RTS is in the asserted state, the lens microcomputer 101 notifies the camera microcomputer 205 of the dormancy of communication by not transmitting the lens data signal DLC.

The camera microcomputer 205 constantly monitors the start bit ST for each frame of the lens data signal DLC. The camera microcomputer 205 is set to stop the transmission of the next frame of the camera data signal DCL when the camera microcomputer 205 does not detect the start bit ST. When the camera microcomputer 205 does not receive the lens data signal DLC represented by DL10 in the drawing from the lens microcomputer 101 even if the transmission request signal RTS is asserted, the camera microcomputer 205 stops the communication without transmitting the camera data signal DCL represented by DC10. The camera microcomputer 205 maintains the transmission request signal RTS in the asserted state during the communication standby period T2w2 instructed by the lens microcomputer 101.

Thereafter, when the communication standby request event disappears in the lens microcomputer 101, and the lens microcomputer 101 restarts transmitting the lens data signal DLC with a restart frame DL10. The camera microcomputer 205 restarts transmitting the camera data signal DCL with a corresponding frame DC10 in response to detecting the start bit ST of the restart frame DL10.

Figure 6:
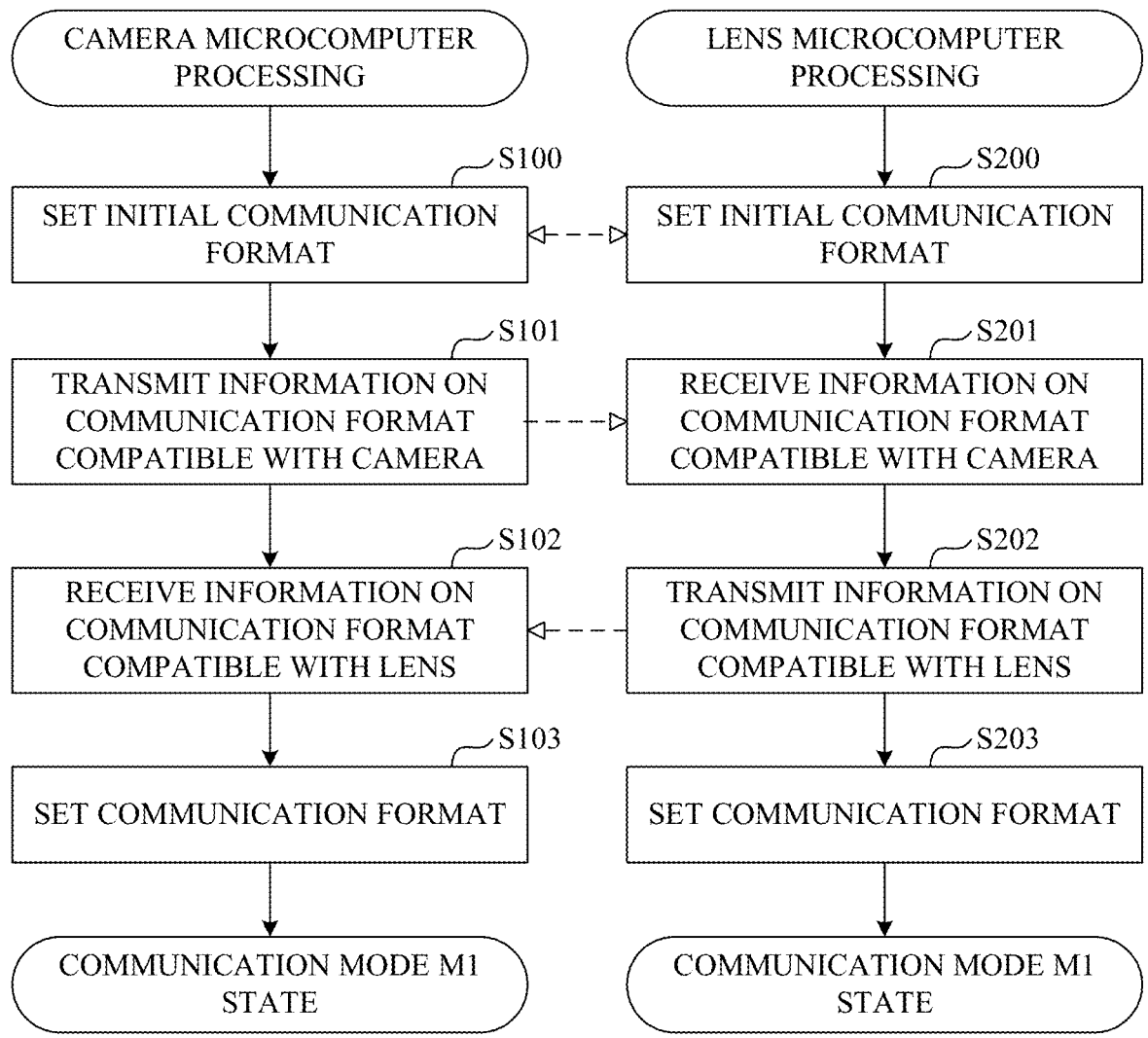
FIG. 6 is a flowchart illustrating a method of determining a communication format according to the first embodiment.

Next, the processes will be described of determining the communication format performed between the camera microcomputer 205 and the lens microcomputer 101 with reference to FIG. 6. FIG. 6 is a flowchart illustrating a method of determining the communication format. The camera microcomputer 205 and the lens microcomputer 101 executes communication control illustrated in the flowchart of FIG. 6 according to the communication control program which is a computer program.

First, when the interchangeable lens 100 is attached to the camera main body 200, in steps S100 and S200, the camera microcomputer 205 and the lens microcomputer 101 set the communication format to an initial communication format in which an establishment of communication is ensured. Here, the initial communication format may be a combination of the communication method and the data format disclosed in this embodiment, or may be other communication format. When an asynchronous communication format is selected as the initial communication format, the BUSY identification position P may be set so that communication can be executed in any combination of camera and interchangeable lens.

Subsequently, in step S101, the camera microcomputer 205 transmits camera identification information indicating a communication format compatible with the camera main body 200 to the lens microcomputer 101. In step S202, the lens microcomputer 101 transmits lens identification information indicating a communication format compatible with the interchangeable lens 100 to the camera microcomputer 205. Here, the "identification information" includes information on which communication method is supported of clock-synchronous or asynchronous, and information on a supported range of communication bit rates. Information on the BUSY identification position P is also included in the identification information.

In step S102, the camera microcomputer 205 receives the lens identification information. In step S201, the lens microcomputer 101 receives the camera identification information. Here, in the flowchart of FIG. 6, the lens identification information is transmitted after the camera identification information is transmitted, but the transmission of the camera identification information and the transmission of the lens identification information may be performed at the same time. The camera identification information may be transmitted after the lens identification information is transmitted.

Subsequently, in steps S103 and S203, the communication format is set for subsequent communication. Specifically, the camera microcomputer 205 and the lens microcomputer 101 determine, as the communication bit rate, the fastest rate in the communication bit rates which both the microcomputers can support. In the BUSY identification positions supported by both the microcomputers, the position closest to the stop bit SP is set as the BUSY identification position. After the above communication control, the communication mode of the camera microcomputer 205 and the lens microcomputer 101 shifts to the state of the communication mode M1.

Figure 7:
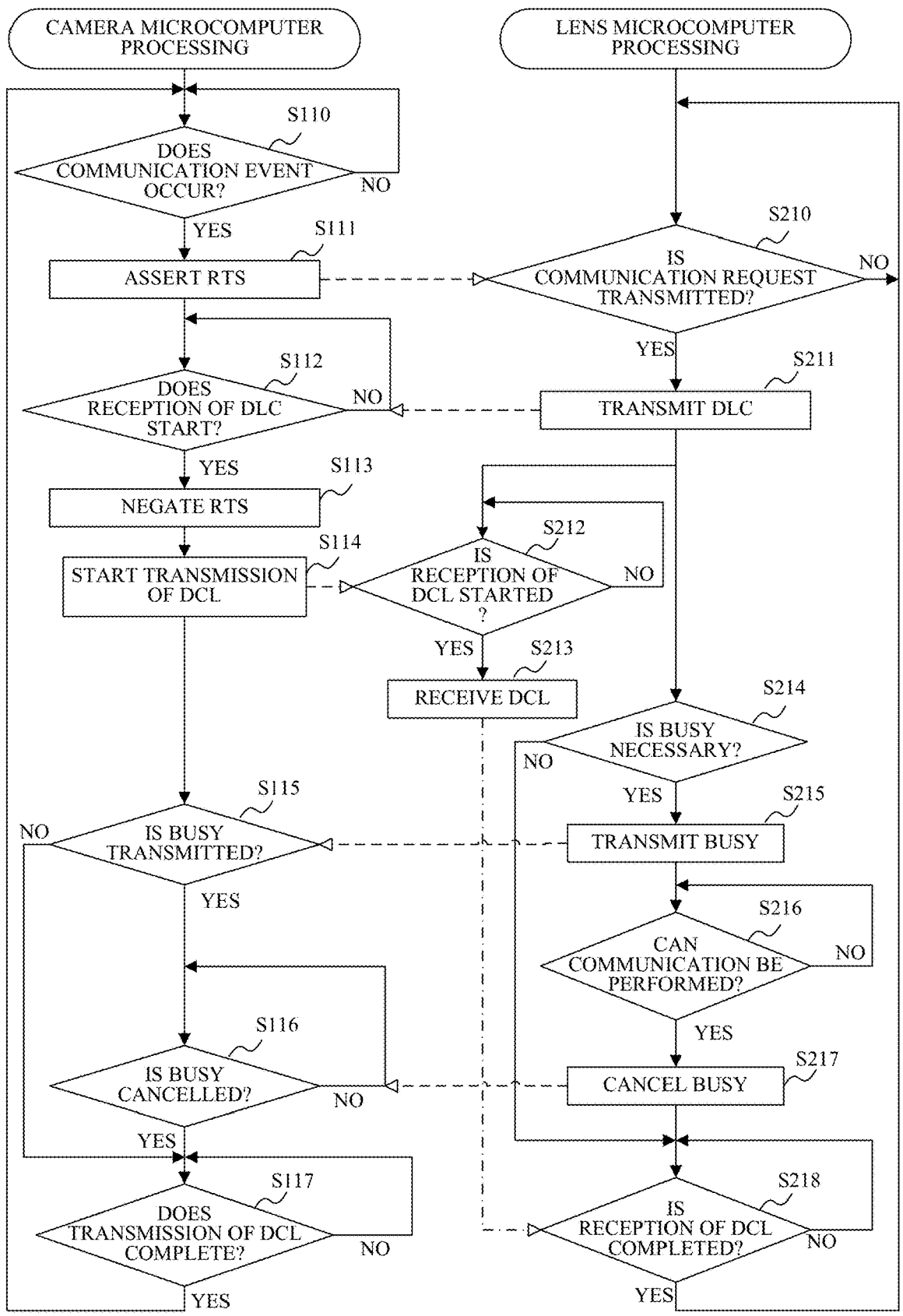
FIG. 7 is a flowchart illustrating data communication in the communication mode M2 according to the first embodiment.

Next, with reference to FIG. 7, a data communication flow will be described of the asynchronous communication method. FIG. 7 is a flowchart illustrating the data communication in the communication mode M2, and illustrating a communication flow in a data format to which it is permitted to add the BUSY signal.

The camera microcomputer 205 monitors whether or not a communication event occurs of starting communication with the lens microcomputer 101. When the communication event occurs in step S110, the process proceeds to step S111. In step S111, the camera microcomputer 205 transmits the communication request to the lens microcomputer 101 by asserting the communication request signal RTS as described above.

The lens microcomputer 101 monitors whether or not the communication request signal RTS is asserted. When the lens microcomputer 101 recognizes that the communication request signal RTS is asserted in step S210, the process proceeds to step S211. In step S211, the lens microcomputer 101 transmits the lens data signal DLC to the camera microcomputer 205 via the first data communication channel.

When the camera microcomputer 205 receives the lens data signal DLC from the lens microcomputer 101, that is, when YES is selected in step S112, the process proceeds to step S113 and the camera microcomputer 205 negates the communication request signal RTS. Thereafter, the process proceeds to step S114, and the camera data signal DCL is transmitted to the lens microcomputer 101 via the second data communication channel.

When the lens microcomputer 101 detects the start of reception of the camera data signal DCL in step S212, the lens microcomputer 101 proceeds to step S213 and performs the reception processing for the camera data signal DCL. In step S214 in parallel with the process of step S213, the lens microcomputer 101 determines whether or not it is necessary to notify the camera microcomputer 205 of the communication standby request BUSY. When it is not necessary to notify the camera microcomputer 205 of the communication standby request BUSY, the process proceeds to step S218 and the lens microcomputer 101 waits until the reception of the camera data signal DCL is completed.

On the other hand, when it is necessary to notify the camera microcomputer 205 of the communication standby request BUSY from the lens microcomputer 101, the process proceeds to step S215 and the BUSY frame is added to the lens data signal DLC. The lens microcomputer 101 executes necessary processing while notifying the camera microcomputer 205 of the communication standby request BUSY. When the next communication preparation is completed, that is, when Yes is selected in step S216, the lens microcomputer 101 cancels the communication standby request BUSY in step S217. After canceling the communication standby request BUSY, the lens microcomputer 101 proceeds to step S218 and waits until the reception of the camera data signal DCL is completed. When the reception of the camera data signal DCL is completed, that is, Yes is selected in step S218, the lens microcomputer 101 returns to step S210 and continues monitoring whether the communication request signal RTS is asserted.

In response to the reception of the communication standby request BUSY in step S115, the camera microcomputer 205 waits until the communication standby request BUSY is cancelled. When the communication standby request BUSY is cancelled, that is when YES is selected in step S116, the camera microcomputer 205 proceeds to step S117 and determines whether or not the transmission of the camera data signal DCL is completed. Even when the communication standby request BUSY is not transmitted in step S115, the camera microcomputer 205 proceeds to step S117 and determines whether or not the transmission of the camera data signal DCL is completed. When camera microcomputer 205 determines in step S117 that the transmission of the camera data signal DCL is completed, the camera microcomputer 205 returns to step S110 and continues monitoring whether or not a communication event occurs.

As explained above, this embodiment relates to communication control in asynchronous communication (communication method B) using three channels. The lens microcomputer 101 transmits the communication standby request BUSY to the camera microcomputer 205 via the first data communication channel which is the exclusive output channel for the lens microcomputer 101. On the other hand, the camera microcomputer 205 transmits the transmission request signal RTS to the lens microcomputer 101 via the notification channel as the exclusive output channel for the camera microcomputer 205.

In this way, the communication standby request BUSY from the lens microcomputer 101 is transmitted/received via the exclusive output channel for the lens microcomputer 101, and the transmission request signal RTS from the camera microcomputer 205 is transmitted/received via the exclusive output channel for the camera microcomputer 205. Thereby, the invalid period can be shortened of clock-synchronous communication (communication method A) as communication between the camera microcomputer 205 and the lens microcomputer 101, and thus the effective communication speed can increase.

Regarding the start timing of the communication, data transmission starts first from data transmission from the lens microcomputer 101 to the camera microcomputer 205. The camera microcomputer 205 starts data transmission in response to detecting the start bit ST of the data frame transmitted from the lens microcomputer 101. By setting the start timing of communication in this way, it is possible to give a degree of freedom to the timing at which the lens microcomputer 101 starts the data transmission to the camera microcomputer 205, after the lens microcomputer receives the transmission request signal RTS. For example, the start timing of data transmission can be changed according to an information processing ability of the lens microcomputer 101. Thereby, the communication speed can be improved between the camera main body 200 and the interchangeable lens 100 without causing a communication failure.

Description for Communication Processing at Time of Start Up

In this embodiment, it is possible to optimally perform the AE control and the AF control with the lens in which the transmittance varies from the center of the optical axis in the radial direction. In the AE control, as described later, a process of converting an F-number to a T-number and a process of converting a T-number to an F-number are required. If communication processing is performed between the camera main body 200 and the interchangeable lens 100 even time this conversion is required, the communication band may be consumed, and the control time for the communication processing may affect the sensitivity in the AE control. Thus, in this embodiment, conversion table data for F-number and T-number is read out from the lens microcomputer 101 by high-speed communication at the start-up timing of the camera microcomputer 205. Thereby, it is possible to perform the process of converting the F-number to the T-number while maintaining the sensitivity in the AE control.

Figure 8:
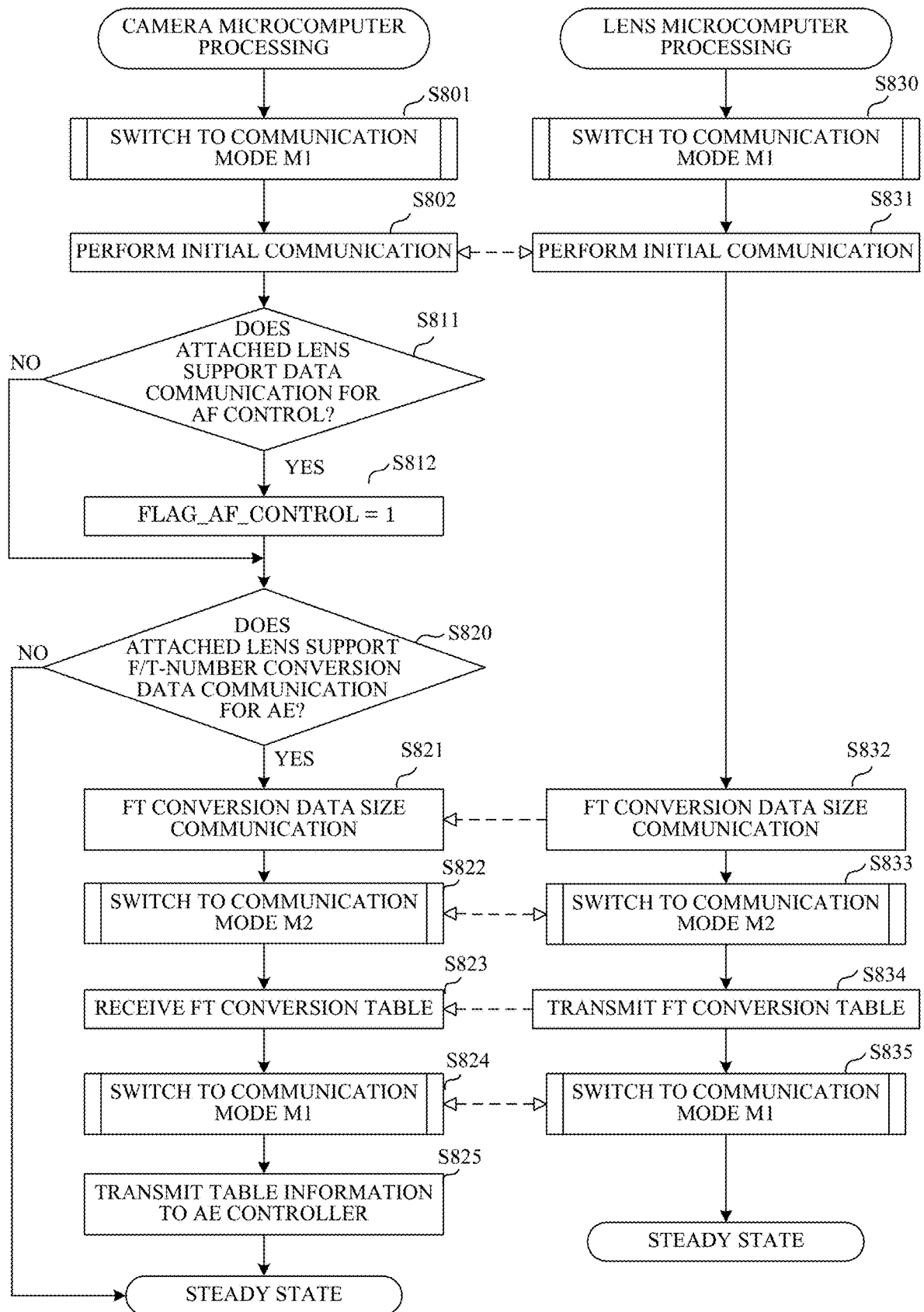
FIG. 8 is a flowchart illustrating initial communication between the image pickup apparatus and the accessory according to the first embodiment.

With reference to FIG. 8, a description will be given of communication processing at the start-up timing in this embodiment. FIG. 8 is a flowchart illustrating the initial communication between the camera main body 200 and the interchangeable lens 100. Steps S801 to S825 describe processing in the camera microcomputer 205, and steps S830 to S835 describe processing in the lens microcomputer 101. The camera microcomputer processing and the lens microcomputer processing can be performed in parallel.

First, in steps S801 and S830, the communication mode is switched to the above-mentioned communication mode M1 in the communicator 208 of the camera microcomputer 205 and in the communicator 103 of the lens microcomputer 101 by the processing described with reference to FIG. 6. Subsequently, in steps S802 and S831, the camera microcomputer 205 and the lens microcomputer 101 exchange information on the function provided by the camera main body 200 and on the function provided by the interchangeable lens 100. In this embodiment, information is exchanged on whether or not the communication function is supported for the AE control and the AF control for a lens optical system in which the transmittance varies from the center of the optical axis in the radial direction.

Subsequently, in step S811, the camera main body 200 determines whether or not the interchangeable lens 100 has a function of communicating the variation information on the pupil intensity distribution and variation information on the depth of field each of which may affect the AF control and may be varied by presence of the optical element 107 in which the transmittance is not uniform (whether or not the interchangeable lens 100 supports communication for variation information). When the lens supports the variation information communication, in step 812, a flag (Flag_AF-_Control) is activated of representing that the communication for the variation information on the pupil intensity distribution and for the variation information on the depth of field is supported. This flag is referred to in communication processing in steady operation, which will be described later.

In this embodiment, it is determined whether or not the communication is supported for the variation information on the pupil intensity distribution and on the depth of field, but different flags may be set to represent whether or not those two pieces of data communication are supported.

Subsequently, in step S820, the camera microcomputer 205 determines whether or not the interchangeable lens 100 has a function of communicating, with the camera main body 200, conversion information for the F-number and the T-number as information for grasping the light amount variation that is used for the AE control and that is caused by the presence of the optical element 107 in which the transmittance varies ununiformly. When the lens supports such communication, the process proceeds to step S821.

Figure 9A:
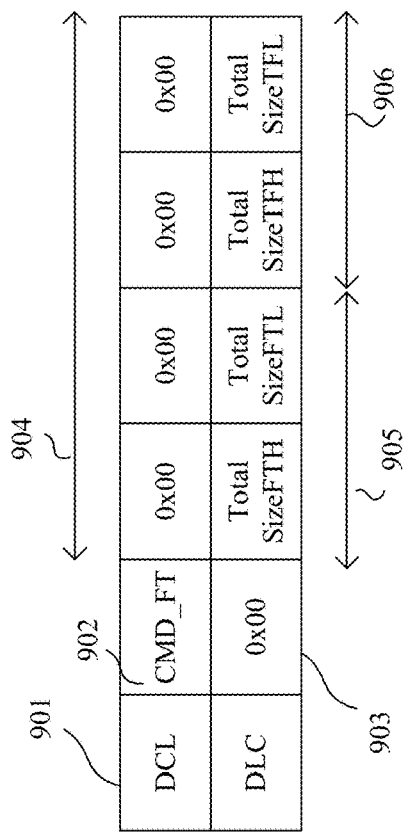
FIGS. 9A and 9B are explanatory diagrams illustrating communication contents for communicating table data used for converting an F-number and a T-number during AE control according to the first embodiment.

In steps S821 and S832, the camera microcomputer 205 and the lens microcomputer 101 perform communication processing for acquiring a total size of data relating to conversion table for the F-number and T-number. Here, with reference to FIGS. 9A and 9B, the data format of this communication is provided as "F-number/T-number conversion table data size communication" 901 of FIG. 9A. This communication processing uses the communication mode M1 described with reference to FIG. 4, and the data is transmitted from the camera microcomputer 205 to the lens microcomputer 101 by the DCL signal, and the camera microcomputer 205 receives data from the lens microcomputer 101 by the DLC signal.

"CMD_FT" 902 is a communication command for acquiring the total size of "F-number/T-number conversion table data communication" described later. "CMD_FT" is defined in advance as a predetermined numerical value that can be recognized by camera microcomputer 205 and lens microcomputer 101. "0x00" 903 is the data transmitted from the lens microcomputer 101 to the camera microcomputer 205 in synchronization with the data communication of 902. In this embodiment, there is no particular data to be communicated at this communication timing, and thus the value does not matter. In this embodiment, as an example, the signal level of the highest data D7 to the lowest data D0 of the lens data signal DLC is maintained in low when data is "0x00".

Similarly, the four-byte data transmitted from the camera microcomputer 205 to the lens microcomputer 101 in 904 is also represented by "0x00". The value does not matter, but in this embodiment, as an example, the signal level of the highest data D7 to the lowest data D0 of the camera data signal DCL is maintained in low when data is "0x00". In synchronization with this four-byte data communication, the data to be transmitted from the lens microcomputer 101 to the camera microcomputer 205 is acquired. That is, as data, a total size of a data structure for conversion from the F-number to the T-number (Total Size FT) and a total size of a data structure for conversion from the T-number to the F-number (Total Size TF) are acquired. Each size is calculated by the following expressions.

Total Size $FT$[byte]=(Total Size $FTH$×256+Total Size $FTL$)[byte]

Total Size $TF$[byte]=(Total Size $TFH$×256+Total Size $TFL$)[byte]

Subsequently, in steps S822 and S833 of FIG. 8, the camera microcomputer 205 and the lens microcomputer 101 perform switching processing to the communication mode M2 described with reference to FIGS. 5A to 5C. The switching processing is performed for shortening processing time at the start-up timing by switching to a faster communication mode, because the communication data size of "F-number T-number conversion table data communication" is large which is communicated in steps S823 and S834.

Subsequently, in steps S823 and S834, the camera microcomputer 205 and the lens microcomputer 101 perform data communication relating to the conversion table of the F-number and the T-number. The data format of this communication is represented as "F-number/T-number conversion table data communication" 910 in FIG. 9B. The communication data consisting of a plurality of bytes represented by 911 is a data structure for converting data from the F-number to the T-number. The size of this data is variable and matches the size of the Total Size FT received in 905. The communication data consisting of a plurality of bytes represented by 912 is a data structure for converting data from the T-number to the F-number. The size of this data is variable and matches the size of the Total Size TF received in 906.

"F-number division number" 913 included in 911 represents the number of elements in a row direction of an F-number/T-number conversion table described later in FIG. 11, and more specifically, is a division number indicating how many discrete F-numbers are included. "F-number divisional resolution" 914 represents the number of stops of each difference of the discrete F-number, which is an element in the row direction of the F-number/T-number conversion table. The value in 914 indicates, for example, ⅛-stop and ¹⁄₁₆-stop. "Focus division number" 915 represents a division number of the focus, which is an element in a column direction of the F-number/T-number conversion table. "F→T conversion table" 916 represents a data value of the contents of the data table to be converted from the F-number to the T-number.

"T-number division number" 917 included in 912 represents the number of elements in a row direction of a T-number/F-number conversion table described later in FIG. 14, and more specifically, represents a division number indicating the number of pieces of discrete T-number are included. "T-number divisional resolution" 918 represents the number of stops in each difference of the discrete T-number, which is an element in the row direction of the T-number/F-number conversion table. The value of 917 is, for example, ⅛-stop or ¹⁄₁₆-stop. "Focus division number" 919 represents the division number of the focus, which is an element in the column direction of the T-number/F-number conversion table. "T→F conversion table" 920 represents a data value of contents of the data table for converting data from T-number to F-number. The number of data structures to be converted from the F-number to the T-number in 913 to 916 and the number of data structures to be converted from the T-number to the F-number in 917 to 920 may not necessarily match.

These pieces of data are transmitted from the lens microcomputer 101 to the camera microcomputer 205 as a lens data signal DLC. Here, in synchronization with each transmission of data from the lens microcomputer 101 to the camera microcomputer 205, each data represented by "0x00" is transmitted from the camera microcomputer 205 to the lens microcomputer 101. The value of "0x00" does not matter, but in this embodiment, as an example, the signal level of the highest data D7 to the lowest data D0 of the lens data signal DLC is maintained in low when the data is "0x00".

In steps S824 and S835 of FIG. 8, the communication mode is returned to M1 because in step S823, the camera microcomputer 205 and the lens microcomputer 101 complete the acquisition of the conversion table data for the F-number and the T-number having large data size. Subsequently, in step S825, the camera microcomputer 205 transmits, to the AE controller 210, the conversion table data for the F-number and the T-number which is required for the AE control and which is acquired in step S823. Thereby, in the subsequent steady operation of the camera main body 200, the AE controller 210 can perform conversion processing for the F-number and the T-number. The conversion table data for the F-number and the T-number which is required for the AE control and which is acquired in step S823 may be stored on the non-volatile memory when the camera power is turned off, and the communication for the conversion table data may be skipped in a case where the same lens is attached when the camera is started up for the second time or later. Alternatively, this data communication may be communicated again every time when the camera power is turned on, or every time when a lens corresponding to the data communication is attached.

Description for Steady AE Control (Diaphragm Priority Mode)

Next, with reference to FIGS. 10 and 11, diaphragm control will be described of when the camera setting of the camera main body 200 is set to the diaphragm priority mode. The diaphragm priority mode is a mode in which the user specifies the F-number according to his/her preference. In this case, the user sets the F-number by operating the user interface 207 of the camera main body 200 or the user interface 120 of the interchangeable lens 100. Information on the F-number specified by the user is input from the camera microcomputer 205 to the AE controller 210. The AE controller 210 determines the light amount corresponding to the specified F-number, and controls exposure based on the shutter speed and ISO sensitivity corresponding to the light amount.

Figure 10:
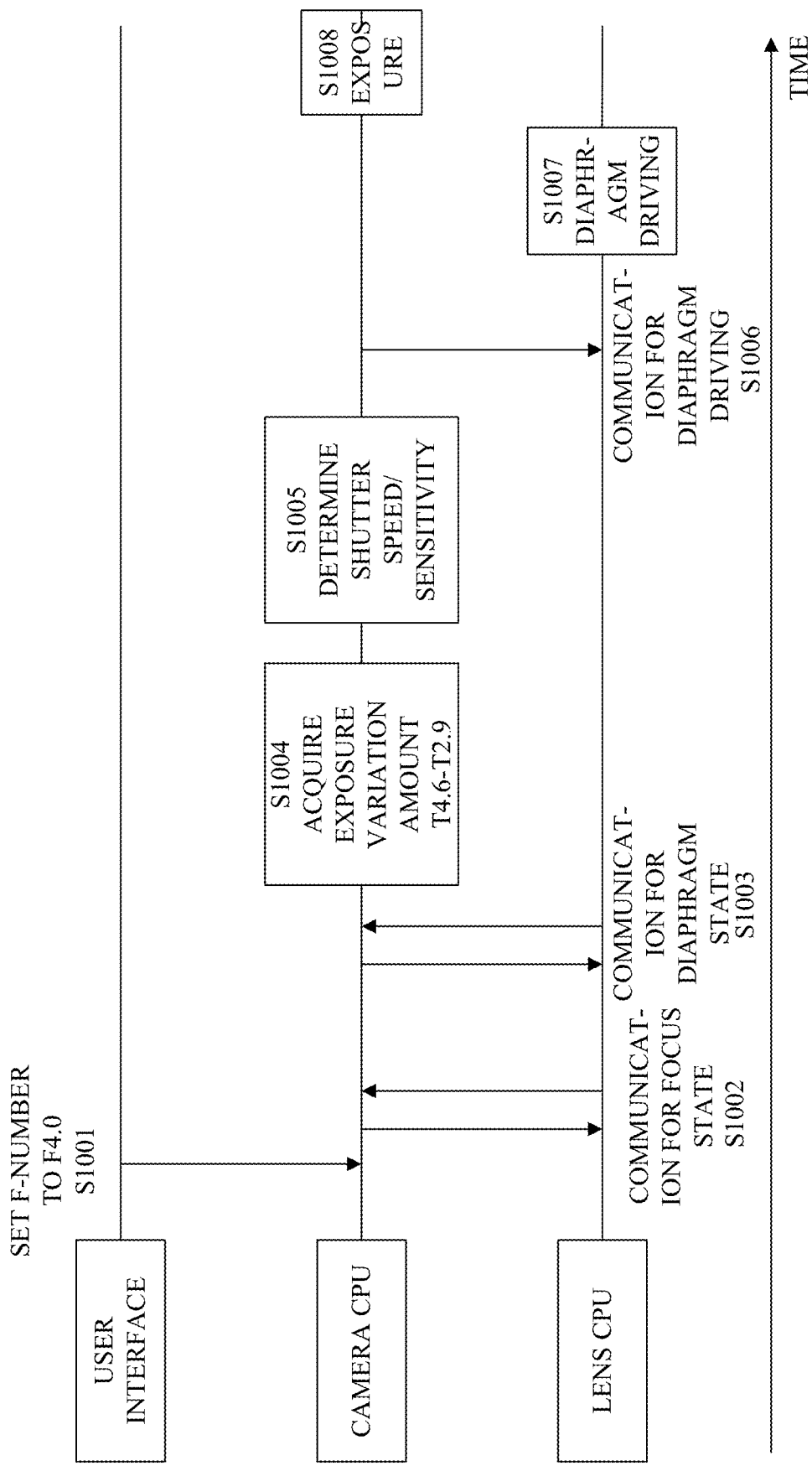
FIG. 10 is an explanatory diagram illustrating diaphragm control in which the image pickup apparatus and the accessory cooperate with each other when the image pickup apparatus is set to a diaphragm priority mode according to the first embodiment.

FIG. 10 is a diagram illustrating communication of information between the camera main body 200 and the interchangeable lens 100 when the diaphragm priority mode is set. FIG. 11 illustrates an example of table data (first table data) for converting an F-number transmitted from the interchangeable lens 100 into a T-number.

Figure 11:
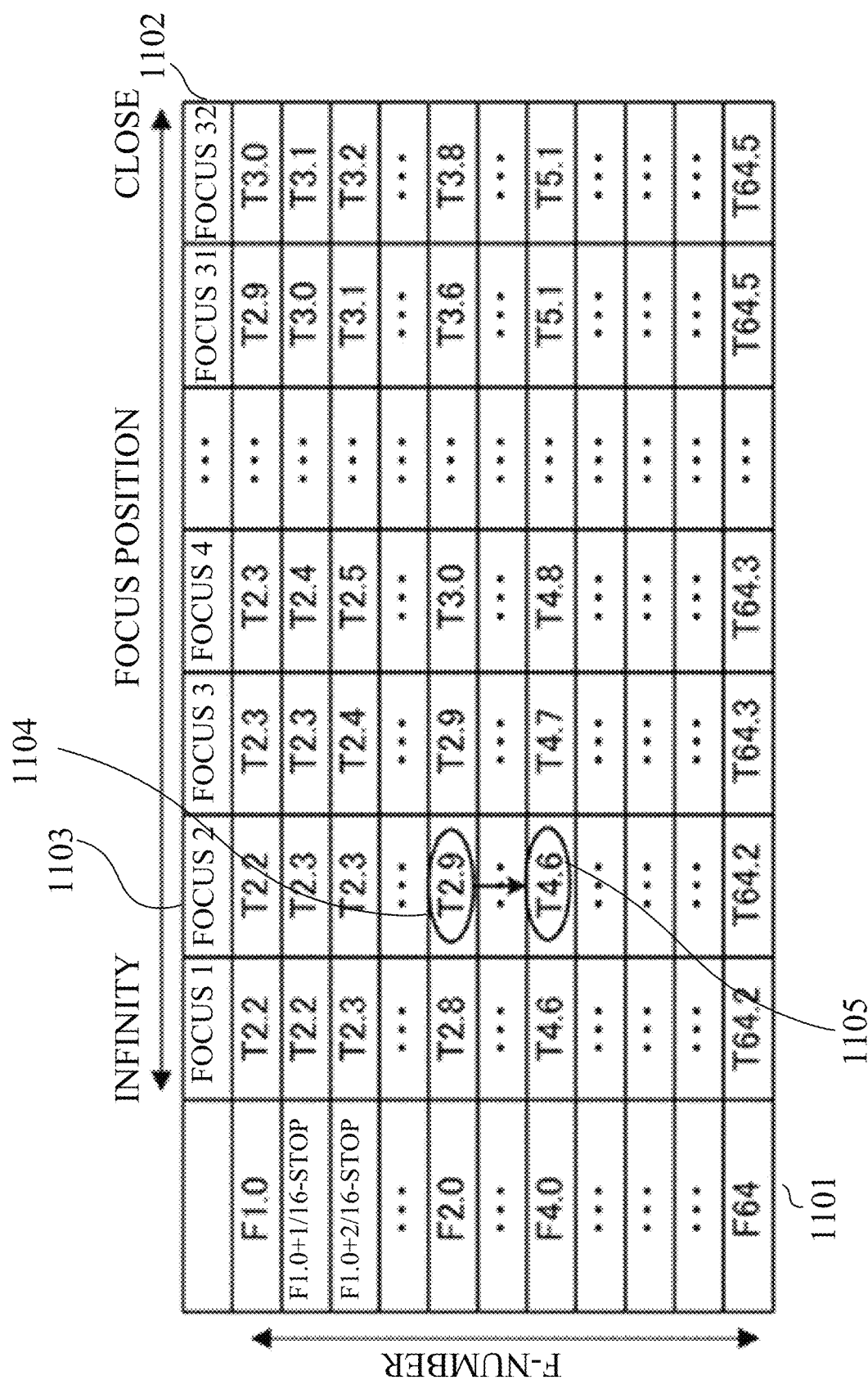
FIG. 11 is an explanatory diagram illustrating a table data configuration for converting an F-number into a T-number according to the first embodiment.

The table data in FIG. 11 is table data from which the T-number can be acquired from two elements of the focus position and the F-number. Each value provided in 1101 of FIG. 11 (F1.0, F1.0+1/16-stop, F1.0+2/16-stop, . . . , F2.0, . . . F4.0, . . . F64) indicates the F-number as an element of table data, and is composed of the number of items of "F-number division number" 913 described with reference to FIG. 9B The difference between each item is defined by "F-number divisional resolution" 914, and in this embodiment, a divisional resolution is 1/16-stop. 1102 indicates focus positions, and includes the number of items of "Focus division number" 915 in FIG. 9B. Regarding this focus position, an area from a focus infinity end to a focus close end is divided into the required number. This division may be equal division or may be division in consideration of optical performance. In this embodiment, as an example, the focus division number is 32.

Each processing step will be described with reference to FIG. 10. At the start of this processing, the table data for converting the F-number to the T-number in steps S806 and S808 of FIG. 8 is input to the AE controller 210 of the camera main body 200.

First, in step S1001, the F-number is set by operating the camera user interface 207 and the lens user interface 120. In this step, the F-number is set to F4.0. Subsequently, in step S1002, the camera microcomputer 205 acquires focus division position information from the lens microcomputer 101 by communication. The focus division position information is acquired to search the column direction 1102 of the table data illustrated in FIG. 11, during the AE control in the step described later. Thereby, a variation in the focus position is taken into account in a case, for example, where the AF control is activated by the user operating the release switch, or where an AF mode such as continuous AF is set in which the AF control is activated without the user operation on the switch. In this embodiment, Focus 2 of 1103 in the table data of FIG. 11 is received as the focus position information.

Subsequently, in step S1003, the camera microcomputer 205 communicates with the lens microcomputer 101 and receives a state of the diaphragm 109, that is also referred to as a diaphragm state. The diaphragm state includes the F-number currently set in the diaphragm 109 and F-number data in a diaphragm open state, which is a reference for the photometry. In this embodiment, the camera microcomputer 205 receives F2.0 as the F-number currently set in the diaphragm 109.

Subsequently, in step S1004, the AE controller 210 uses the table data of FIG. 11 and acquires a variation amount in the T-number when the F-number currently set in the camera main body 200 is changed to the F-number set by the user operation. In this embodiment, the current focus position is Focus 2 in step S1002, and the F-number set in the current camera main body 200 is F2.0 in step S1003. As indicated by 1104 of the table data in FIG. 11, the current T-number is calculated to be T2.9.

Next, as indicated by 1105 of FIG. 11, the T-number is calculated to be T4.6 when the focus position is Focus 2 and the F-number is F4.0. Thus, when the F-number is changed from F2.0 to F4.0 by the user operation, the T-number changes from T2.9 to T4.6.

Subsequently, in step S1005, the AE controller 210 determines the shutter speed and ISO sensitivity at which exposure is optimal by using the variation amount of the T-number acquired in S1004. Subsequently, in step S1006, the camera microcomputer 205 communicates with the lens microcomputer 101 to drive the diaphragm 109 to the F-number (F4.0 in this embodiment) set by the user. Subsequently, in step S1007, the lens microcomputer 101 drives the diaphragm 109 based on a diaphragm driving request received from the camera microcomputer 205. When the user is operating the release switch in step S1002, the diaphragm driving control in step S1007 is the diaphragm driving for still image exposure processing, and in step S1008, the camera microcomputer 205 opens the shutter 209 and exposure processing is performed for the still image pickup.

As described above, in this embodiment, the table data for converting data from the F-number to the T-number is transmitted to the camera main body 200 at the timing when the interchangeable lens 100 is attached to the camera main body 200, which is the timing earlier than the AE control. Thereby, by searching the table data, it is possible to acquire a variation amount in the light amount at the timing of the AE control, in the diaphragm control in a case where the image pickup mode of the camera main body 200 is set to the diaphragm priority mode. It becomes unnecessary to acquire the variation amount in the light amount from the interchangeable lens 100 via the communication processing every time the F-number setting is changed, and thus it is possible to avoid occurrence of the communication processing for conversion between the F-number and the T-number. The consumption can be suppressed of the communication band, and, for example, even if the image pickup cycle has a high frame rate, it is possible to avoid lack of the communication band, and processing is not necessary of reducing the communication amount at an expense of the function. It is also possible to avoid a decrease in the frame-capturing rate caused by a communication control delay in the high-speed continuous image-pickup mode during the still image pickup.

In JP H10-268382, the image pickup system is optically designed so that transmittance decreases from the center of the optical axis in the radial direction and that the blurring effect is generated, and the lens side converts the diaphragm control amount based on an instruction of the diaphragm driving amount from the camera, so as to satisfy the light amount variation expected by the camera. However, since a decreasing degree of the transmittance and the resolution of the diaphragm control do not match, and since the resolution of the diaphragm control is coarser than the decreasing degree, the image pickup system of JP H10-268382 cannot always convert the diaphragm amount so as to satisfy the variation amount of the light amount expected by the camera. As a result, the blurring effect expected by the user cannot be obtained. On the other hand, according to the configuration of this embodiment, after grasping the variation amount in the light amount on the camera side by acquiring the T-number from the F-number, the other exposure control parameters such as a shutter speed and an ISO sensitivity are determined. Thereby, this embodiment can perform image pickup at the depth of field of the F-number set by the user and can acquire a proper blurring effect.

Figure 12:
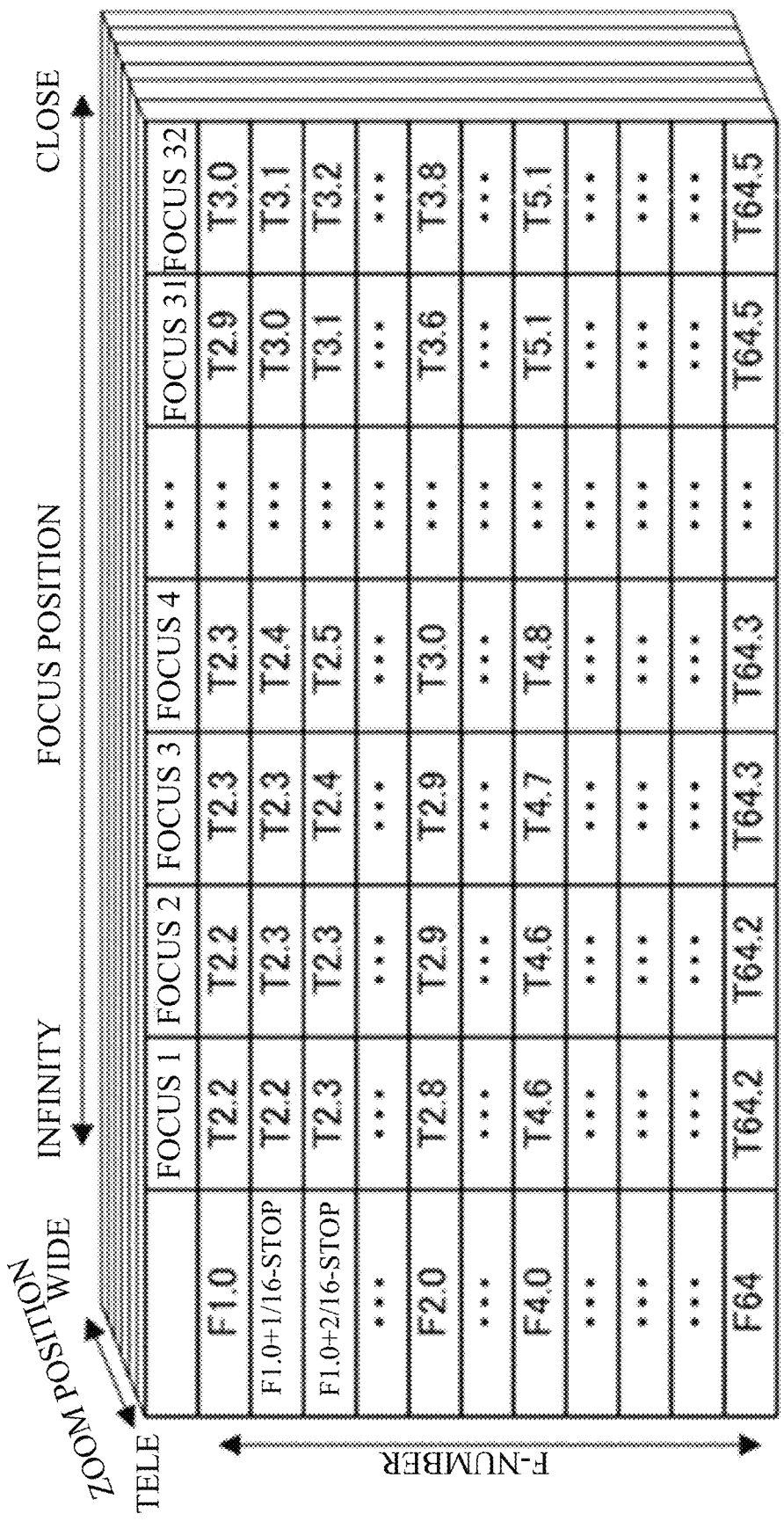
FIG. 12 is an explanatory diagram illustrating a table data configuration for converting an F-number into a T-number in consideration of a zoom variation according to the first embodiment.

In this embodiment, when an image is captured in the diaphragm priority mode, the diaphragm control is performed by using the table data of FIG. 11, but table data of FIG. 12 may be used. In FIG. 11, the table data is composed of two elements, that is the F-number and the focus position, but in FIG. 12, zoom position information is further added as a component. When the table data of FIG. 12 is used, the zoom division number information is also added to the communication data consisting of the plurality of bytes indicated by 911 of FIG. 9B and to the communication data consisting of the plurality of bytes indicated by 912 of FIG. 9B.

Description for Steady AE Control (Shutter Speed Priority Mode)

Next, with reference to FIGS. 13 and 14, the diaphragm control will be described of a case of image pickup in the shutter speed priority mode. The shutter speed priority mode is a mode in which the user specifies a shutter speed according to his/her preference. In this case, the user sets the shutter speed by operating the user interface 207 provided on the camera main body 200 or the user interface 120 provided on the interchangeable lens 100. The shutter speed information specified by the user is input from the camera microcomputer 205 to the AE controller 210. The AE controller 210 determines the light amount for achieving the specified shutter speed, and transmits the F-number corresponding to the light amount to the lens microcomputer 101 as a diaphragm target value.

Figure 13:
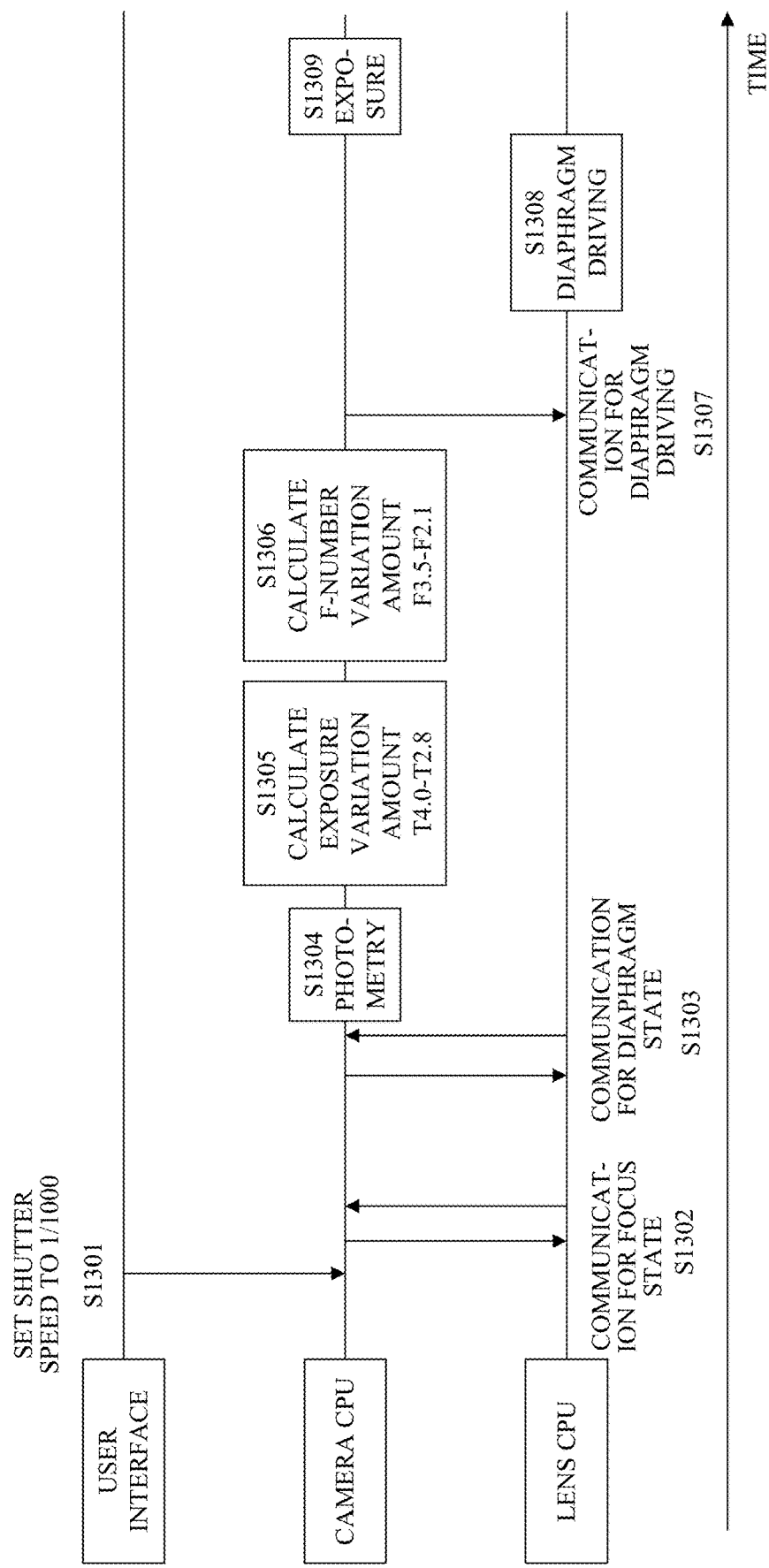
FIG. 13 is an explanatory diagram illustrating diaphragm control in which the image pickup apparatus and the accessory cooperate with each other when the image pickup apparatus is set to a shutter priority mode according to the first embodiment.

FIG. 13 is a diagram illustrating communication of information between the camera main body 200 and the interchangeable lens 100 when the shutter speed priority mode is set. FIG. 14 illustrates an example of table data (second table data) for converting a T-number transmitted from the interchangeable lens 100 into an F-number.

Figure 14:
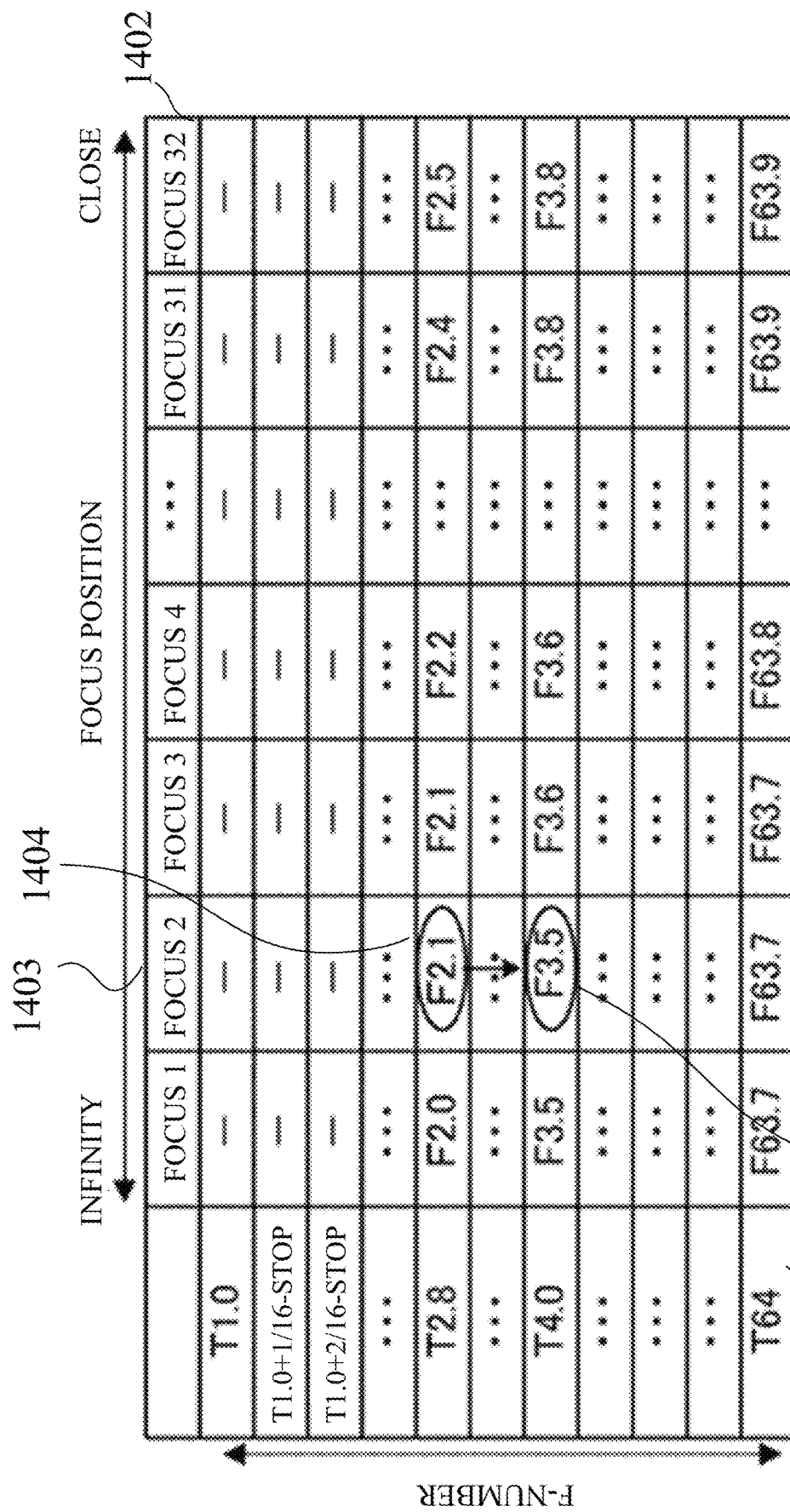
FIG. 14 is an explanatory diagram illustrating a table data configuration for converting a T-number into an F-number according to the first embodiment.

The table data in FIG. 14 is table data from which the F-number can be acquired using two elements of the focus position and the T-number. Each value in 1401 of FIG. 14 (T1.0, T1.0+$\frac{1}{16}$-stop, T1.0+$\frac{2}{16}$-stop, . . . , T2.8, . . . T4.0, . . . T64) indicates the T-number as an element of the table data, and is composed of the number of items of "T-number division number" 917 in FIG. 9B. The difference between each item is defined by "T-number divisional resolution" 918, and in this embodiment, the divisional resolution is $\frac{1}{16}$-stop.

Figure 9B:
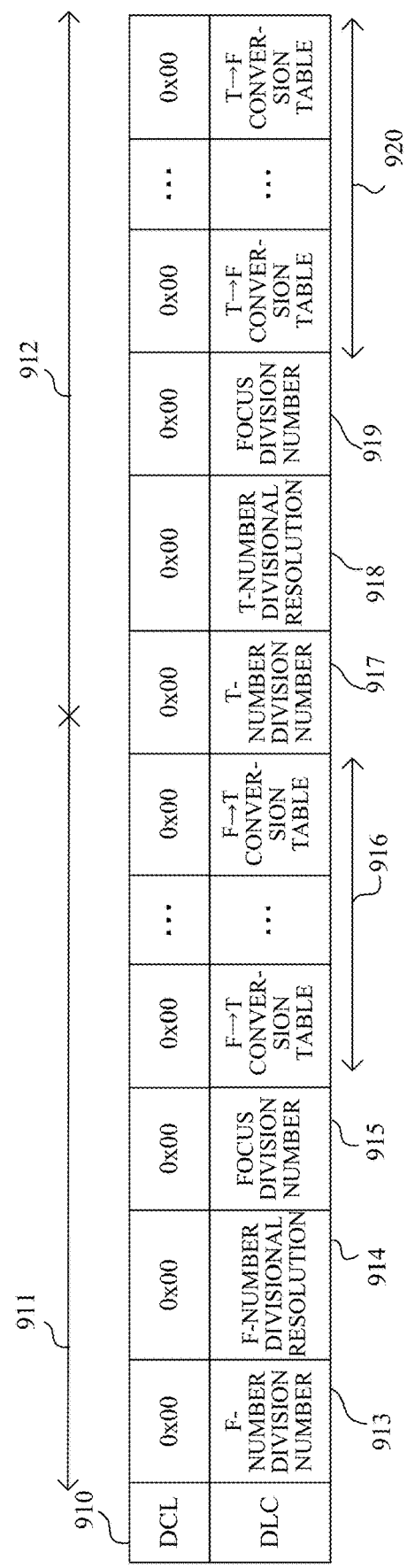

1402 indicates the focus position, and is composed of the number of items of "Focus division number" 919 in FIG. 9B. Regarding this focus position, an area from a focus infinity end to a focus close end is divided into a required number. This division may be equal division or may be division in consideration of the optical performance. In this embodiment, the focus division number is set to 32 as an example.

Each processing step will be described with reference to FIG. 13. At the start of this processing, the table data for converting the T-number to the F-number in steps S806 and S808 of FIG. 8 is input to the AE controller 210 of the camera main body 200.

First, in step S1301, a shutter speed is set by operating the camera user interface 207 and the lens user interface 120. In this step, the shutter speed is set to $\frac{1}{1000}$.

Subsequently, in step 1302, the camera microcomputer 205 acquires the focus division position information from the lens microcomputer 101 by communication. The focus division position information is acquired for searching a column direction 1402 of the table data given in FIG. 14 during the AE control in step described later. Thereby, a variation in the focus position is taken into account in a case, for example, where the AF control is activated by the user operating the release switch, or where the AF mode such as the continuous AF is set in which the AF control is activated without the user operation on the switch. In this embodiment. Focus 2 indicated in 1403 in the table data of FIG. 14 is received as the focus position information. Subsequently, in step S1303, the camera microcomputer 205 communicates with the lens microcomputer 101 and receives a state of the diaphragm 109, that is the diaphragm state.

Subsequently, in step S1304, the light amount is measured, that is photometry is performed, the light amount entering the photometry sensor (not illustrated) configured in the AE controller 210. In this embodiment, a current T-number is measured to be T2.8 which is acquired by the photometry processing. Subsequently, in step S1305, the AE controller 210 calculates an optimum variation amount of the exposure when the shutter speed is $\frac{1}{1000}$ by using the light amount T-number acquired in step S1304 and the setting at the time of photometry. In this embodiment, a control target value is determined which changes the T-number of the AE controller 210 from T2.8 to T4.0.

Subsequently, in step S1306, the AE controller 210 determines an F-number, with which the optimum exposure can be acquired, from the current F-number by using the table data of FIG. 14. In this embodiment, the current focus position is Focus 2 in step S1302, and the light amount value is T2.8 from the result of the photometry processing of the current camera main body 200 in step S1303. It is assumed that the light amount is changed to T4.0 by the diaphragm when the shutter speed $\frac{1}{1000}$ specified by the user is realized. According to the search of the table data in FIG. 14, the F-number corresponding to T2.8 is F2.1 as indicated in 1404, and the F-number corresponding to T4.0 is F3.5 as indicated in 1405. As the diaphragm control amount, the camera microcomputer 205 transmit a request of the diaphragm driving of F3.5-F2.1 to the lens microcomputer 101 by communication.

Subsequently, in step S1308, the lens microcomputer 101 drives the diaphragm 109 based on the diaphragm driving request received from the camera microcomputer 205. When the user operates the release switch in step S1302, step S1308 is the diaphragm driving for the still image pickup, and thus the camera microcomputer 205 opens the shutter 209, and performs the exposure processing for the still image pickup.

As described above, in this embodiment, the table data for converting data from the T-number to the F-number is transmitted to the camera main body 200 at the timing when the interchangeable lens 100 is attached to the camera main body 200, which is the timing earlier than the AE control. Thereby, by searching the table data, it is possible to acquire a diaphragm control value by converting the variation amount in the light amount at the timing of AE control, in the diaphragm control in a case where the image pickup mode of the camera main body 200 is set to the shutter speed priority mode. It becomes possible to avoid occurrence of the communication processing for conversion processing. The consumption can be suppressed of the communication band, and, for example, even if the image pickup cycle has a high frame rate, it is possible to avoid lack of the communication band, and processing is not necessary of reducing the communication amount at an expense of the function. It is also possible to avoid a decrease in the frame-capturing rate caused by a communication control delay in the high-speed continuous image-pickup mode during the still image pickup.

Figure 15:
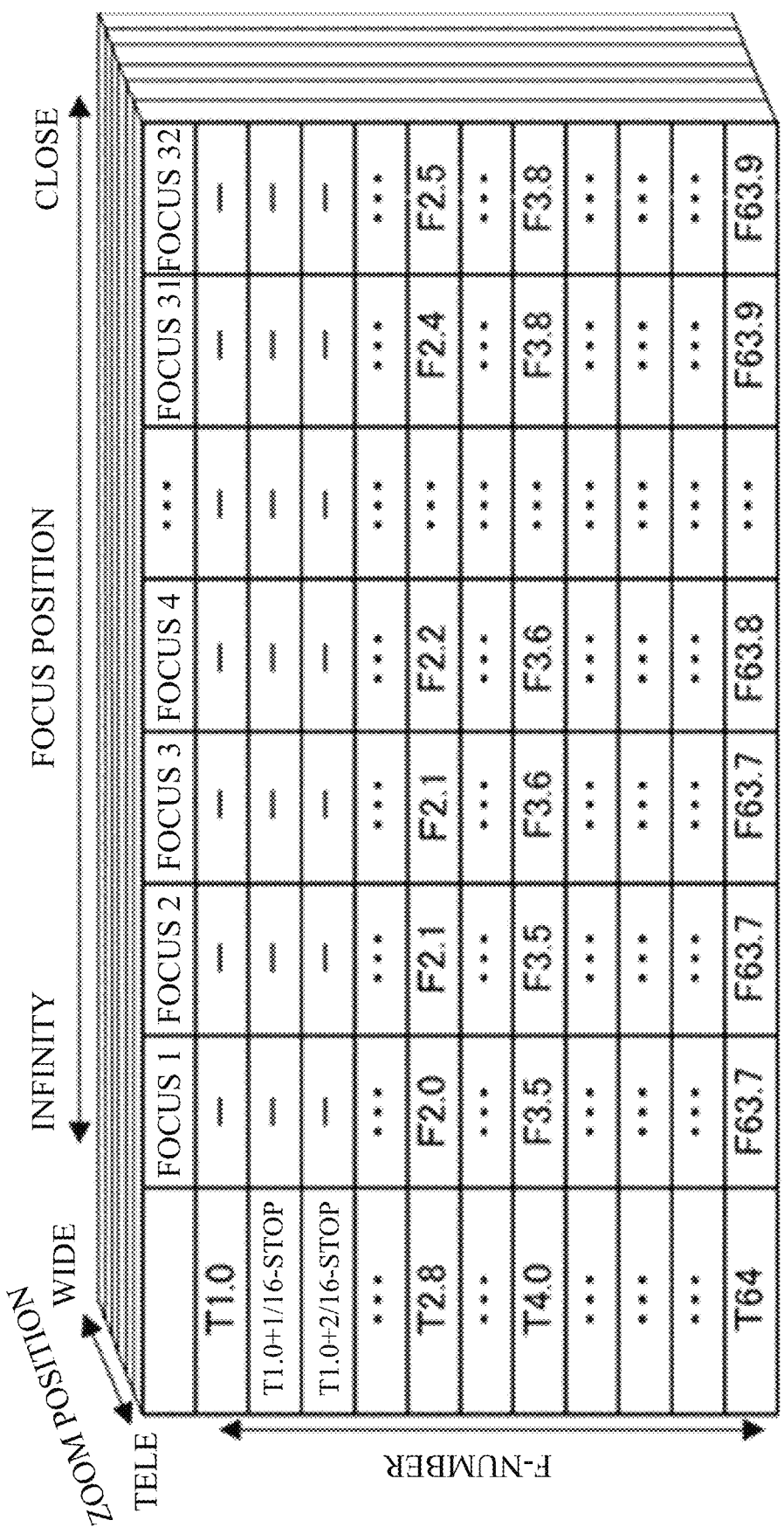
FIG. 15 is an explanatory diagram illustrating a table data configuration for converting a T-number into an F-number in consideration of the zoom variation according to the first embodiment.

In this embodiment, when an image is captured in the diaphragm priority mode, the diaphragm control is performed using the table data of FIG. 14, but table data of FIG. 15 may be used. In FIG. 14, the table data is composed of two elements, that is the F-number and the focus position, but in FIG. 15, zoom position information is further added as a component. When the table data of FIG. 15 is used, the zoom division number information is also added to the communication data consisting of the plurality of bytes indicated by 911 of FIG. 9B and to the communication data consisting of the plurality of bytes indicated by 912 of FIG. 9B.

Description for Operation Inside Camera During Live View

Figure 16:
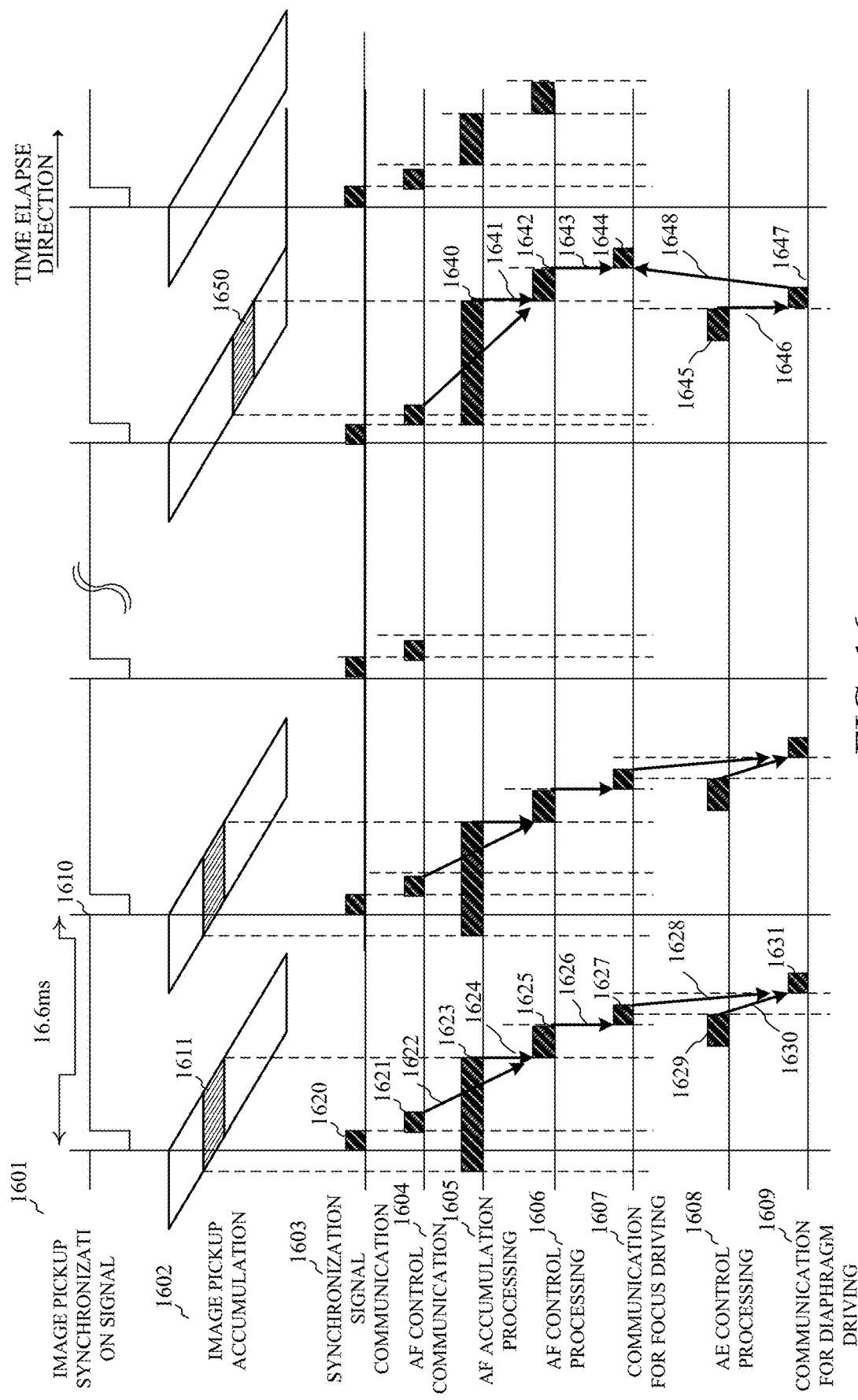
FIG. 16 is an explanatory diagram illustrating steady live view operation including operation of the AE control and of the AF control according to the first embodiment.

Next, with reference to FIG. 16, a steady live view operation will be described including the operation for the AE control and for the AF control during the operation in the diaphragm priority mode described with reference to FIG. 10 or the shutter speed priority mode described with reference to FIG. 13. FIG. 16 is a timing chart in which a horizontal axis represents a time elapsed direction and a vertical axis represents the communication processing between the camera microcomputer 205 and the lens microcomputer 101 and the operation items of each control block. Here, the control during the live view is described as an example.

A reference numeral 1601 represents an image pickup synchronization signal, which indicates start timing of charge accumulation control for the image sensor 201 represented by reference numeral 1602. The image pickup synchronization signal is generated at a cycle according to the frame rate, and is input to the camera microcomputer 205 as a vertical synchronization signal of reference numeral 1610 at a cycle of, for example, 16.6 ms in the case of 60 fps control. A reference numeral 1611 represents charge accumulation control timing for the image sensor 201 for a position where the AF frame set on the display 206 exists. A reference numeral 1603 represents synchronization signal communication for communicating the accumulation timing of the image sensor between the camera main body 200 and the interchangeable lens 100, and communication is performed using the vertical synchronization signal of 1610 as a trigger.

A reference numeral 1604 represents AF control communication that performs various communication necessary for performing the AF control. In the AF control communication of 1604, for example, the position information of the focus lens 105 is acquired and the focus sensitivity information as a conversion coefficient for converting the defocus amount detected by the AF controller 211 into the driving amount of the focus lens 105. In the AF control communication of 1604, defocus correction data is acquired which is generated by optical aberration, and information is acquired on the aperture diameter of the diaphragm 109 detected by the diaphragm position sensor 115. In the AF control communication of 1604, the variation information on the pupil intensity distribution used for the AF detection processing and the depth-of-field information used for the search velocity and the in-focus determination are acquired.

A reference numeral 1605 represents accumulation processing (AF accumulation processing) period of the image sensor 201 for performing the AF control. This accumulation processing timing changes depending on the position of the AF frame set on display 206. When the AF frame is set near the center of the display 206 in the vertical direction, the timing of 1611 is the accumulation timing of the AF signal. On the other hand, when the AF frame is set downward on the screen of display 206, the accumulation timing of the AF signal is delayed from 1611 as indicated by 1650.

A reference numeral 1606 represents the AF control processing by the AF controller 211. The AF control processing 1606 is processing in which the focus lens driving amount is calculated for focusing on the object by processing the AF signal and by calculating a defocus amount of the object, or in which the driving amount of the focus lens is calculated by predicting a moving amount of the object. A reference numeral 1607 represents processing of communicating a request for driving the focus lens 105 from the camera microcomputer 205 to the lens microcomputer 101, that is, processing of focus driving communication.

A reference numeral 1608 represents the AE control processing by the AE controller 210. The AE control processing 1608 is processing of measuring the light amount using the photometry sensor and for properly controlling the exposure according to the mode set in the camera and user operation. A reference numeral 1609 represents processing of communicating a request for driving the diaphragm 109 from the camera microcomputer 205 to the lens microcomputer 101, that is, processing of diaphragm driving communication.

Each of reference numerals 1620 to 1631 represents timing at which each processor of 1601 to 1609 described above is processed. When the image pickup synchronization signal is generated in 1601, the camera microcomputer 205 performs the synchronization signal communication to the lens microcomputer 101 in 1620. Subsequently, in 1621, the data communication required for the AF control is performed, and the AF accumulation processing in 1623 is performed in parallel with the processing of 1621. Data required for the AF control is acquired from lens microcomputer 101 by the processing in 1621, and the AF control processing in 1606 starts when the AF accumulation processing is completed by the processing 1605. Each of arrows 1622 and 1624 represents the order of the processing described here. When the AF control processing in 1625 is completed, the lens microcomputer 101 is requested to drive the focus lens 105 at the timing 1627.

The AE control processing is performed at the timing 1629 in parallel with the AF control from 1621 to 1627, and thereafter the lens microcomputer 101 is requested to drive the diaphragm 109 in 1631. As a start condition of the diaphragm driving request in 1631, the arrow 1628 uses completion of the focus driving request in 1627 because only one communication path exists between the communicator 208 of the camera main body 200 and the communicator 103 of the interchangeable lens 100, and it is necessary to exclusively execute the communication request. This restriction does not occur when there are a plurality of communication paths between the camera main body 200 and the interchangeable lens 100.

As described above in the description for 1605, each of the reference numerals 1640 to 1648 represents timing at which each processor is processed in a case the position of the AF frame is changed. This case is different from the case described above in 1621 to 1631 in that the AF signal processing delays and the AE control completes relatively earlier, and a driving request 1644 of the focus lens 105 is executed after the communication in 1647 is executed of the driving request for the diaphragm 109.

Description for AF Controller

Figure 17A:
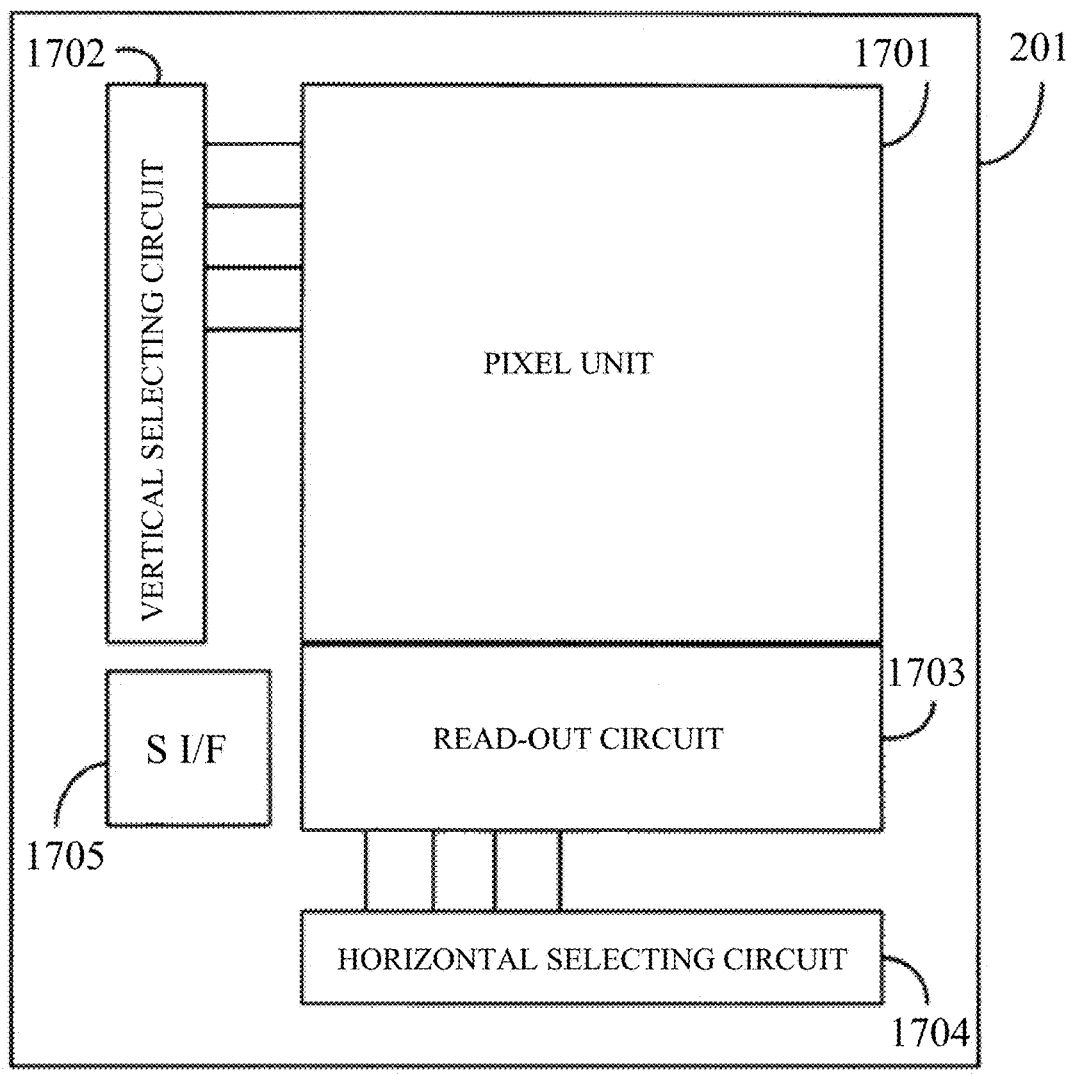
FIGS. 17A and 17B are schematic diagrams illustrating an image sensor according to the first embodiment.
Figure 17B:
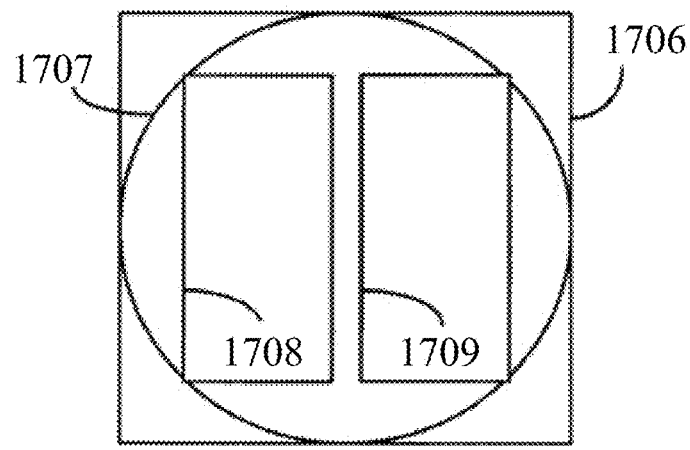

Next, the AF control of this embodiment will be described with reference to FIGS. 17A and 17B. FIGS. 17A and 17B are schematic views illustrating the image sensor 201 in this embodiment. FIG. 17A is an overall schematic view illustrating the image sensor 201, and FIG. 17B is a schematic diagram illustrating one pixel of the image sensor 201. In FIG. 17A, the image sensor 201 includes a pixel unit 1701 having a plurality of pixels arranged in a two-dimensional array, a vertical selecting circuit 1702 configured to select a row of the pixel unit 1701, and a horizontal selecting circuit 1704 configured to select a column of the pixel unit 1701. The image sensor 201 includes a read-out circuit 1703 configured to read out a signal of the pixel selected by the vertical selecting circuit 1702 among the pixels of the pixel unit 1701, and a serial interface 1705 (SI/F) configured to acquire information such as an operation mode of each circuit. The read-out circuit 1703 includes a memory configured to store signals, a gain amplifier, an AD converter, and the like for each column. In addition to the components illustrated in FIG. 17A, the image sensor 201 includes, for example, a timing generator or a control circuit, the timing generator being configured to supply timing to the vertical selecting circuit 1702, the horizontal selecting circuit 1704, the signal read-out circuit 1703, and the like. The vertical selecting circuit 1702 sequentially selects the pixel signals of a plurality of rows of the pixel unit 1701 and reads them out to the read-out circuit 1703. The horizontal selecting circuit 1704 sequentially selects a plurality of pixel signals read by the read-out circuit 1703 for each column.

In FIG. 17B, a reference numeral 1706 denotes one pixel in the pixel unit 1701. The pixel 1706 includes one microlens 1707. The pixel 1706 includes two photodiodes (PD1708, 1709) for performing phase difference type focus detection processing in the image pickup plane. In addition to the components illustrated in FIG. 17B, the pixel 1706 includes, for example, a pixel amplification amplifier for reading out a photodiode (PD) signal to the read-out circuit 1703, a selection switch for selecting a row, and a reset switch for resetting the photodiode signal.

Figure 18:
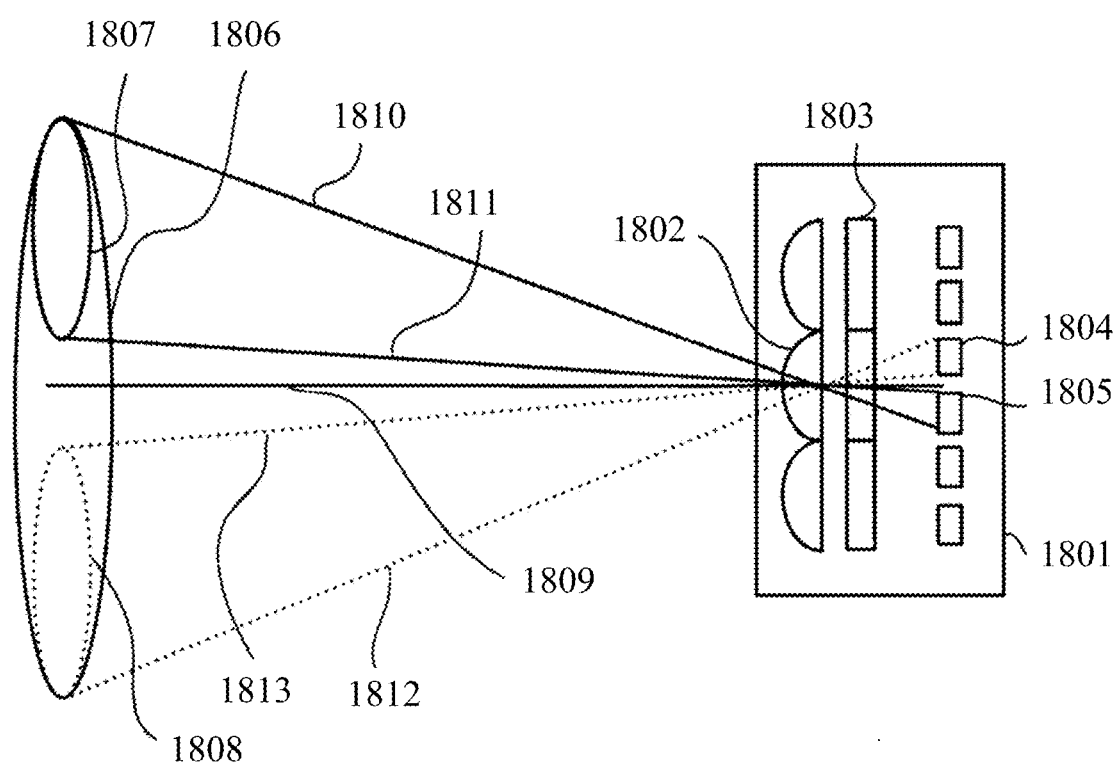
FIG. 18 is an explanatory diagram illustrating an image sensor receiving light according to the first embodiment.

Next, with reference to FIG. 18, light reception in the image sensor 201 will be described. FIG. 18 is a conceptual diagram illustrating a light beam entering the image sensor 201, the light beam being emitted from the exit pupil of the optical element 107 as the image pickup lens configured in the interchangeable lens 100 of this embodiment. FIG. 18 schematically illustrates a focus detection method of the phase difference method.

A reference numeral 1801 denotes an image sensor (section of image sensor 201). A reference numeral 1802 denotes a microlens (microlens 1707 in FIG. 17B), and a reference numeral 1803 denotes a color filter. Reference numerals 1804 and 1805 denote photodiodes (PD), which correspond to PDs 1708 and 1709 in FIG. 17B, respectively. A reference numeral 1806 denotes an exit pupil of the optical element 107 as an image pickup lens.

In this embodiment, the center of the light beam emitted from the exit pupil 1806 is the optical axis 1809 for the pixel having the microlens 1802. The light beam emitted from the exit pupil 1806 enters the image sensor 1801 along the optical axis 1809 as a center. Reference numerals 1810 and 1812 denote outermost light rays of the light beam passing through partial areas in 1807 and 1808 of the exit pupil 1806 of the optical element 107 as the image pickup lens. As illustrated in FIG. 18, of the light beam emitted from exit pupil 1806, upper part of the light beam enters the PD 1805 and the lower part of the light beam enters the PD 1804, with the optical axis 1809 as a boundary. That is, each of the PD 1804 and the PD 1805 receives the light beam passing through different area of the exit pupil 1806 of the optical element 107 as the image pickup lens.

The image sensor 201 is configured by two-dimensionally arranging A-line pixels and B-line pixels as pixels that receive the light beam passing through different area of the exit pupil in the optical element 107 as an image pickup lens. Regarding the output of the A-line pixel and the B-line pixel, a two-image distance (AB image distance) changes depending on whether it is in an in-focus state, in a front focus state, or in a rear focus state. The AF control is realized by moving the focus lens 105 so that the distance of this two-image becomes the distance of the in-focus state. The optical element 107 of this embodiment is the optical system in which the transmittance varies from the center of the optical axis in the radial direction. Hence, the relationship between the A image and the B image is not determined only by the refining amount. The relationship between the A image and the B image changes due to a variation in transmittance by which the center-of-gravity position of the received image signal changes. In such an optical system in which the change in transmittance is not uniform, the accuracy can be improved of focus detection by considering the change in the transmittance distribution of the light beam entering the focus detection pixel.

In this embodiment, the focus detection processing described above is performed by the phase difference AF unit 212 of the AF controller 211. The AF control is performed by a series of operation of calculating the defocus amount as the focus shift amount on the image plane by the signal processing of the pixel for focus detection, of inputting the defocus amount to the focus control AF unit 213, and of driving the focus lens 105.

Figure 19A:
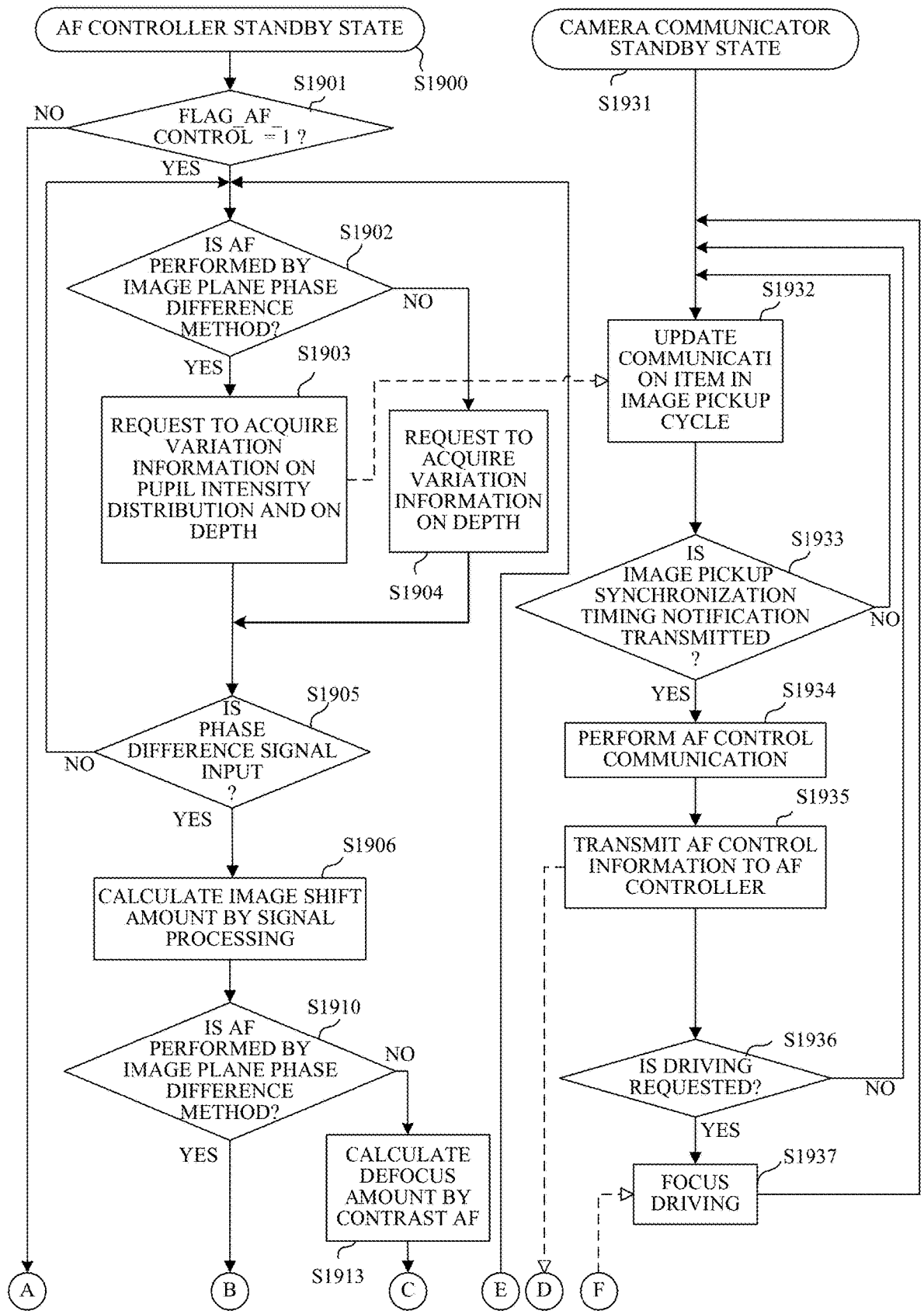
FIGS. 19A and 19B are flowcharts illustrating operation of an AF controller according to the first embodiment.
Figure 19B:
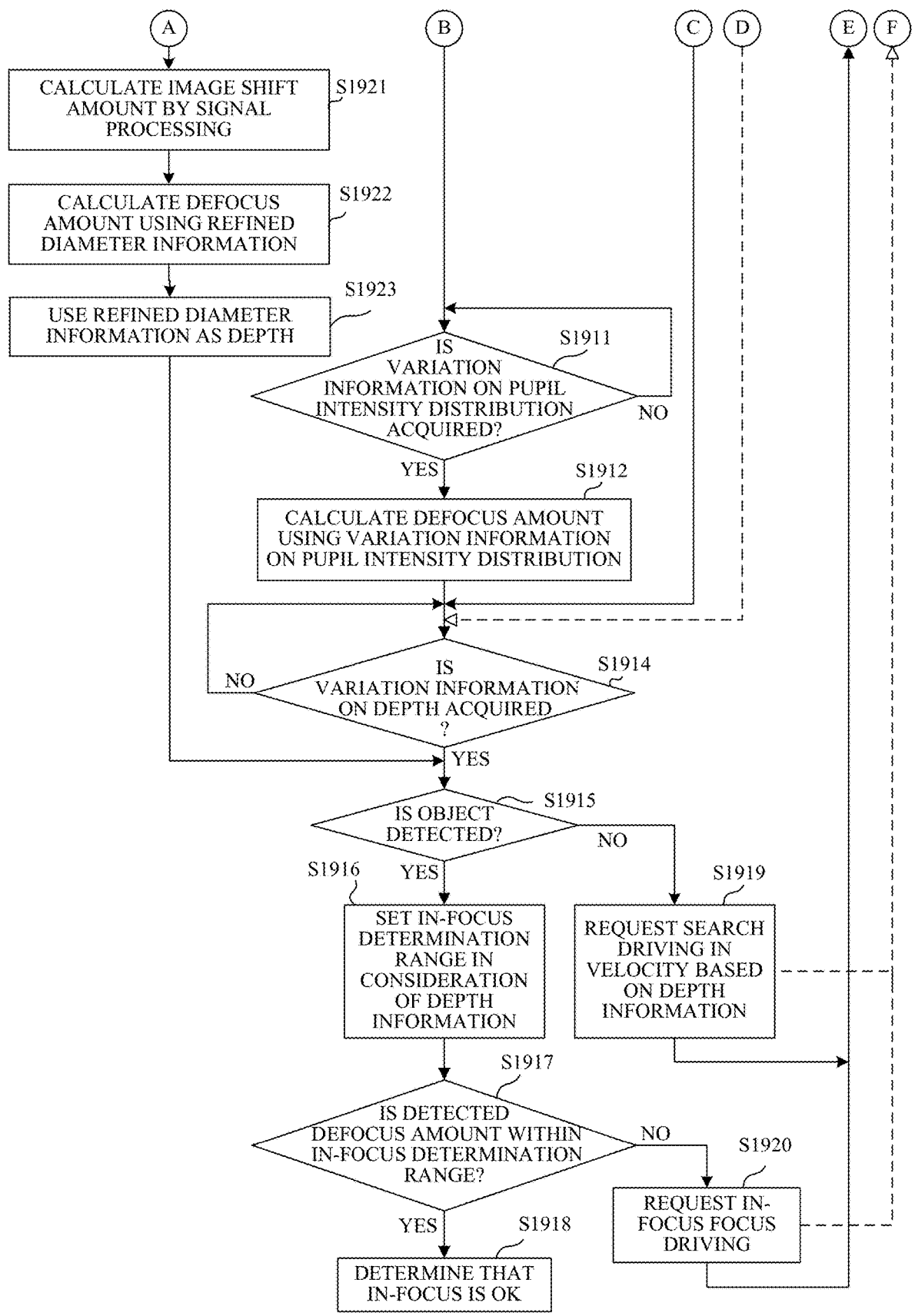

Next, referring to FIGS. 19A and 19B, operation will be described of the AF controller 211 when the signal processing circuit 203 inputs the variation information on the pupil intensity distribution used for the AF processing, the depth-of-field information used for the search velocity and for the in-focus determination, and the pixel signal for the focus detection. Parameters of the variation information on the pupil intensity distribution and the depth-of-field information are transmitted from the lens microcomputer 101 via the communicators 103 and 208. FIGS. 19A and 19B are flowcharts illustrating the operation on the AF controller 211. Steps S1900 to S1923 describe the operation on the AF controller 211, and steps S1931 to S1937 describe the operation on the communicator 208 of the camera main body 200.

First, in step S1900, the state is indicated that the AF control is standby. For example, the camera main body 200 is in a state of operating in a live view mode in which images are constantly captured by the image sensor 201. Subsequently, in step S1901, it is determined whether or not the flag (Flag_AF_Control) determined in step S812 of FIG. 8 is valid. When the flag is off, the interchangeable lens 100 does not support the data communication for the AF control, and the process proceeds to step S1921.

In step S1902, the AF controller 211 determines whether or not to perform the focus detection processing by the phase difference signal stored on the image sensor 201 described with reference to FIGS. 17A, 17B and 18. This determination processing is performed because the focus detection processing using the phase difference signal may not be performed by selecting the image pickup mode or the like according to the operation on the camera user interface 207. The focus detection processing using the phase difference signal is not performed in a case, for example, where contrast AF control is performed to search for a focus position where a contrast component has a peak, or where a manual focus mode is set. When the focus detection processing using a phase difference signal is performed, the communicator 208 of the camera main body 200 is instructed to acquire the variation information on the pupil intensity distribution and the variation information on the depth of field from the lens microcomputer 101 in step S1903. Although it is not illustrated, the F-number is received together with these pieces of information.

As described with reference to FIG. 18, the variation information on the pupil intensity distribution is necessary information to grasp the variation in the center-of-gravity position of the light-receiving area when the phase difference signal is detected, and to improve the accuracy of the focus detection control. The above-described conversion coefficient is usually specified by using the F-number, the conversion coefficient being used in the focus detection of the phase difference detection method using the phase difference signal. However, as described above, since the optical element 107 of this embodiment is configured so that the transmittance of the central portion is higher than the transmittance of the peripheral portion, the influence of the base length corresponding to the F-number differs from the base length affected by the optical element 107. At this time, if this conversion coefficient is calculated using the F-number, an error may occur in the focus detection result of the phase difference detection method. In this embodiment, by calculating the conversion coefficient using the variation information on the pupil intensity distribution instead of the F-number, the focus detection can be realized of an accurate phase difference detection expression considering the transmittance of the optical element 107.

On the other hand, the variation information on the depth of field is used instead of the search driving velocity when the object is not captured and instead of the F-number in the in-focus determination when the object is detected, which will be described later. Thereby, it is possible to prevent the search velocity from decreasing and to optimally perform the in-focus determination.

When the focus detection processing using the phase difference signal is not performed at the time of selecting the current image pickup mode of the camera main body 200 in step S902, in step S904, the AF controller 211 instructs the communicator 208 of the camera main body 200 to acquire the variation information on the depth of field from the lens microcomputer 101. The F-number is received together with the variation information on the depth of field (not illustrated).

In step S1905, the AF controller 211 waits for the input of the phase difference signal from the signal processing circuit 203 to the phase difference AF unit 212 of the AF controller 211. When the phase difference signal is input in step S1905, the process proceeds to step S1906. In step S1906, the AF controller 211 calculates the image shift amount by signal processing using the phase difference signal.

Subsequently, in step S1910, similarly to step S1902, the AF controller 211 determines whether or not to perform the focus detection processing using the phase difference signal. When the AF controller 211 determines to perform the focus detection processing using the phase difference signal, the process proceeds to step S1911. On the other hand, when the AF controller 211 determines not to perform the focus detection using the phase difference signal, the process proceeds to step S1913.

In step S1911, the AF controller 211 waits for the input of the variation information on the pupil intensity distribution from the communicator 208. In step S1912, the defocus amount as the object focus shift amount on the image plane is calculated based on the image shift amount acquired in step S1906 by the signal processing and based on the variation information on the pupil intensity distribution acquired in step S1911.

In step S1913, the AF controller 211 performs detection processing for the defocus amount, the detection processing being other than the focus detection using the phase difference signal. In this embodiment, detection processing for the defocus information is performed by the contrast AF control. Subsequently, in step S1914, the AF controller 211 waits for the communicator 208 to input the variation information on the depth of field. In step S1915, by using the determination on a matching degree of the two-image acquired in step S1906, and the like, the AF controller 211 determines whether or not the object for the in-focus control is detected.

In step S1916, since the object for the in-focus control is detected, an in-focus determination width is calculated using the following expression, the in-focus determination width being used to determine whether or not the defocus amount calculated by the phase difference AF unit 212 is within a predetermined in-focus determination range.

$$\text{In-focus determination width } (\mu m) = Fno \times \text{Variation information on depth of field} \times \delta \times N$$

Fno: diaphragm open diameter information
δ: permissible circle of confusion
N: lens specific coefficient Fno represents open diameter information in a consideration of refining control. Variation information on depth of field represents coefficient information acquired from the lens microcomputer 101 via the communicator 208 of the camera main body 200, and, in this embodiment, is a correction coefficient generated by the transmittance changing from the center of the optical axis in the radial direction. δ represents information on a permissible circle of confusion, and N represents a lens specific coefficient determined from a driving characteristic of a focus lens driving circuit that drives the focus lens 105.

In step S1917, the AF controller 211 determines whether or not the defocus amount (detected defocus amount) calculated in the phase difference AF unit 212 is within the in-focus width determined in step S1912. When the defocus amount is within the in-focus width, it is determined that an in-focus state is acquired in step S1918. On the other hand, when it is determined in step S1917 that the defocus amount is not within the in-focus width, the process proceeds to step S1920 and the AF controller 211 requests the communicator 208 to drive the focus lens 105 so as to cancel the detected defocus amount.

When the object for the in-focus control is not found in step S1915, the search velocity based on the depth-of-field information is determined in step S919 as follows.

$$\text{Search driving velocity} \left(\frac{\text{mm}}{\text{sec}}\right) =$$
$$Fno \times \text{Variation information on depth of field} \times \text{Frame Rate} \times M$$

Fno: diaphragm open diameter information
Frame Rate: image pickup cycle
M: characteristic coefficient of phase difference AF detector Fno represents the open diameter information in a consideration of the refining control. Frame Rate represents the cycle of image pickup synchronization signal 1601 in FIG. 16, and more specifically, represents the control cycle of the focus detection processing by image sensor 201. When the search driving velocity becomes faster, the phase difference signal cannot be correctly detected, but this phenomenon can be avoided by making the control cycle of the focus detection processing faster, and this this control cycle is used as a determinant for the search driving velocity. M represents characteristic information on the phase difference AF detector. M is a coefficient for making the search velocity faster when a condition is such that the phase difference signal can be easily detected, for example, in a high luminance state. The AF controller 211 requests the communicator 208 to drive the focus lens 105 by the above search velocity.

When the variation information on the pupil intensity distribution and the depth-of-field information can be obtained from the interchangeable lens 100 as the AF control data by the flag determination in step S1901, those pieces of information are used as optimum parameters for calculating the defocus amount, the focus driving speed, and the in-focus width determination as described above. On the other hand, when the AF control data cannot be acquired from the interchangeable lens 100 by the determination in step S1901, in step S1921, the image shift amount for is calculated by the signal processing using the phase difference signal is calculated, similarly to step S906.

In step S1922, the AF controller 211 calculates the defocus amount using the F-number information currently set in the diaphragm 109. For the result of step S1921, the defocus calculation processing is performed which is not in a consideration of that the lens optical system has varying transmittance. Subsequently, in step S1923, the AF controller 211 performs the focus driving control as described in step S1916 or step S1919, by using the F-number information currently set in the diaphragm 109 as the depth-of-field information. Thus, the focus driving control here does not consider that the lens optical system has changing transmittance.

Step S1931 is a state in which the communicator 208 is standby. For example, the camera main body 200 operates in the live view mode in which an image is constantly captured by the image sensor 201. When the AF controller 211 of the camera main body 200 requests the optical data to be acquired from the lens in step S1903 or step S1904, the communicator 208 updates a communication item for the image pickup cycle in step S1932. This process corresponds to the AF control communication 1604 in FIG. 16.

In step S1933, the communicator 208 waits for the image pickup synchronization timing notification, and in step S1934, performs the AF control communication. In step S1935, the communicator 208 notifies the AF controller 211 of the variation information on the pupil intensity distribution and the variation information on the depth of field each of which is included in the AF control information acquired from the lens microcomputer 101. In step S1936, it is determined whether the AF controller 211 requests the search driving in step S1919 or the AF controller 211 requests the in-focus focus driving in step S1920. When a request is received, the driving request for the focus lens 105 is communicated to the lens microcomputer 101 in step S1937.

As described above, in this embodiment, the variation information on the pupil intensity distribution and the variation information on the depth of field are individually acquired, where those pieces of information are affected by the optical element 107 in which the transmittance variation due to the diaphragm position is not uniform. That is, the control amount of the diaphragm unit, the variation information on the pupil intensity distribution, and the variation information on the depth of field can be acquired individually, and thus each parameter can be optimally switched even if these parameters do not uniformly change in the optical system. This embodiment uses the variation information on the pupil intensity distribution for ensuring the accuracy in the processing for detecting the defocus amount in the AF control processing, and uses the depth-of-field information for optimizing the driving speed of the focus lens and a threshold value for the in-focus determination. Thereby, the defocus amount can be acquired with higher accuracy and the focus driving can be optimally performed, and thus, for example, it is possible to avoid a decrease in the in-focus speed.

In this embodiment, the F-number/T-number conversion data communication for AE is performed when the lens is attached as described in steps S821 to S825 and S832 to S835 in FIG. 8, and the camera main body 200 periodically executes the AF control information in the image pickup cycle as described in step S1935 in FIG. 19A. However, this embodiment is not limited to this, and the AF control information may be executed when the lens is attached in the same manner as the F-number/F-number conversion data communication for AE. The F-number/T-number conversion data communication for AE may be periodically executed in the image pickup cycle in the same manner as the communication for the information for AF control is executed. Alternatively, information such as a flag indicating that either a change in the F-number/T-number conversion data for AE or a change in the information for AF control may be periodically executed in the image pickup cycle. The camera main body 200 may acquire the F-number/T-number conversion data for AE and the information for AF control when detecting a change in information such as the flag.

In this embodiment, the method is described in which the camera main body 200 acquires the plurality of data pieces by the interchangeable lens 100 transmitting the AE control data and the AF control data to the camera main body 200, but this embodiment is not limited to this. For example, the camera main body 200 may acquire the plurality of data by downloading from a personal computer or the like through a network line.

In this embodiment, the case is described where the user sets the F-number, the shutter speed, and the like via the user interface 207 of the camera main body 200 or the user interface 120 of the interchangeable lens 100, but this embodiment is not limited to this. For example, the F-number, the shutter speed, and the like may be set via an operation member such as a button or an operation ring provided on an adapter or the like disposed on the interchangeable lens 100 or between the interchangeable lens 100 and the camera main body 200. When the operation member is provided on the interchangeable lens 100 or on the adapter, the interchangeable lens 100 or the adapter having the operation member communicates a set value with the camera main body 200.

Second Embodiment

Figure 20:
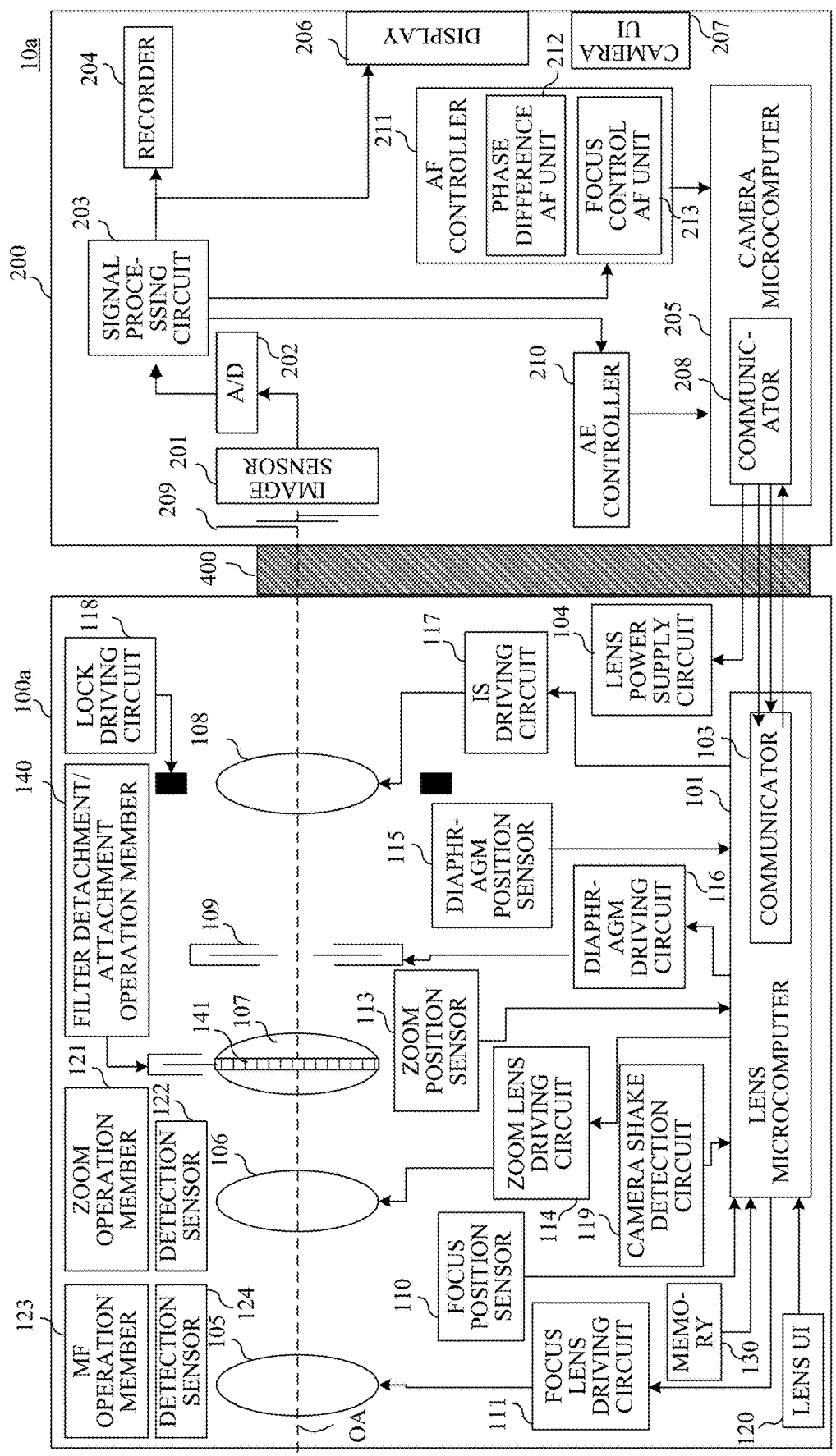
FIG. 20 is a configuration diagram illustrating a camera system including an image pickup apparatus and an accessory according to a second embodiment.

Next, the second embodiment of the present invention will be described. In the first embodiment, the filter is included in the optical element 107 built in the interchangeable lens 100, and the optical element in which the transmittance varies from the center of the optical axis in the radial direction is fixedly disposed on the interchangeable lens 10). On the other hand, in this embodiment, a case will be described where an interchangeable lens is configured so that a plurality of types of filters are detachably attachable to the interchangeable lens.
Configuration Diagram
The configuration of the camera system in this embodiment will be described with reference to FIG. 20. FIG. 20 is a configuration diagram of a camera system (image pickup system 10a) including a camera main body 200 as an image pickup apparatus and an interchangeable lens 100a as an image pickup accessory in this embodiment. The interchangeable lens 100a of this embodiment differs from the interchangeable lens 100 of the first embodiment in that the interchangeable lens 100a includes a plurality of types of filters 141 detachably attachable to an optical element 107, and an operation member 140 configured to operate the attachment/detachment of the filter 141. Since the configurations having the same reference numerals as those of the first embodiment are described in the first embodiment, the description thereof will be omitted.

The operation member 140 is a member provided on an exterior of the interchangeable lens 100a, and is configured to make the filter 141 detachably attachable to the optical element 107. The filter 141 is configured to attenuate and change transmittance from a center of an optical axis in a radial direction. This embodiment will describe a configuration as an example in which two types of filters of a filter A and a filter B can be switched which have different characteristics in transmittance varies. In this case, there are three states: a state in which the filter A is attached, a state in which the filter B is attached, and a state in which the filter is not attached (filter is detached), that is, a state in which there is no optical element that changes transmittance. The same processing is performed when three or more types of filters are used each of which has different characteristic in the transmittance change.

A change in an attached/detached state of the filter 141 is input to the lens microcomputer 101, and is transmitted to the camera microcomputer 205 by communication processing described later. In the camera main body 200, operation is switched in an AE controller 210 and an AF controller 211 according to the attached/detached state.

Here, a description will be given of table data for converting a T-number and an F-number with reference to FIGS. 21A to 21D. The table data includes table data which the AE controller 210 refers to for converting the F-number to the T-number for diaphragm control during image pickup in a diaphragm priority mode, and table data which the AE controller 210 refers to for converting the T-number to the F-number for diaphragm control during image pickup in a shutter speed priority mode. FIGS. 21A to 21D are explanatory diagrams illustrating table data configurations for converting the F-number and the T-number.

A table 2101 in FIG. 21A is a table for converting the F-number to the T-number when the filter A is attached. In the table 2101, as in FIG. 11 of the first embodiment, division number of the F-number is 64, and resolution of the F-number division is 1/16-stop. On the other hand, a table 2102 in FIG. 21B is a table for converting the F-number to the T-number when the filter B is attached. In the table 2102, the division number of the F-number is 64, but as indicated in 2103, resolution of the F-number division is 1/8-stop. By changing the resolution according to a characteristic of each filter in this way, a used capacity can be suppressed of a memory area that manages the data.

A table 2104 in FIG. 21C is a table for converting the T-number to the F-number when the filter A is attached. In the table 2104, as illustrated in FIG. 14 of the first embodiment, the division number of the T-number is 64, and the resolution of the T-number division is 1/16-stop. On the other hand, a table 2105 in FIG. 21D is a table for converting the T-number to the F-number when the filter B is attached. The division number of T-number is 64, but as indicated in 2106, the resolution of the T-number division is 1/8-stop. By changing the resolution according to the characteristic of each filter in this way, the used capacity can be suppressed of the memory area that manages the data.

Figure 22A:
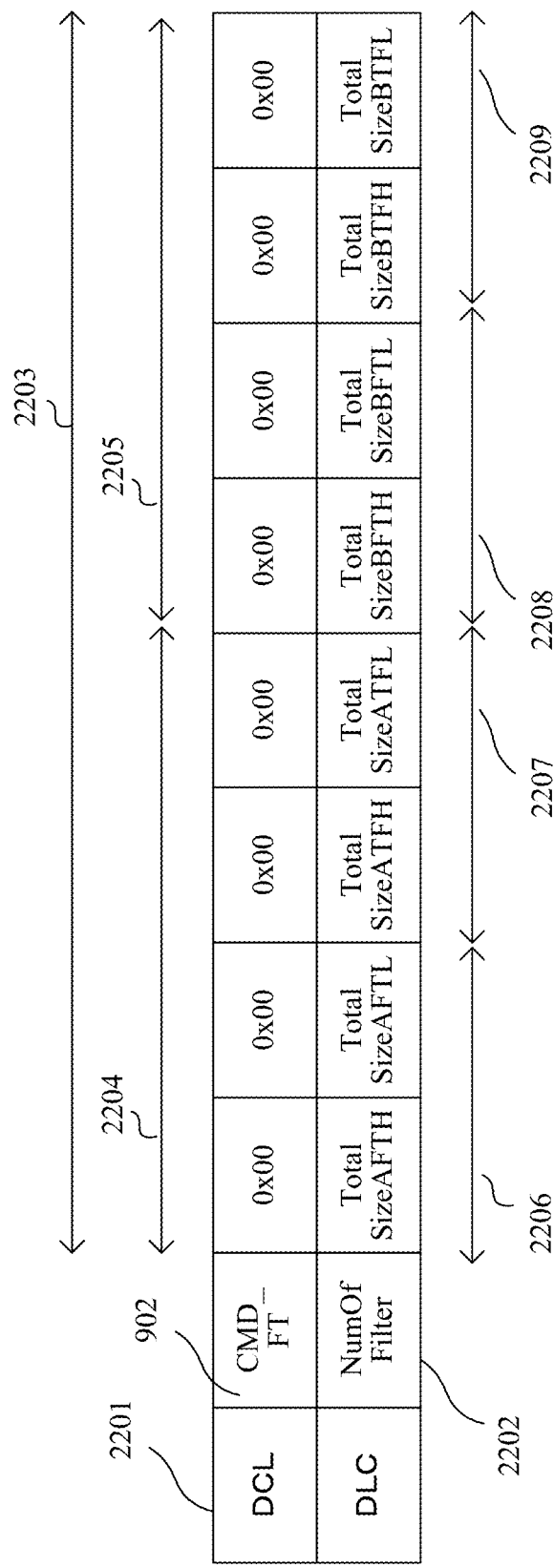
FIGS. 22A and 22B are explanatory diagrams illustrating communication contents for communicating table data used for converting an F-number and a T-number during AE control according to the second embodiment.
Figure 22B:
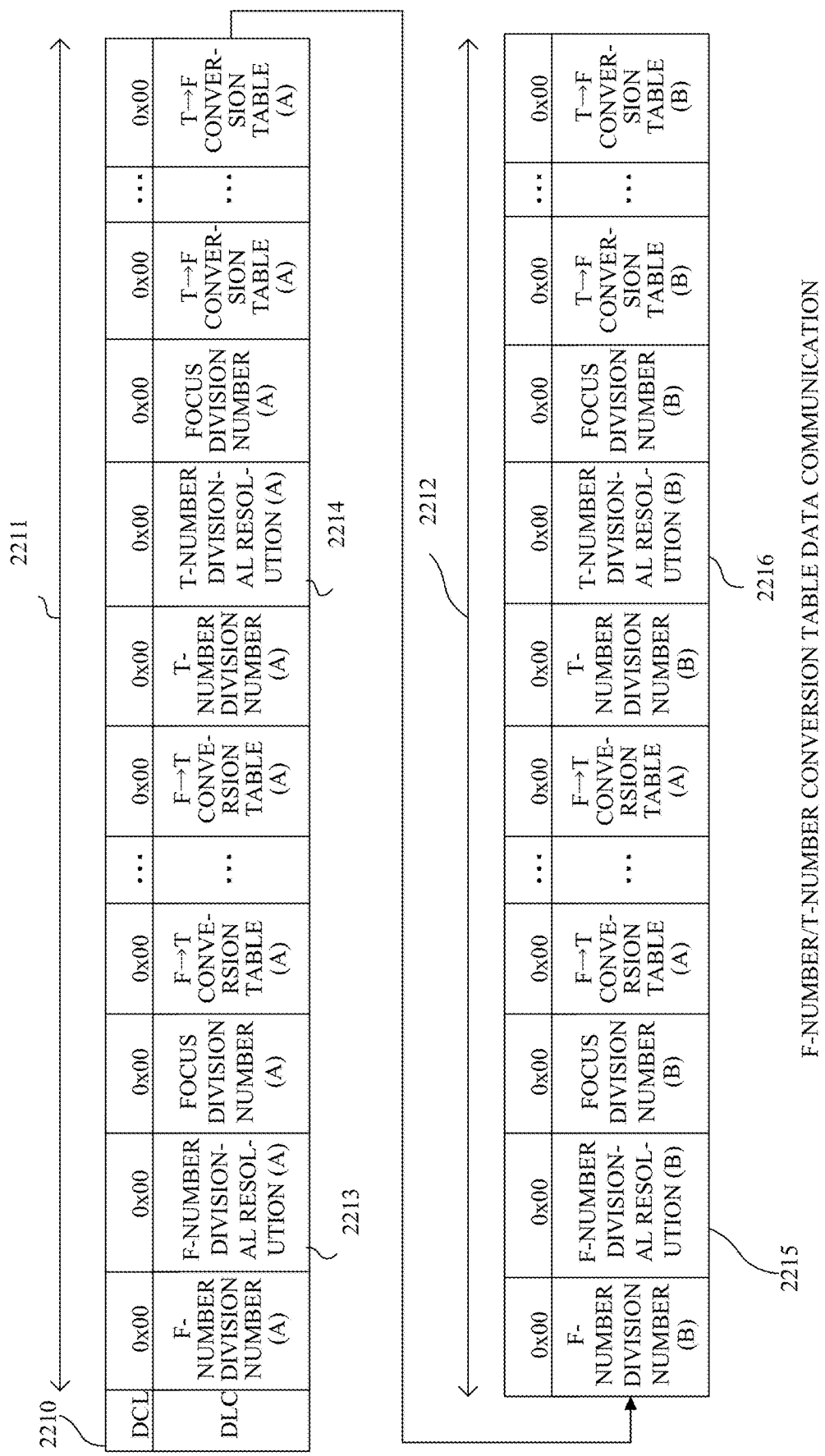

In this embodiment, the table data for the filter A and the table data for the filter B described above are acquired from the lens microcomputer 101 in steps S821 to S825 during start-up processing described with reference to FIG. 8 in the first embodiment. The acquired table data is transmitted to the AE controller 210 of the camera main body 200. Since this processing is the same as that of the first embodiment, the description thereof will be omitted.
Communication Format FIGS. 22A and 22B are formats of "F-number/T-number conversion table data size communication" in this embodiment, FIGS. 22A and 22B corresponding to FIGS. 9A and 9B in the first embodiment. This communication includes two pieces of communication of "F-number/T-number conversion table data size communication" 2201 in FIG. 22A and "F-number/T-number conversion table data communication" 2210 in FIG. 22B, as described in FIGS. 9A and 9B in the first embodiment.

"CMD_FT" 902 is a command defined in advance with a predetermined numerical value as described in the first embodiment. "Num Of Filter" 2202 indicates that the number of filters for which the F-number/T-number conversion table data is communicated in this communication. In this embodiment, since the two pieces of data for the filter A and the filter B are communicated, "2" is transmitted. A communicator 208 of the camera main body 200 can determine a communication data length 2203 of "F-number/T-number conversion table data size communication" 2201 according to the number "Num Of Filter" acquired from the lens microcomputer 101.

A reference numeral 2204 indicates a location where the table data size of the filter A is communicated, and a reference numeral 2205 indicates a location where the table data size of the filter B is communicated. two bytes in 2206 indicate a total size of data structure (Total Size AFT) for the conversion from the F-number to the T-number for filter A. Two bytes in 2207 indicate a total size of a data structure (Total Size ATF) for the conversion from the T-number to the F-number for filter A. Similarly, two bytes in 2208 indicate a total size of the data structure (Total Size BFT) for the conversion from the F-number to the T-number for filter B. Two bytes in 2209 indicate a total size of a data structure (Total Size BTF) for the conversion from the T-number to the F-number for the filter B.

Each size is calculated by the following expression.

Total Size $AFT$[byte]=(Total Size $AFTH$×256+Total Size $AFTL$)[byte]

Total Size $ATF$[byte]=(Total Size $ATFH$×256+Total Size $ATFL$)[byte]

Total Size $BFT$[byte]=(Total Size $BFTH$×256+Total Size $BFTL$)[byte]

Total Size $BTF$[byte]=(Total Size $BTFH$×256+Total Size $BTFL$)[byte]

The "F-number/T-number conversion table data communication" 2210 in this embodiment is different from the "F-number/T-number conversion table data communication" 910 in FIG. 9B in the first embodiment in that the table data for the filter A and the table data for the filter B are continuously communicated. A reference numeral 2211 represent the table data for the filter A, and a reference numeral 2212 represents the table data for the filter B. Since each communication item is the same as that in FIGS. 9A and 9B, the description thereof will be omitted. However, as explained with reference to FIGS. 21A to 21D, the resolutions of the F-number and the T-number are differently set between the filter A and the filter B. In this embodiment, "F-number divisional resolution (A)" 2213 and "T-number divisional resolution (A)" 2214 for the filter A indicate ¹⁄₁₆-stop, and "F-number divisional resolution (B)" 2215 and "T-number divisional resolution (B)" 2216 for the filter B indicate ⅛-stop. By optimizing the divisional resolution according to the optical characteristic, the used capacity in the memory can be reduced and the communication data size can be optimized as described above.

Also, for FIGS. 22A and 22B, the signal level of the highest data D7 to the lowest data D0 of the lens data signal DLC or the camera data signal DCL may be maintained at low when the data is "0x00".

Operation at Timing when Filter is Switched

Figure 23:
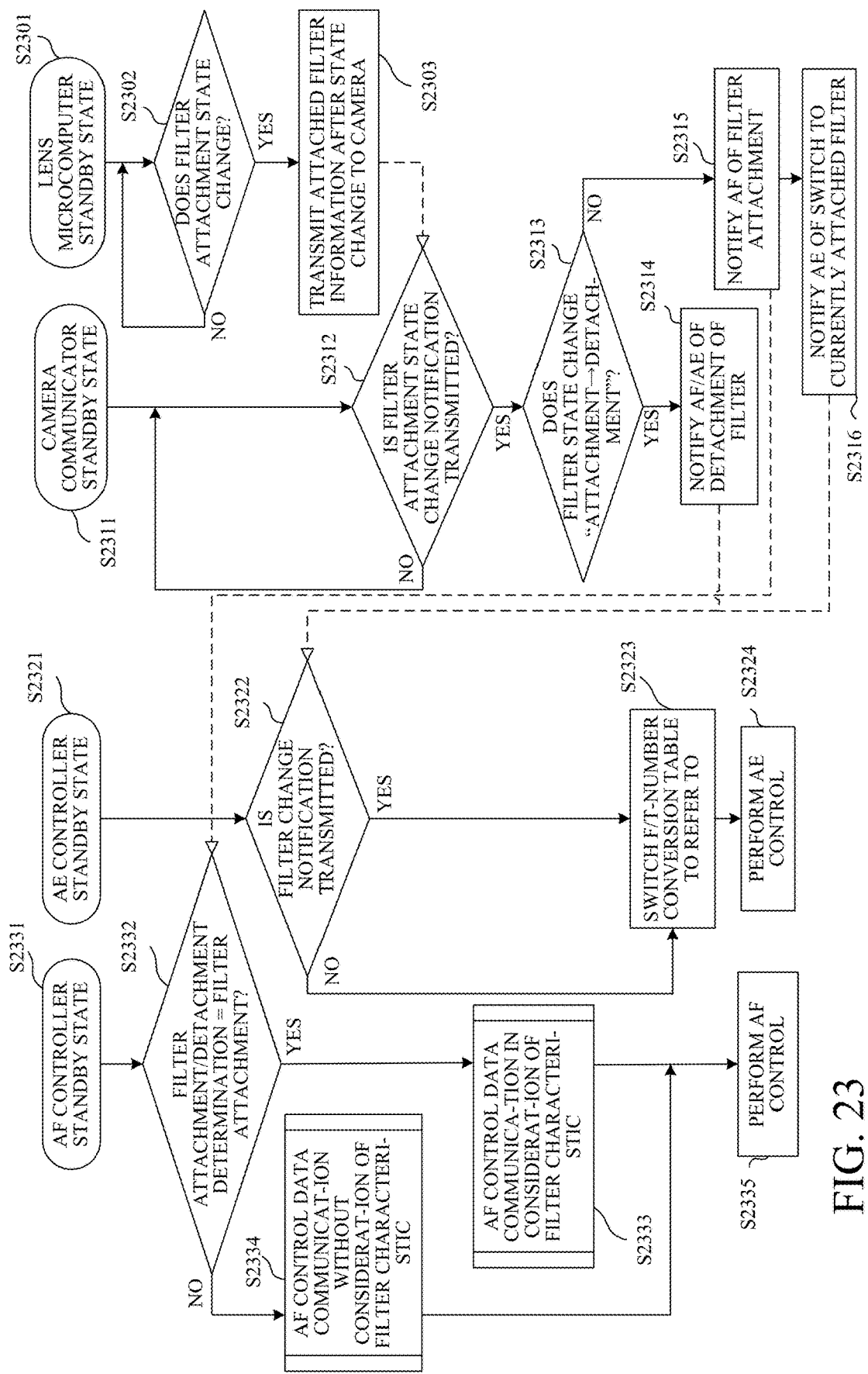
FIG. 23 is a flowchart illustrating operation when a filter is switched according to the second embodiment.

Next, with reference to FIG. 23, each operation will be described of the camera main body 200 and the interchangeable lens 100a when the filter of this embodiment is switched and when the filter is removed. FIG. 23 is a flowchart illustrating operation when the filter 141 is switched. Steps S2301 to S2303 describe operation in the lens microcomputer 101, and steps S2311 to S2316 describe operation in the communicator 208 of the camera main body 200. Steps S2321 to S2324 describe operation in the AE controller 210, and steps S2331 to S2335 describe operation in the AF controller 211.

First, in step S2302, when the lens microcomputer 101 detects a change in a detachment/attachment state of the filter, the state after the change in the detachment/attachment state of filter is transmitted to the communicator 208 of the camera main body 200 in step S2303.

In step S2312, the communicator 208 of the camera main body 200 receives the communication of step S2302 from the lens microcomputer 101. In step S2313, a determination is performed on the change in the detachment/attachment state of the filter before and after the reception of the communication. When the filter state after the reception "changes from with filter to without filter", that is, when the filter is detached, the AE controller 210 and AF controller 211 are notified of a filter detached state in step S2314. When a determination result other than the above is acquired is when the filter state "changes from without filter to with filter", that is, when the filter A or the filter B is attached, and the AF controller 211 is notified of filter attached state in step S2315. Thereafter, in step S2316, the AE controller 210 is notified whether the currently attached filter is the filter A or the filter B. The AE controller 210 is notified of the type of the attached filter because the AE controller 210 needs to change behavior depending on the filter type as described later, unlike the AF controller 211 changing behavior depending only on detachment/attachment of the filter.

When the communicator 208 notifies the AE controller 210 of the detachment/attachment of the filter and the type of the currently attached filter in step S2322, the AE controller 210 switches the F-number-number conversion table data to refer to according to the filter type transmitted in step S2323. For example, when the filter 141 is switched from the filter A to the filter B, the AE controller 210 switch the control so as to refer to the data tables 2102 and 2105 for the filter B from the data tables 2101 and 2104 for the filter A, the tables being illustrated in FIGS. 21A to 21D. When the communicator 208 notifies the AE controller that the filter is detached, the AE controller 210 may not perform the conversion processing of the F-number and the T-number.

When the communicator 208 of the camera main body 200 notifies the AF controller 211 of the detachment/attachment of the filter in step S2332, in a case the filter is attached, the AF controller 211 acquires the variation information on the pupil intensity distribution and the variation information on the depth of field, as described in steps S1902 to S1914 of FIGS. 19A and 19B in the first embodiment. These pieces of information are acquired from the lens microcomputer 101 at required timing. At this time, the information on the currently attached filter can be acquired from the lens microcomputer 101 via the communicator 208, and thus it is not necessary to notify the AF controller 211 of the information on the change in the filter type. On the other hand, when the AF controller 211 is notified of the detachment of the filter in step S2332, the AF controller may perform the operation without filter as described in steps S1921 to S1923 of FIG. 19B.

As described above, in this embodiment, when the plurality of types of filters 141 is detachably attached to the interchangeable lens 100a, the AE control and the AF control can be optimally performed according to the filter detached/attached state. More specifically, at timing of start up, the data communication for AE control is performed in a consideration of the type of the filter. The AE control and the AF control are switched in response to the attachment/detachment of the filter by a mechanism of notifying the camera main body 200 of the attachment/detachment of the filter and switching information on the filter type. In this embodiment, the description is given that the camera main body 200 acquires the optical data of the plurality of types of optical element (filter) 107 is acquired from the interchangeable lens 100a by the initial communication, but the present invention is not limited to this. In this embodiment, for example, when the optical element (filter) 107 is switched (step S2303 in FIG. 23), the optical data corresponding to the switched optical element (filter) 107 may be communicated again.

Third Embodiment

Next, the third embodiment of the present invention will be described. In the first embodiment, the filter is included in the optical element 107 built in the interchangeable lens 10, and the optical element in which the transmittance varies from the center of the optical axis in the radial direction is fixedly disposed on the interchangeable lens 100. In this embodiment, a case will be described where an optical element is provided on an adapter 300 attached between a camera main body 200b and the interchangeable lens 100b.

Configuration Diagram

Figure 24:
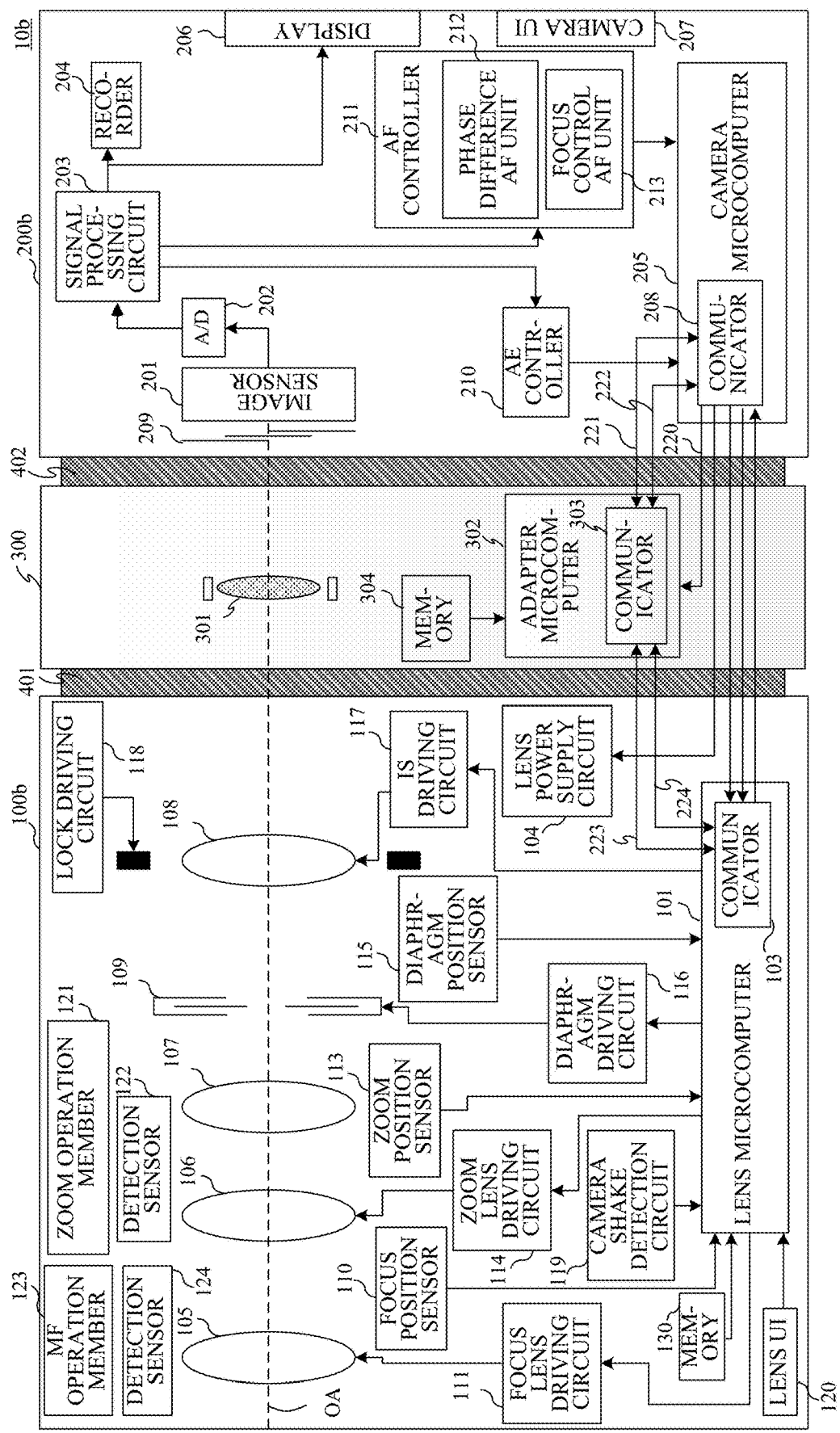
FIG. 24 is a configuration diagram illustrating a camera system including an image pickup apparatus, an adapter, and an accessory according to a third embodiment.

A configuration will be described of the camera system in this embodiment with reference to FIG. 24. FIG. 24 is a configuration diagram illustrating a camera system (image pickup system 10b) including a camera main body 200b as an image pickup apparatus, an interchangeable lens 100b as an image pickup accessory, and an adapter 300 as an intermediate accessory in this embodiment. The configurations to which the same reference numerals as those of the first embodiment are assigned are described in the first embodiment, and thus their description will be omitted.

The adapter 300 is detachably attachable to the interchangeable lens 100b and the camera main body 200b via mount portions 401 and 402. An optical element 301 is a lens or a filter provided inside the adapter 300 and disposed in accordance with a center of an optical axis of the camera main body 200b and the interchangeable lens 100b. The optical element 301 is configured so that transmittance varies from a center of the optical axis in a radial direction. The optical element 301 is detachably attachable as that in the second embodiment. An adapter microcomputer 302 is configured to control a communicator (adapter communicator) 303 and a memory 304, the communicator 303 being configured to communicate with the camera microcomputer 205.

The camera main body 200b includes a first communication circuit and a second communication circuit different from the first communication circuit. The first communication circuit is a communication line via which the camera microcomputer 205 and the lens microcomputer 101 communicate with each other, that is, via which first communication is performed. The second communication circuit is communication lines 221 and 222 via which the camera microcomputer 205 and the adapter microcomputer 302 communicate with each other, that is, via which second communication is performed. Similarly, the interchangeable lens 100b includes a communication line as a first communication circuit via which the camera microcomputer 205 and the lens microcomputer 101 communicate with each other, that is, via which the first communication is performed. The interchangeable lens 100b includes communication lines 223 and 224 as a second communication circuit via which the adapter microcomputer 302 and the lens microcomputer 101 communicate with each other, that is, via which the second communication is performed.

In the first communication, as described in the first embodiment, the camera microcomputer 205 communicates conversion table data for an F-number and a T-number with the lens microcomputer 101. In the second communication, communication is performed for operation information and optical information on the adapter 300. Thus, the communicator 208 of the camera main body 200b includes a terminal 220 for supplying power to the adapter microcomputer 302, and communication lines 221 and 222 for communicating with the communicator 303 in the adapter microcomputer 302. The communication lines 221 and 222 are connected to the communicator 103 in the lens microcomputer 101 via the communication lines 223 and 224. The memory 304 stores functional information on the adapter 300 and optical information on each combination of the adapter 300 and each lens model of the interchangeable lens 100b which the adapter 300 can recognize. These pieces of information are transmitted to the camera main body 200b via the communicator 303. The memory 304 may be built in the adapter microcomputer 302 or may have an external configuration.

Configuration of Second Communication

Figure 25:
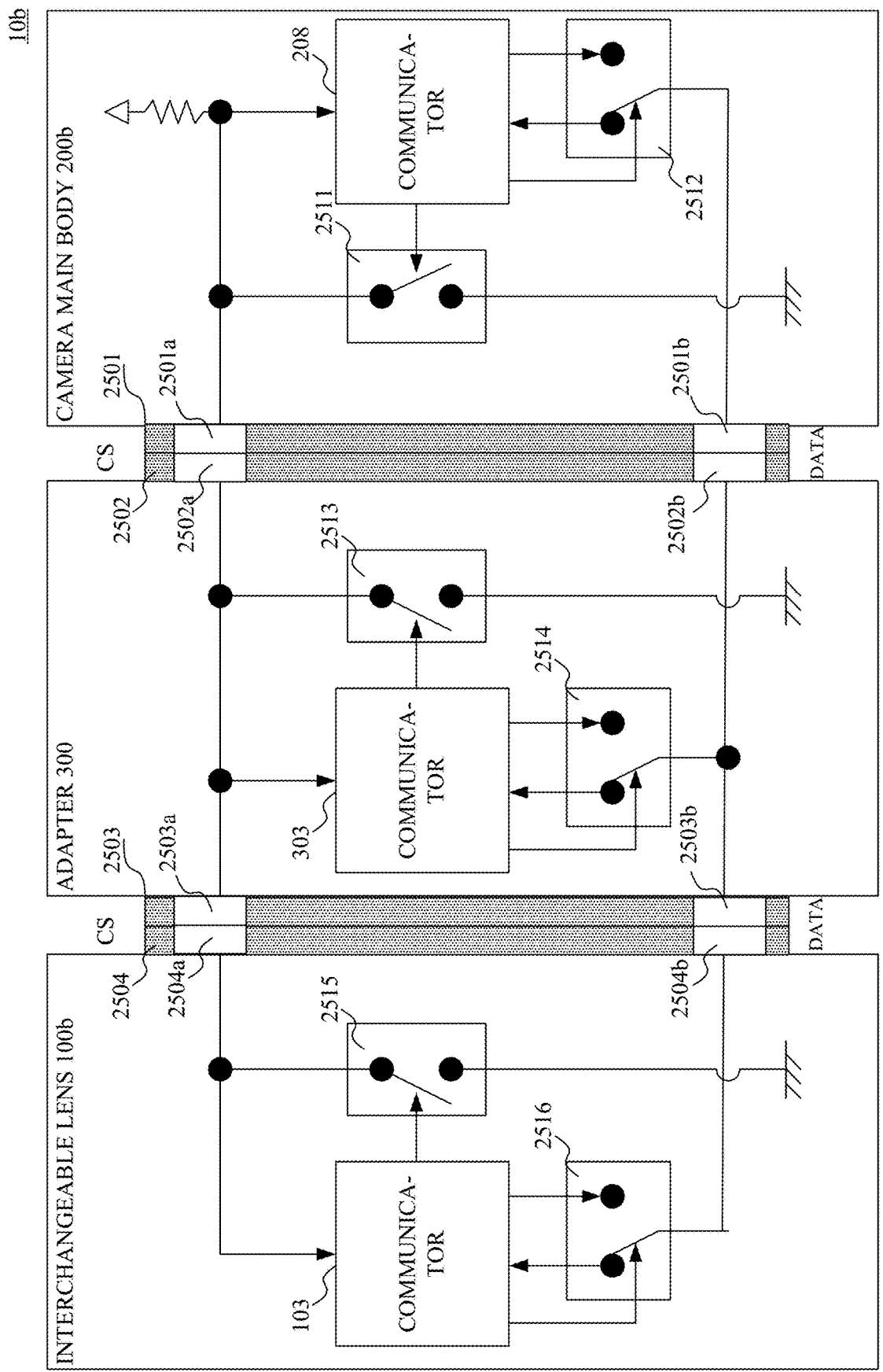
FIG. 25 is an explanatory diagram illustrating a communicator of an image pickup apparatus, an adapter, and an accessory according to the third embodiment.

Next, with reference to FIG. 25, communication processing will be described between the camera main body 200b, the interchangeable lens 100b, and the adapter 300. FIG. 25 is an explanatory diagram illustrating the communicators 208, 303 and 103 of the camera main body 200b, the adapter 300, and the interchangeable lens 100b.

The communicator 208 of the camera main body 200b, the communicator 103 of the interchangeable lens 100b, and the communicator 303 of the adapter 300 are connected via contact portions as in the first communication. More specifically, they are connected via communication contact portions 2501, 2502, 2503 and 2504. In this embodiment, the communication contact portions include CS signal terminals 2501a, 2502a, 2503a and 2504a and DATA signal terminals 2501b, 2502b, 2503b and 2504b, respectively. The communicators 208, 103 and 303 communicate using CS signal lines connected via CS signal terminals and DATA signal lines connected via DATA signal terminals.

A camera-side communication circuit includes a ground switch 2511 and an input/output switch 2512. An adapter-side communication circuit includes a ground switch 2513 and an input/output switch 2514. A lens-side communication circuit includes a ground switch 2515 and an input/output switch 2516.

A signal line includes a CS signal line as a first signal line for communicating signals for controlling a flow of communication, and a DATA signal line as a second signal line for communicating data to be transmitted and received.

The CS signal line is connected to the communicators 208, 303 and 103 and is detectable of a state (high/low) of a signal line. Further, the CS signal line is pulled up and connected to a power supply (not illustrated) in the camera main body 200b. The CS signal line is configured to be connectable to a GND via a ground switch 2515 of the interchangeable lens 100b, a ground switch 2511 of the camera main body 200b, a ground switch 2513 of the adapter 300 (open drain connection). With such a configuration, the interchangeable lens 100b, the camera main body 200b, and the adapter 300 can each set a state of the CS signal line to low by turning on (connecting) the grounding switch. On the other hand, the state of the CS signal line can be set to high by turning off (cutting off) each of the interchangeable lens 100b, the camera main body 200b, and the adapter 300. In the second communication, it is possible to selectively use two types of communication protocols of broadcast communication and P2P communication, described later. The CS signal line is used to distinguish the communication protocol, to switch a communication direction in P2P communication, and the like.

The DATA signal line is a single bidirectional data transmission line that can be used while a data communication direction is switched. The DATA signal line can be connected to the communicator 103 via the input/output switch 2516 of the interchangeable lens 100b. The DATA signal line can be connected to the communicator 208 via the input/output switch 2512 of the camera main body 200b. The DATA signal line can be connected to the communicator 303 via the input/output switch 2514 of the adapter 300. Each microcomputer includes a data output unit (CMOS method) for transmitting data and a data input unit (CMOS method) for receiving data. By operating the input/output switch, it is possible to select whether the DATA signal line is connected to the data output unit or to the data input unit. At a time of transmitting data, each of the interchangeable lens 100b, the camera main body 200b, and the adapter 300 can transmit data by operating the input/output switches so as to connect the DATA signal line to the data output unit. On the other hand, at a time of receiving data, each of the interchangeable lens 100b, the camera main body 200b, and the adapter 300 can receive data by operating the input/output switch so as to connect the DATA signal line to the data input unit.

Here, a description will be given of the broadcast communication and the P2P communication performed by the CS signal and the DATA signal. The CS signal line is used as a trigger for the broadcast communication because the CS signal line falls to low when any unit connects to the GND. The broadcast communication starts when the camera main body, which is the main body of communication, pulls the CS signal line to low. When the CS signal line is low, the data received by each accessory (interchangeable lens 100b and adapter 300) via the DATA line is determined to be broadcast data. Each accessory can request the broadcast communication from the camera main body by pulling the CS signal line to low.

When a unit detects the low of the CS signal line, the unit can inform other units that the processing for the broadcast communication is continuing, by turning on its own ground switch during broadcast processing. The second communication may be specified to start with the broadcast communication and to end with the broadcast communication, and the DATA signal line of the accessory may basically maintain the reception state. When the camera performs the P2P communication with the accessory, the accessory to be communicated is first specified by the broadcast communication. The camera and the specified accessory perform the P2P communication after the camera complete the transmission in the broadcast communication.

In the P2P communication, the camera main body 200b first transmits data, and the accessory (adapter 300) which receives the data from the camera transmits data to the camera main body 200b. Thereafter, this processing is performed alternately. The CS signal in the P2P communication is distinguished from that of the broadcast communication by maintaining the CS signal to high. The CS signal in the P2P communication is used as a busy signal. That is, the camera and the accessory set the CS signal line to low so as to notify the other unit that the data transmission is completed, and set the CS signal line to high so as to notify that the data reception is ready.

When the P2P communication is completed, the camera main body 200b communicates the end of the P2P communication by the broadcast communication. In this way, the camera main body 200b can perform data communication with the plurality of accessories (adapter 300) via two communication lines.

FIG. 25 illustrates an example of the communication circuit in this embodiment, but this embodiment is not limited to this. For example, a configuration may be used in which the CS signal line is pulled down and connected to the GND in the camera main body 200b and can be connected to the power supply (not illustrated) via the ground switch 2515 of the interchangeable lens 100b, the ground switch 2511 of the camera main body 200b, and the ground switch 2513 of the adapter 300. The DATA signal line may be configured to be always connected to each data input unit, and connection/disconnection between the DATA signal line and each data output unit may be operated by a switch.

Description for Communication Protocol in Second Communication

Next, a description will be given of the broadcast communication performed by second communication with reference to FIGS. 28A and 28B. The broadcast communication is one-to-many communication in which one of the camera microcomputer 205, the lens microcomputer 101, and the adapter microcomputer 302 simultaneously transmits data to the other two, that is, in which simultaneous transmission is performed. The broadcast communication is performed using the signal line CS and the signal line DATA. A communication mode in which the broadcast communication is performed is also referred to as a broadcast communication mode. The broadcast communication mode is an example of the second communication mode.

Figure 28A:
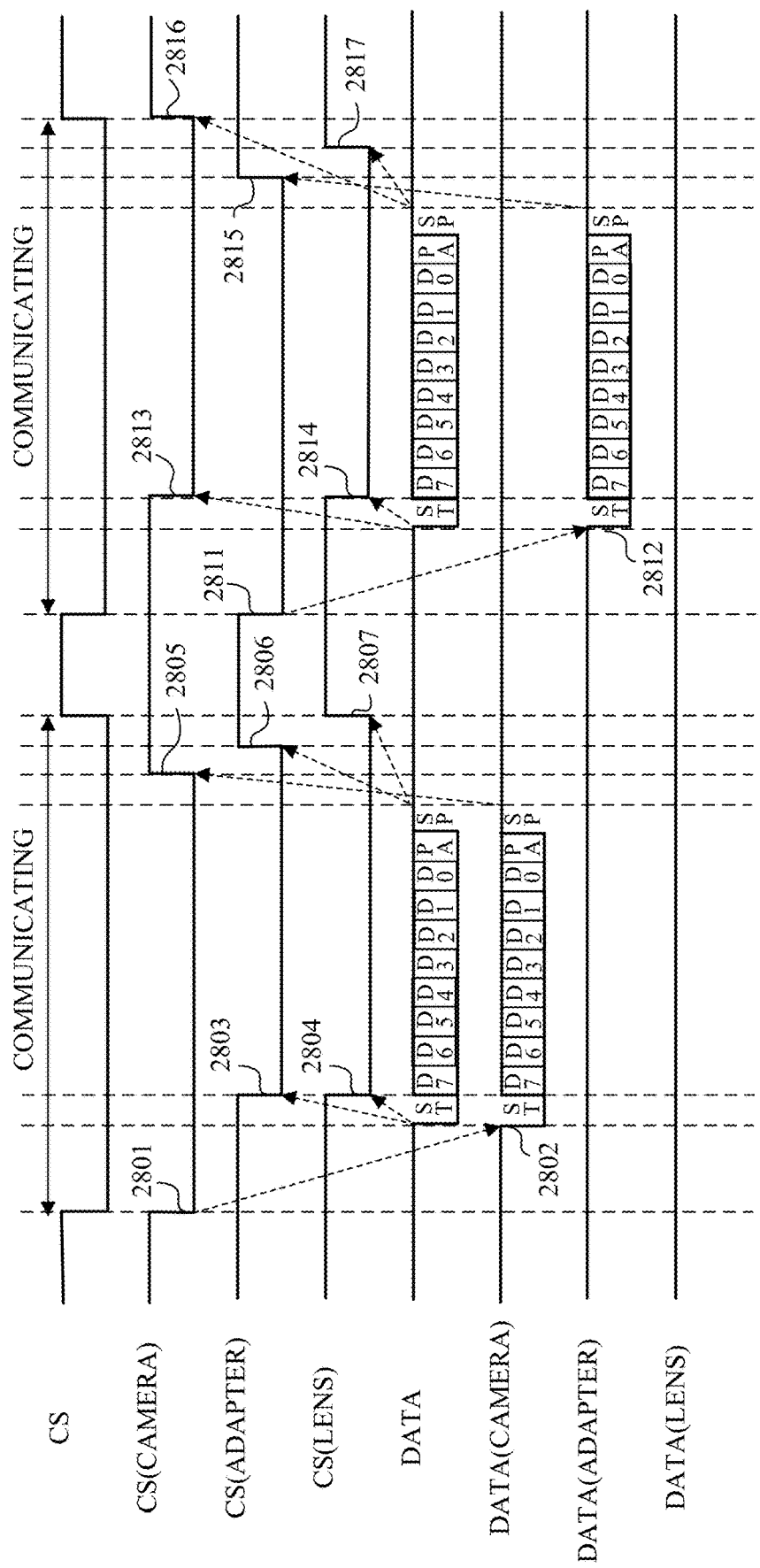
FIG. 28A is an explanatory diagram illustrating broadcast communication of a communication protocol of second communication according to the third embodiment.

FIG. 28A illustrates signal waveforms in the broadcast communication performed between the camera microcomputer 205, the lens microcomputer 101, and the adapter microcomputer 302. Here, as an example, a case will be described where the adapter microcomputer 302 performs the broadcast communication to the camera microcomputer 205 and the lens microcomputer 101 in response to the broadcast communication from the camera microcomputer 205 to the lens microcomputer 101 and the adapter microcomputer 302.

First, the communication master camera microcomputer 205 starts output of low (Low output) to the signal line CS so as to notify the communication slaves lens microcomputer 101 and the adapter microcomputer 302 of starting the broadcast communication, respectively (2801). Next, the camera microcomputer 205 outputs the data to be transmitted to the signal line DATA (2802).

On the other hand, the lens microcomputer 101 and the adapter microcomputer 302 start Low output via the signal line CS at timing when a start bit ST input via the signal line DATA is detected (2803, 2804). At this point, the camera microcomputer 205 has already started Low output to the signal line CS. Thus, the signal level of the signal line CS does not change.

After that, when the camera microcomputer 205 complete output of a stop bit SP, the Low output to the signal line CS is cancelled (2805). After receiving the stop bit SP of the data input from the signal line DATA, the lens microcomputer 101 and the adapter microcomputer 302 analyze the received data and perform internal processing relating to the received data. After a preparation for receiving next data is completed, the lens microcomputer 101 and the adapter microcomputer 302 cancel the Low output to the signal line CS (2806, 2807). As described above, the signal level of the signal line CS becomes high when all of the camera microcomputer 205, the lens microcomputer 101 and the adapter microcomputer 302 cancel the Low output to the signal line CS. Thus, each of the camera microcomputer 205, the lens microcomputer 101, and the adapter microcomputer 302 can confirm that the signal level of the signal line CS becomes high after canceling the Low output to the signal line CS. By confirming that the signal level of the signal line CS becomes high, each of the camera microcomputer 205, the lens microcomputer 101, and the adapter microcomputer 302 can determine that this communication processing is completed and the preparation for the next communication is completed.

Next, when the adapter microcomputer 302 confirms that the signal level of the signal line CS returns to high, the adapter microcomputer 302 starts Low output to the signal line CS so as to notify the camera microcomputer 205 and the lens microcomputer 101 that the broadcast communication is started (2811).

Subsequently, the adapter microcomputer 302 outputs the data to be transmitted to the signal line DATA (2812). The camera microcomputer 205 and the lens microcomputer 101 start Low output to the signal line CS at the timing when the start bit ST input from the signal line DATA is detected (2813, 2814). At this time, the adapter microcomputer 302 has already started the Low output to the signal line CS. Thus, the signal level of to the signal line CS does not change. Thereafter, the adapter microcomputer 302 cancels the Low output to the signal line CS when the output of the stop bit SP is completed (2815). On the other hand, the camera microcomputer 205 and the lens microcomputer 101 receive the input stop bit SP from the signal line DATA, analyze the received data, and perform internal processing relating to the received data. Thereafter, the camera microcomputer 205 and the lens microcomputer 101 cancel the Low output to the signal line CS after the preparation for receiving the next data is completed (2816, 2817).

The same applies to the case where the lens microcomputer 101 performs the broadcast communication to the camera microcomputer 205 and the adapter microcomputer 302 in response to the broadcast communication to the lens microcomputer 101 and the adapter microcomputer 302 of the camera microcomputer 205. That is, the lens microcomputer 101 starts the Low output to the signal line CS, and when the data to be transmitted to the signal line DATA is output, the lens microcomputer 101 cancels the Low output to the signal line CS. The camera microcomputer 205 and the adapter microcomputer 302 cancel the Low output to the signal line CS after receiving the input stop bit SP of the data output by the lens microcomputer 101 from the signal line DATA, so that the state returns to a state where the next communication can be performed.

Figure 28B:
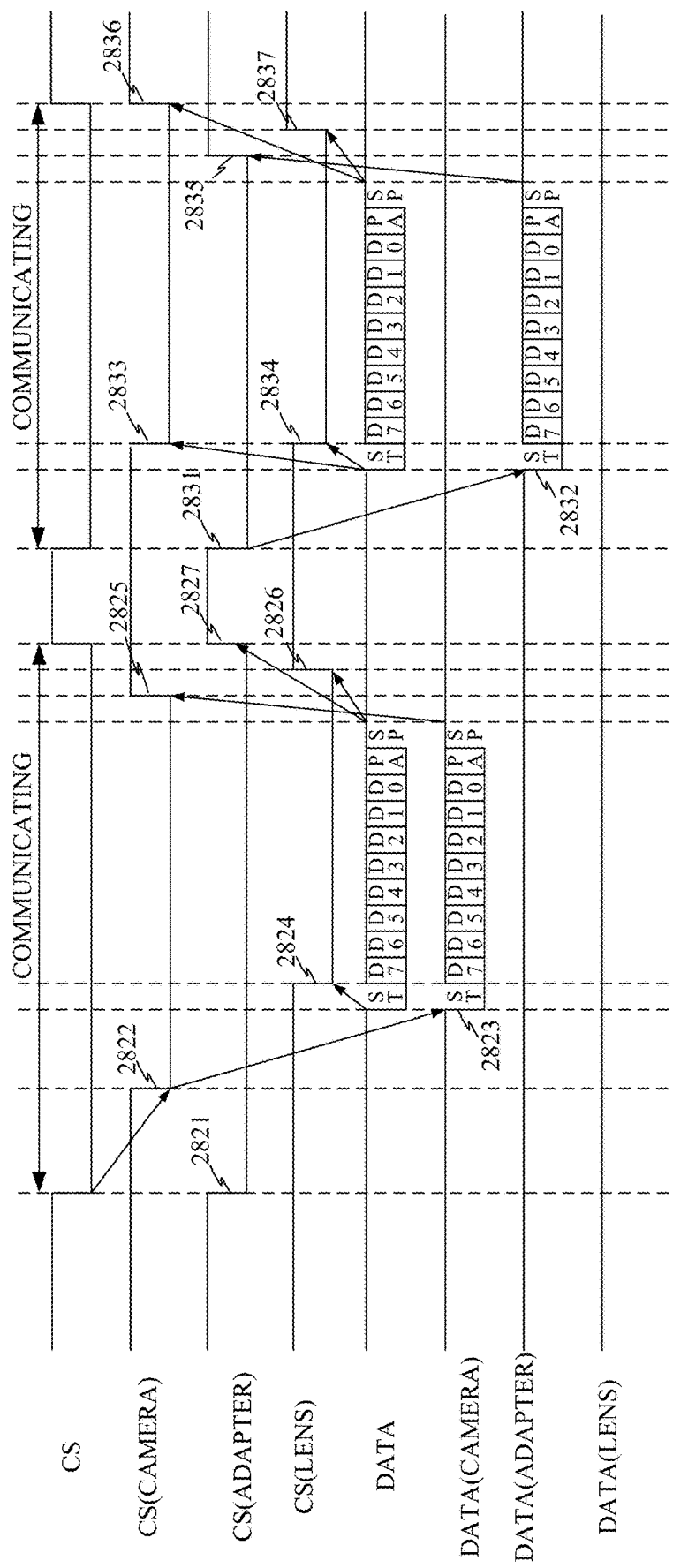
FIG. 28B is an explanatory diagram illustrating the broadcast communication of the communication protocol of the second communication according to the third embodiment.

FIG. 28B also illustrates signal waveforms in the broadcast communication performed between the camera microcomputer 205, the lens microcomputer 101, and the adapter microcomputer 302. Here, an example is illustrated in which the adapter microcomputer 302 notifies the camera microcomputer 205 of the start of the broadcast communication. In this example, the adapter microcomputer 302 performs the broadcast communication to the camera microcomputer 205 and the lens microcomputer 101 in response to the broadcast communication from the camera microcomputer 205 to the lens microcomputer 101 and the adapter microcomputer 302.

First, the adapter microcomputer 302 starts Low output to the signal line CS in order to notify the camera microcomputer 205 and the lens microcomputer 101 that the broadcast communication is started (2821). That is, the adapter microcomputer 302 notifies the camera microcomputer 205 of the communication request by changing the signal level of the signal line CS. When the camera microcomputer 205 detects that the signal level of the signal line CS changes from high (also referred to as a first signal level) to low (also referred to as a second signal level), the camera microcomputer 205 starts Low output to the signal line CS (2822). At this point, the adapter microcomputer 302 has already started the Low output to the signal line CS. Thus, the signal level of the signal line CS does not change.

Next, the camera microcomputer 205 outputs the data to be transmitted to the signal line DATA in response to the communication request transmitted from the signal line CS (2823). The lens microcomputer 101 starts the Low output to the signal line CS at the timing when the start bit ST input from the signal line DATA is detected (2824). At this point, the camera microcomputer 205 has already started the Low output to the signal line CS. Thus, the signal level of the signal line CS does not change When the camera microcomputer 205 completes the output of the stop bit SP, the camera microcomputer 205 cancels the Low output to the signal line CS (2825). On the other hand, the lens microcomputer 101 and the adapter microcomputer 302 receive the input stop bit SP from the signal line DATA, analyze the received data, and perform internal processing relating to the received data. Thereafter, the lens microcomputer 101 and the adapter microcomputer 302 cancel the Low output to the signal line CS after the preparations for receiving the next data are completed (2826, 2827). As described above, the signal level of the signal line CS becomes high when all of the camera microcomputer 205, the lens microcomputer 101 and the adapter microcomputer 302 cancel the Low output to the signal line CS. That is, when the camera microcomputer 205, the lens microcomputer 101, and the adapter microcomputer 302 cancel the Low output to the signal line CS, high in the signal level of the signal line CS can be confirmed. By confirming that the signal level of the signal line CS is high, the camera microcomputer 205, the lens microcomputer 101, and the adapter microcomputer 302 respectively complete current communication processing and determine that they are ready for the next communication.

Next, when the adapter microcomputer 302 confirms that the signal level of the signal line CS returns to high, the adapter microcomputer 302 starts the Low output to the signal line CS so as to notify the camera microcomputer 205 and the lens microcomputer 101 that the broadcast communication is started (2831). That is, the lens microcomputer 101 notifies the camera microcomputer 205 of the communication request by changing the signal level of the signal line CS.

Next, the adapter microcomputer 302 outputs the data to be transmitted to the signal line DATA (2832). On the other hand, the camera microcomputer 205 and the lens microcomputer 101 start the Low output to the signal line CS at the timing when the start bit ST input via the signal line DATA is detected (2833, 2834). At this point, the adapter microcomputer 302 has already started the Low output to the signal line CS. Thus, the signal level of the signal line CS does not change.

Thereafter, when the adapter microcomputer 302 completes the output of the stop bit SP, the adapter microcomputer 302 cancels the Low output to the signal line CS (2835). On the other hand, the camera microcomputer 205 and the lens microcomputer 101 receive the input stop bit SP via the signal line DATA, analyze the received data, and perform internal processing relating to the received data. The camera microcomputer 205 and the lens microcomputer 101 cancel the Low output to the signal line CS after the preparation is completed for receiving the next data is completed (2836, 2837).

In the example of FIG. 28B, broadcast communication starts from the communication slaves lens microcomputer 101 and adapter microcomputer 302. In this case, the communication master camera microcomputer 205 cannot determine which of the lens microcomputer 101 and the adapter microcomputer 302 has set the signal line CS to Low at the time when the Low output to the signal line CS has been started (2821). Thus, the camera microcomputer 205 needs to perform communication, with both the lens microcomputer 101 and the adapter microcomputer 302, to confirm whether the lens microcomputer 101 or the adapter microcomputer has started the broadcast communication (has transmitted communication request).

At the timing when the camera microcomputer 205 outputs low to the signal line CS to start the broadcast communication, the lens microcomputer 101 or the adapter microcomputer 302 may output low to the signal line CS to start the broadcast communication. In this case, the camera microcomputer 205 cannot detect that the lens microcomputer 101 or the adapter microcomputer 302 outputs low to the signal line CS. To the lens microcomputer 101 or to the adapter microcomputer 302, the communication is not performed of confirming whether the lens microcomputer 101 or the adapter microcomputer 302 has started the broadcast communication (has transmitted the communication request). When this confirmation communication for the communication request is not performed after the predetermined time elapses, the Low output to the signal line CS is performed again and the communication request is made to the camera microcomputer 205.

As described above, in the broadcast communication, the signal transmitted via the signal line CS functions as a signal indicating that the broadcast communication is started (executed) or that the broadcast communication is being performed.

An example is described of the broadcast communication with reference to FIGS. 28A and 28B, but other broadcast communication may be performed. For example, the data transmitted in one broadcast communication may be one-byte data as illustrated in FIGS. 28A and 28B, but may be two-byte or three-byte data. The broadcast communication may be one-way communication from the communication master camera microcomputer 205 to the communication slaves lens microcomputer 101 and the adapter microcomputer 302.

Next, the P2P communication will be described performed between the camera main body 200*b*, the interchangeable lens 100*b*, and the adapter 300 in the second communication. The P2P communication is one-to-one communication (individual communication), in which the camera main body 200*b* as the communication master specifies one partner (specific accessory) to communicate with from the interchangeable lens 100*b* and the adapter 300 as the communication slaves, and performs data transmission/reception only with the specified communication slave. The P2P communication is performed using the signal line DATA and the signal line CS. The communication mode in which the P2P communication is performed is also referred to as a P2P communication mode. The P2P communication mode is an example of the second communication mode.

Figure 29:
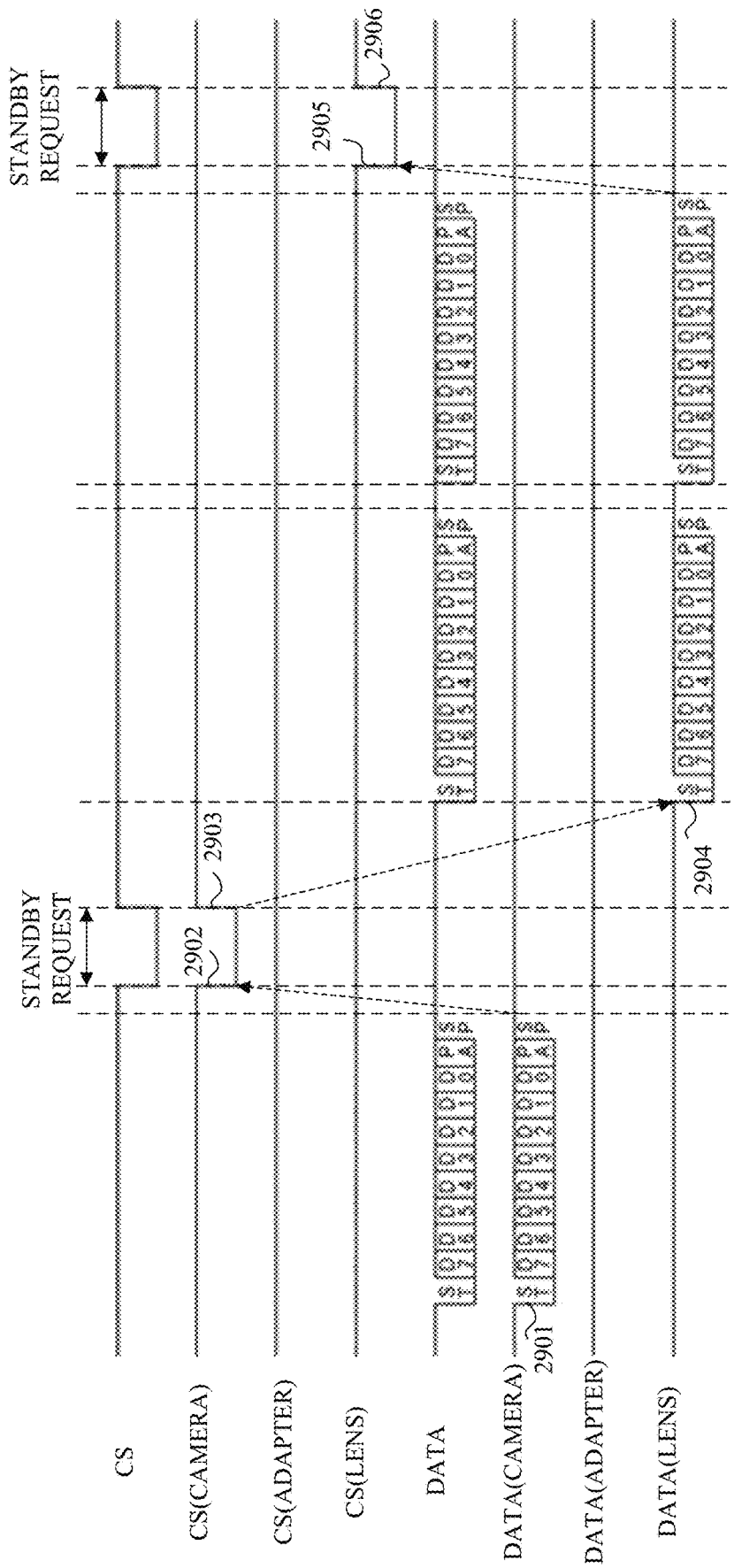
FIG. 29 is an explanatory diagram illustrating P2P communication of the communication protocol of the second communication according to the third embodiment

FIG. 29 illustrates, as an example, signal waveforms of P2P communication performed between the camera microcomputer 205 and the lens microcomputer 101 which is specified as the communication partner. In response to the one-byte data transmission from the camera microcomputer 205, the lens microcomputer 101 performs two-byte data transmission to the camera microcomputer 205.

First, the communication master camera microcomputer 205 outputs data to be transmitted to a signal line DATA (2901). The camera microcomputer 205 starts Low output to the signal line CS after completing the output of the stop bit SP (2902). After that, the camera microcomputer 205 cancels the Low output to the signal line CS after the preparation for receiving the next data is completed (2903). On the other hand, the lens microcomputer 101 detects the Low signal input from the signal line CS, analyzes the received data input from the signal line DATA, and performs internal processing relating to the received data. Thereafter, the lens microcomputer 101 confirms that the signal level of the signal line CS returns to high, and then outputs the data to be transmitted to the signal line DATA for two consecutive bytes (2904). The lens microcomputer 101 starts the Low output to the signal line CS after the output is completed of the stop bit SP of the second byte (2905). The lens microcomputer 101 cancels the Low output to the signal line CS after the preparation for receiving the next data is completed (2906).

The adapter microcomputer 302, which is not specified as the communication partner for the P2P communication, does not output a signal to the signal line CS and the signal line DATA. That is, the adapter microcomputer 302 that is not specified as the communication partner for the P2P communication does not notify the camera microcomputer 205 of the communication request.

As described above, the signal transmitted by the signal line CS in the P2P communication functions as a notification signal indicating the end of data transmission and the standby request for the next data transmission. An example of the P2P communication is described with reference to FIG. 29, other P2P communication may be performed, and for example, data may be transmitted byte by byte via the signal line DATA, or data of three bytes or more may be transmitted via the signal line DATA.

In the initial communication between the camera main body 200*b* and the adapter 300 in this embodiment (step S2604 in FIG. 26A), the camera microcomputer 205 specifies the adapter microcomputer 302 by the broadcast communication, and acquires authentication information on the adapter microcomputer by the P2P communication. When acquiring the conversion table of the F-number and the T-number from the adapter 300 (step S2639 described later with reference to FIG. 26C), the camera microcomputer 205 similarly specify the adapter microcomputer 302 by the broadcast communication, and acquires the table data from the adapter microcomputer by the P2P communication.

Processing at Time of Start-Up (Searching for Storage Destination for F-Number/T-Number Conversion Data Table)

In this embodiment, the information determined by the combination of the interchangeable lens 100*b* and the adapter 300 is stored on the memory 130 of the interchangeable lens 100*b* or the memory 304 of the adapter 300. This information includes optical information, a data table, information on a pupil intensity distribution for the image sensor 201 of the camera main body 200*b*, and light beam information indicating a depth of field. The data table indicates the relationship between the F-number as a refining position of the diaphragm 109 and the T-number as the light amount, which is information especially peculiar to this embodiment. At the time of start-up, processing is activated of searching where the above data is managed by initial communication between the interchangeable lens 100*b*, the adapter 300, and the camera main body 200*b*.

Figure 26A:
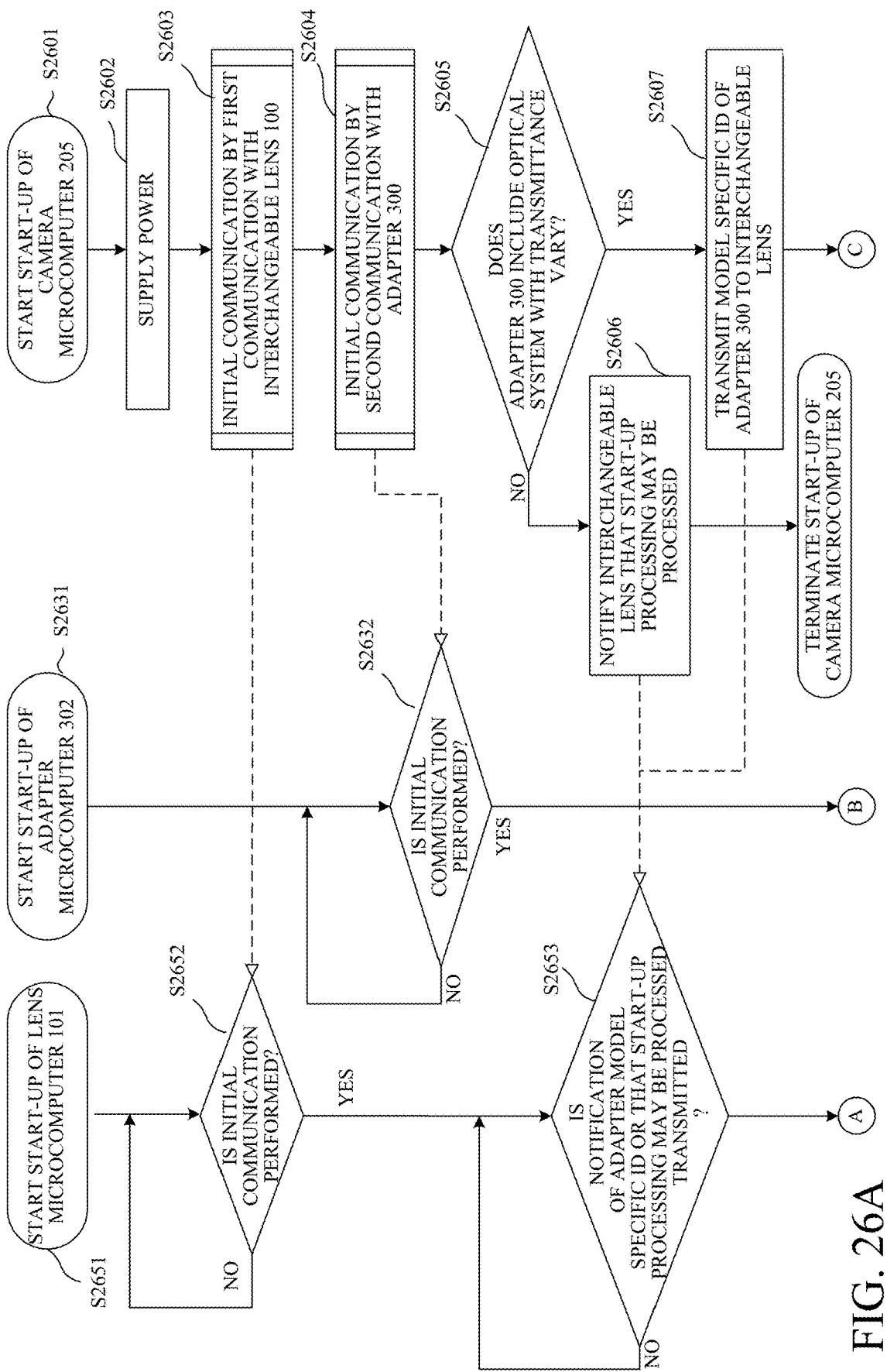
FIG. 26A to 26C are flowcharts illustrating initial communication performed between the image pickup apparatus, the adapter, and the accessory according to the third embodiment.
Figure 26B:
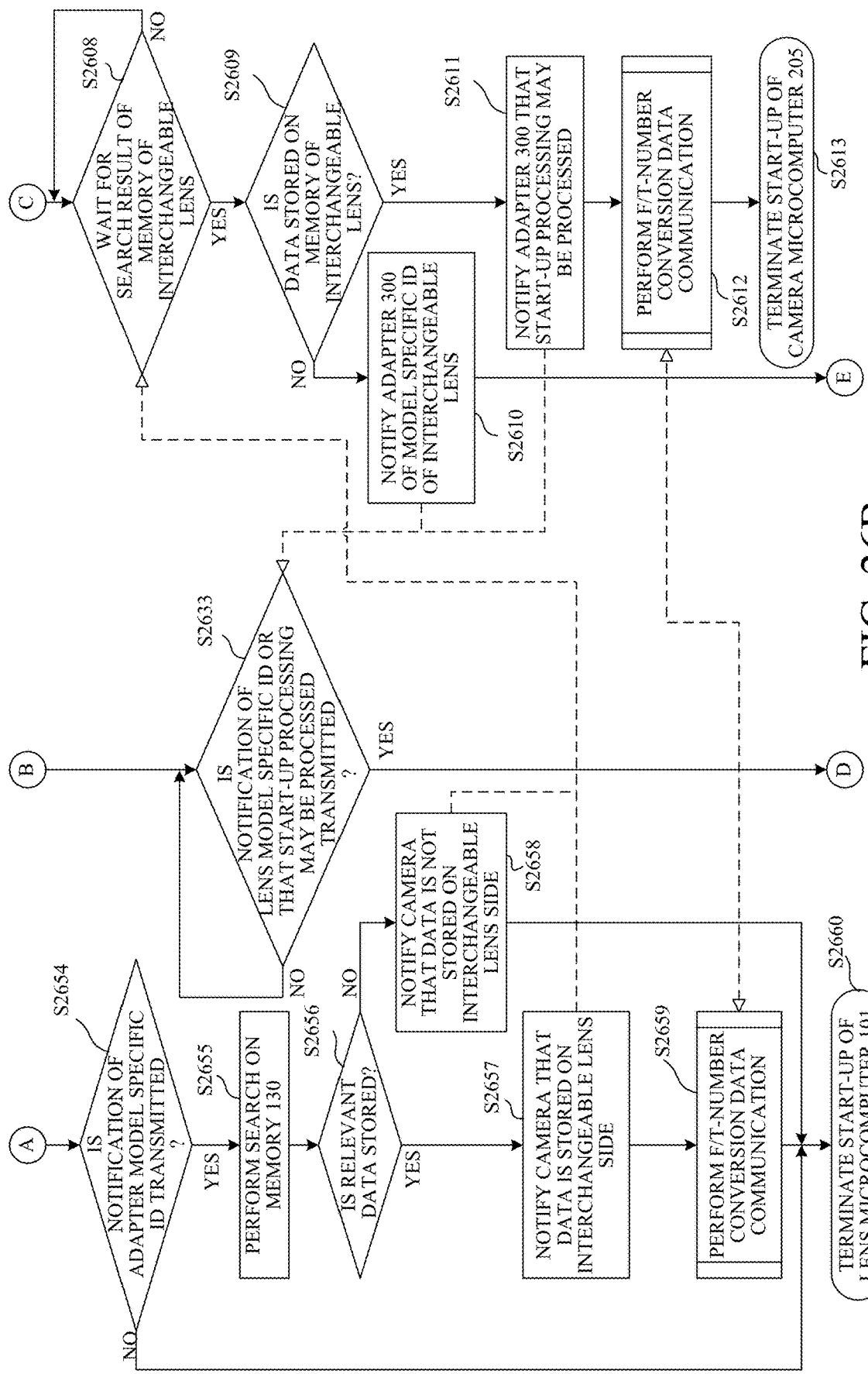
Figure 26C:
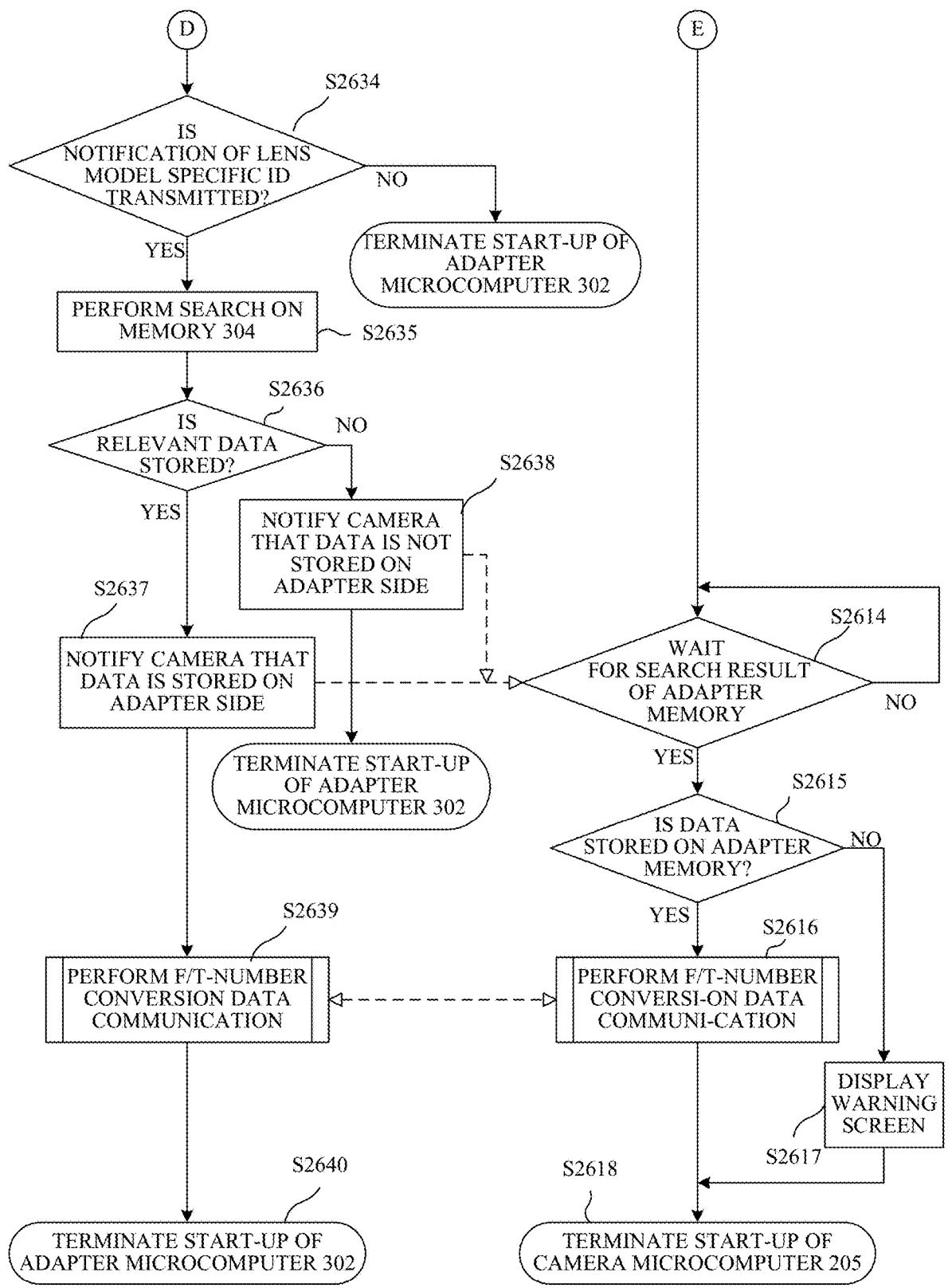

Here, this operation will be described with reference to FIG. 26A to 26C. FIG. 26A to 26C are flowcharts illustrating the initial communication performed between the camera main body 200*b*, the adapter 300, and the interchangeable lens 100*b*. This processing is executed by cooperative operation of the camera microcomputer 205, the adapter microcomputer 302, and the lens microcomputer 101.

First, a description will be given of start-up processing of the camera microcomputer 205. The camera microcomputer 205 starts the start up in step S2601. In step S2602, the camera microcomputer 205 supplies power to the adapter 300 and the interchangeable lens 100b. Subsequently, in step S2603, the camera microcomputer 205 performs the initial communication with the interchangeable lens 100b in the first communication. In the initial communication, the camera microcomputer 205 acquires the authentication information of the interchangeable lens 10b. The communication mode of the first communication executed in this step may be executed in the communication mode M1 as in steps S801 and S802 of FIG. 8 described in the first embodiment. If both the camera microcomputer 205 and the lens microcomputer 101 can recognize that the communication mode M2 is available, the communication mode M2 may be used.

Here, the authentication information of the interchangeable lens 100b includes the identification information and the operation state information of the interchangeable lens 100b. The interchangeable lens identification information may be information such as a model number (ID) used for identifying the type (model) of the interchangeable lens, or may be optical data identification information indicating optical data peculiar to the interchangeable lens. In addition, the interchangeable lens identification information may include information indicating the function of the interchangeable lens and information such as a manufacturing number (serial number) that can identify an individual in the same model.

Subsequently, in step S2604, the camera microcomputer 205 performs the initial communication with the adapter 300 by the second communication, and acquires the authentication information of the adapter 300. In the communication mode of the second communication performed in this step, the camera microcomputer 205 specifies the adapter microcomputer 302 by the broadcast communication described with reference to FIG. 28A, and acquires the authentication information by the P2P communication described with reference to FIG. 29. Here, the authentication information of the adapter 300 includes identification information on the adapter 300, correction processing necessity/unnecessary information, and operation state information.

The adapter identification information may be information such as a model number (ID) used for identifying a type (model) of the adapter 300, or optical data identification information indicating optical data specific to the adapter 30. The adapter identification information may include information on a function of the adapter 300 and information such as a production number (serial number) capable of identifying an individual in the same model. The optical data identification information of this embodiment includes information on whether or not the adapter 300 includes an optical element (optical system) 301 in which transmittance varies.

In step S2605, the camera microcomputer 205 determines whether or not the adapter 300 includes an optical element 301 in which transmittance varies. When the optical element 301 is not provided, in step S2606, the camera microcomputer 205 notifies the lens microcomputer 101 that the start-up processing may be performed by using the communication mode M2 of the first communication, and the start-up processing completes of the camera microcomputer 205. On the other hand, when the optical element 301 is provided, in step S2607, the camera microcomputer 205 transmits model ID information for specifying the model included in the authentication information of the adapter 300 to the interchangeable lens 100b using the communication mode M2 of the first communication.

In step S2608, the camera microcomputer 205 waits for the determination result of whether or not a plurality of pieces of data are held in the memory 130 of the interchangeable lens 100b. Here, the plurality of pieces of data include the conversion table data of the F-number and the T-number used in the AE controller 210, which can be referred to when the adapter 300 and the interchangeable lens 100b are combined. The plurality of pieces of data include variation information on the pupil intensity distribution, variation information on the depth, and the like, which are used in the AF controller 211 and can be referred to when the adapter 300 and the interchangeable lens 100b are combined. In this step, communication is performed using the communication mode M2 of the first communication.

When it is communicated from the lens microcomputer 101 that the memory 130 of the interchangeable lens 100b does not store the data by the first communication in step S2609, the camera microcomputer 205 identifies the adapter microcomputer 302 by the broadcast communication of the second communication in step S2610. The camera microcomputer 205 transmits the ID information that identifies the model from the authentication information of the interchangeable lens 100b to the adapter 300, by using the P2P communication. However, if the state may be maintained in which the communication band of the second communication is occupied, the state of the P2P communication executed in step S2604 may be maintained until this step, and the broadcast communication may be skipped in this step. On the other hand, when the data is on the interchangeable lens 100b side, the process proceeds to step S2611.

Step S2611 is a case where desired optical data is not stored on the memory 304 of the adapter 300. At this time, in order to terminate the start-up processing between the camera microcomputer 205 and the adapter microcomputer 302, the camera microcomputer 205 notifies the adapter 300 that the start-up processing may proceed using the second communication. Similarly to step S2610, the P2P communication state carried out in step S2604 may be maintained until this step, and the broadcast communication may be skipped in this step.

In step S2612, the camera microcomputer 205 communicates the data table for converting the F-number and the T-number with the lens microcomputer 101 by the communication method described in the first embodiment by using the first communication. The start-up processing of the camera microcomputer 205 is terminated.

When the camera microcomputer 205 transmits a model ID of the interchangeable lens 100b to the adapter 300 using second communication in step S2610, the camera microcomputer 205 waits for the search result of whether or not the optical data used in this embodiment is stored on the memory 304 of the adapter 300 in step S2614. In step S2615, when the data is not stored on the memory 304 of the adapter 300, the process proceeds to step S2617, and when the data is stored, the process proceeds to step S2616.

Figure 27:
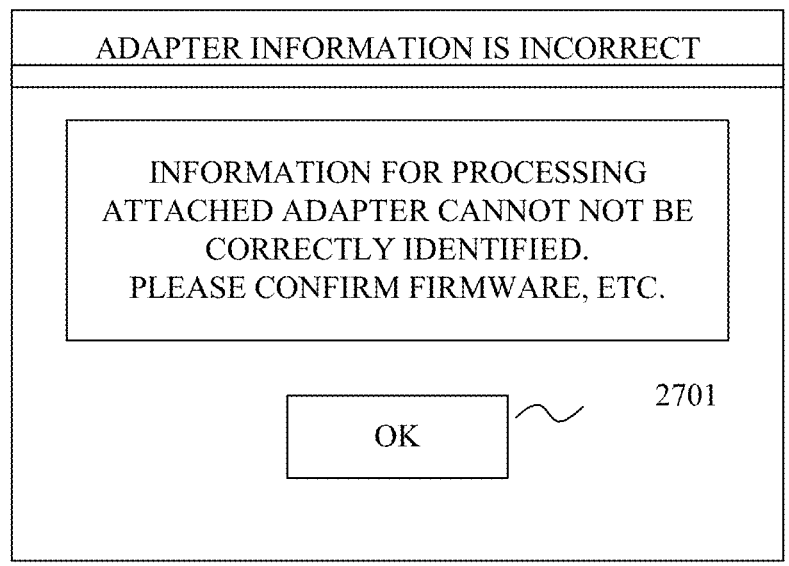
FIG. 27 is an explanatory diagram illustrating a display example during exception processing according to the third embodiment.

In step S2617, neither the memory 130 of the interchangeable lens 100b nor the memory 304 of the adapter 30 stores the optical data which can be used in combination with the currently attached adapter 300 and the interchangeable lens 100b. Thus, the camera microcomputer 205 displays a warning screen indicating that operation is not correctly performed as illustrated in 2701 of FIG. 27.

In step S2616, the camera microcomputer 205 receives the optical data from the adapter microcomputer 302 by using the second communication, and completes the start-up processing of the camera microcomputer 205. Similarly to step S2610, the state of the P2P communication executed in step S2604 may be maintained until this step, and broadcast communication may be skipped in this step.

Next, a description will be given of the start-up processing of the adapter microcomputer 302. When the adapter microcomputer 302 starts up in step S2631, in step S2632, the adapter microcomputer 302 performs the initial communication using the second communication of step S2604 of camera microcomputer 205. In this step, since the process corresponds to step S2609, the camera microcomputer 205 identifies the adapter microcomputer 302 in the second communication of the broadcast communication, and the adapter microcomputer 302 transmits the authentication information to the camera microcomputer 205 by using the P2P communication. If the communication band is not released in step S2609, it is not necessary to perform the broadcast communication again in the subsequent processing, and all the communication in the subsequent processing is performed with the camera microcomputer 205, which can be performed by P2P communication.

Subsequently, in step S2633, the adapter microcomputer 302 waits for a notification of a lens model specific ID or a notification that the start-up processing may proceed, from the camera microcomputer 205. When the lens model specific ID is transmitted in the determination in step S2634, the process proceeds to step S2636. On the other hand, when the lens model specific ID is not transmitted, since the notification that the start-up processing may proceed is transmitted from the camera microcomputer 205, the start-up processing of the adapter microcomputer 302 is terminated.

In step S2636, it is searched for whether or not the memory 304 of the adapter 300 stores the optical data of the optical system in which the transmittance varies, the optical data relating to the interchangeable lens model ID information from the camera microcomputer 205 in step S2610. When the data is stored on the memory 304, the process proceeds to step S2637. On the other hand, when the data is not stored on the memory 304, the process proceeds to step S2638 and the adapter microcomputer 302 terminates the start-up processing. In steps S2637 and S2638, any search result relating to the presence or absence of data is notified to the camera microcomputer 205.

When the data is stored on the memory 304 of the adapter 300 in step S2637, the F-number/T-number conversion table information is communicated using the camera microcomputer 205 in the second communication in step S2639 and the adapter microcomputer 302 terminates the start-up processing.

Finally, the start-up processing in the lens microcomputer 101 will be described. In step S2651, the lens microcomputer 101 starts up, and in step S2652, the initial communication is performed using the communication mode M1 or the communication mode M2 of the first communication according to step S2603 of the camera microcomputer 205. Subsequently, in step S2653, the lens microcomputer 101 waits for the notification of an adapter model specific ID from the camera microcomputer 205 or a notification that the start-up process may be proceeded.

When the adapter model specific ID is transmitted in the determination of step S2654, the process proceeds to step S2655. On the other hand, when the adapter model specific ID is not transmitted, the camera microcomputer 205 transmits the notification is transmitted that the start-up process may be proceeded, the start-up processing of the adapter microcomputer 302 is terminated. In step S2655, it is searched for whether or not the memory 130 of the interchangeable lens 100b stores the optical data of the optical system in which the transmittance varies, the optical data relating to the adapter model ID information transmitted in step S2607 from the camera microcomputer 205. When the data is stored on the memory 130, the process proceeds to step S2657. On the other hand, when the data is not stored on the memory 130, the process proceeds to step S2658, and the lens microcomputer 101 terminates the start-up processing. Either in step S2657 or in step S2658, the search result regarding the presence or absence of data is transmitted to the camera microcomputer 205.

When the data is stored on the memory 130 of the adapter 300 in step S2657, in step S2659, the F-number/T-number conversion table information is communicated with the camera microcomputer 205 in the first communication, and the lens microcomputer 101 terminates the start-up processing. Since the communicated data size is large in the data communication in this step, this step is performed in the communication mode M3 as described in the first embodiment.

By the start-up processing described above, it is possible to confirm whether the adapter 300 or the interchangeable lens 100b store the optical data to be referred to in the combination of the currently attached adapter 300 and the interchangeable lens 100b. When the optical data is stored on the memory 130 of the interchangeable lens 100b, the subsequent operation during the live view may be the same as that of the first embodiment. On the other hand, when the optical data is stored on the adapter 300, the communication of the data performed from the adapter 300 by using the second communication. That is, the AF control information is periodically acquired from a data management source (interchangeable lens 100b or adapter 300) determined by the camera main body 200b in the above search process in the image pickup cycle.

The optical element 301 provided inside the adapter 300 may be detachably attachable. In that case, as described in the second embodiment, the optical data of the plurality of types of optical element (filter) 301 may be obtained from the interchangeable lens 100b using the first communication, or may be obtained from the adapter 300 using the second communication. The adapter 300 may detect that the optical element (filter) 301 is switched, and may communicate that the optical element (filter) 301 is switched to the camera main body 200b by the method described with reference to FIG. 28B. The optical data corresponding to the optical element (filter) 301 after switching may be re-communication.

As described above, in this embodiment, the adapter 300 is provided between the interchangeable lens 100b and the camera main body 200b, and the adapter 300 includes an optical element 301 in which the transmittance varies from the center of the optical axis in the radial direction. According to this embodiment, the AF control and the AE control can be executed in this configuration More specifically, a storage location of the AE control data and the AF control data is searched at the time of start-up, and the communication line is used properly according to the storage location of the data.

In this embodiment, as described in steps S2659 and S2612 of FIG. 26B, the camera main body 200b acquires the F-number/T-number conversion data communication for AE from the interchangeable lens 100b by communication when the interchangeable lens 100b is attached. Alternatively, as described in steps S2639 and S2616, the camera main body 200b acquires the F-number/T-number conversion data communication for AE from the adapter 300 by communication when the interchangeable lens 100b is attached. A description has been given of the control for periodically communicating the AF control information in the image pickup cycle. However, the AF control information may be communicated when the lens is attached in the same manner as the F-number/T-number conversion data communication for AE. The F-number/T-number conversion data communication for AE may be periodically performed with either the interchangeable lens 100b or the adapter 300 in the image pickup cycle in the same manner as the communication of the information for AF control. Alternatively, information such as a flag indicating that either the F-number/T-number conversion data for AE or the information for AF control has changed may be periodically communicated in the image pickup cycle. When the camera main body 200b detects a change in information such as the flag, the camera main body 200b may acquire the F-number/T-number conversion data for AE and the information for AF control from either the interchangeable lens 100b or the adapter 300.

In the first and second embodiments described above, a description is given of a case where the interchangeable lens main body includes the optical element in which the transmittance does not change uniformly, and of the accessory to which the optical element is detachably attachable. In the third embodiment, a description is given of a case where the intermediate accessory includes the optical element in which the transmittance does not change uniformly. However, the optical element existing in the intermediate accessory may be detachably attachable. The optical element may be attached to both the interchangeable lens body and the intermediate accessory.

In the first embodiment, the conversion table data of the F-number and the T-number for the AE control is communicated when the interchangeable lens is attached. Thereby, the effect is acquired of avoiding consumption of the communication band between the camera main body and the interchangeable lens during the steady operation such as the live view. However, the table data may not be communicated at the time of the attachment but may be communicated during the steady operation. Similarly, in the first embodiment, the AF control information is communicated during the steady operation, but the present invention is not limited to this. For example, the AF control information may be configured as the table data, the table data may be communicated when the interchangeable lens is attached, and a search key may be communicated during the steady operation, the search key being able to be used to search the variation information on the pupil intensity distribution and the variation information on the depth as the AF control information from the table data.

As described above, in each embodiment, an image pickup apparatus (camera main body 200, 200b) includes an image pickup accessory (interchangeable lens 100, 100a, 100b) which is detachably attachable to the image pickup apparatus and which includes a focus lens and a diaphragm. The image pickup apparatus includes a communication unit (communicator 208), an image pickup unit (image sensor 201), an exposure control unit (AE controller 210), and a focus control unit (AF controller 211). The communication unit is configured to communicate with the image pickup accessory. The image pickup unit is configured to photoelectrically convert an optical image formed by the image pickup optical system of the image pickup accessory and to output image data. The exposure control unit is configured to control exposure. The focus control unit is configured to control driving of a focus lens based on a defocus amount. The communication unit is configured to transmit a request for diaphragm control to the image pickup accessory, and to receive first information on a relationship between a diaphragm position and a variation in a light amount during diaphragm control, second information corresponding to the diaphragm position, and third information corresponding to the diaphragm position and light transmittance of the image pickup accessory. The exposure control unit is configured to control exposure based on the first and second information. The focus control unit is configured to control driving of the focus lens based on the defocus amount calculated based on the third information.

The focus control unit may be configured to control the driving of the focus lens by causing the communication unit to transmit a focus control signal based on the defocus amount to the image pickup accessory. The first information may include information on a correspondence between the F-number and the T-number, and the communication unit may acquire the first information corresponding to attachment of the image pickup accessory. The first information may include information on the correspondence between the F-number and the T-number for each focus lens position (for example, the horizontal axis in FIG. 14). The first information may include information on the correspondence between the F-number and the T-number for each zoom lens position (for example, FIG. 15). As the first information, the communication unit may acquire information corresponding to a current diaphragm position at timing of image pickup accumulation or a cycle of the image pickup accumulation. The communication unit may acquire the second information and third information corresponding to the current diaphragm position in a predetermined cycle.

The communication unit may receive fourth information corresponding to at least one of the zoom position, the focus position, and the diaphragm position of the image pickup accessory. When, based on the fourth information, the exposure control unit determines that optical state changes, the exposure control unit switches a reference of the first information. The communication unit may receive the fourth information corresponding to at least one of the zoom position, the focus position, and the diaphragm position of the image pickup accessory. When, based on the fourth information, the exposure control unit determines that the optical state changes, the exposure control unit acquires again at least one of the first information and the third information from the image pickup accessory.

The third information may be information corresponding to the F-number based on the pupil intensity distribution. The third information may be the information corresponding to the F-number based on the depth of field. The predetermined cycle may correspond to the cycle of the image pickup accumulation. The predetermined cycle may correspond to a cycle of the focus detection. The communication unit may acquire the second information and the third information corresponding to the current diaphragm position at the timing corresponding to the image pickup accumulation or timing of the focus detection.

The communication unit may be able to communicate with an intermediate accessory (adapter 300) detachably attachable to the image pickup accessory. The communication unit includes a first communication circuit and a second communication circuit that is different from the first communication circuit. The first communication circuit may be a circuit for communication with the image pickup accessory, and the second communication circuit may be a circuit for communication with the intermediate accessory. The image pickup apparatus may include a determination unit (camera microcomputer 205) configured to determine whether the image pickup accessory or the intermediate accessory store the first information and the second information. The communication unit receives identification information on the intermediate accessory, transmits the identification information on the intermediate accessory to the image pickup accessory, and receives the first information and the second information from the image pickup accessory or the intermediate accessory based on the determination result by the determination unit. The communication unit may receive the fourth information corresponding to at least one of the zoom position, the focus position and the diaphragm position of the image pickup accessory. When the exposure control unit determines that the optical state changes based on the fourth information, the exposure control unit switches the reference of the first information. The communication unit may receive the fourth information indicating that the first information changes. When the exposure control unit determines that the optical state changes based on the fourth information, the exposure control unit acquires the first information again.

In each embodiment, the communication unit acquires fifth information on a relationship between the second information corresponding to the diaphragm position and the third information corresponding to the diaphragm position and the light transmittance of the image pickup accessory. The focus control unit is configured to control the driving of the focus lens based on the defocus amount calculated based on the fifth information. The communication unit may acquire the fifth information at a time the image pickup accessory is attached or periodically.

In each embodiment, the image pickup accessory (interchangeable lenses 100, 100a, 100b) is detachably attachable to the image pickup apparatus. The image pickup accessory includes a communication unit (communicator 103), a diaphragm 109, an optical member (optical element 107), a diaphragm control unit (diaphragm driving circuit 116), and a memory unit (memory 130). The communication unit is configured to communicate with the image pickup apparatus. The diaphragm control member is configured to control the diaphragm based on a diaphragm control request received from the image pickup apparatus via the communication unit. The memory unit is configured to store optical information (optical data). The memory unit is configured to store at least one of optical information such as the first information on the relationship between the diaphragm position and the variation in the light amount during the diaphragm control, second information corresponding to the diaphragm position, and the third information corresponding to the diaphragm position and the light transmittance of the image pickup accessory. The communication unit is configured to transmit the optical information to the image pickup apparatus.

Third information may be information corresponding to the F-number based on the pupil intensity distribution. The third information may be the information corresponding to the F-number based on the depth of field. The optical member may be a member in which a change in the diaphragm position by the diaphragm control is not equivalent to at least one of the variations in the light amount, in the pupil intensity distribution, and in the depth of field. The optical member may be an optical element in which transmittance varies from the center in a radial direction. The optical member may be detachably attachable to the image pickup accessory. The communication unit transmits a signal to the image pickup apparatus indicating detachment or attachment of the optical member. As the optical member, a plurality of optical members having different characteristics may be replaceable and attachable to the image pickup accessory. The memory unit stores the optical information of each of the plurality of replaceable optical members. The communication unit transmits the optical information on each of the plurality of optical members to the image pickup apparatus.

The communication unit may transmit the optical information in response to attachment of the image pickup accessory to the image pickup apparatus, or transmit the optical information at predetermined timing in response to a request from the image pickup apparatus. The memory unit may store, as the optical information, optical information on a combination of the image pickup accessory and each of a plurality of different types of intermediate accessories. The image pickup accessory may include a determination unit (lens microcomputer 101) configured to determine whether or not the optical information on the combination of the image pickup accessory and the intermediate accessory is stored on the memory unit. The communication unit transmits the determination result by the determination unit to the image pickup apparatus. When the optical information on the combination is stored on the memory unit, the communication unit transmits the optical information on the combination to the image pickup apparatus in response to a request from the image pickup apparatus.

In each embodiment, an intermediate accessory (adapter 300) is attachable between the image pickup apparatus and the image pickup accessory including a diaphragm and an optical member. The intermediate accessory includes a communication unit (communicator 303) configured to communicate with the image pickup apparatus and the image pickup accessory, and a memory unit (memory 304) configured to store optical information. The communication unit is configured to transmit information that identifies a type of the intermediate accessory to the image pickup apparatus, and receives information that identifies a type of image pickup accessory from the image pickup apparatus. As optical information, the memory unit stores at least one of the first information on the relationship between the diaphragm position and the variation in the light amount during the diaphragm control, the second information corresponding to the diaphragm position, and the third information corresponding to the diaphragm position and the light transmittance of the image pickup accessory. The communication unit transmits the optical information to the image pickup apparatus.

The third information may be information corresponding to the F-number based on the pupil intensity distribution. The third information may be the information corresponding to the F-number based on the depth of field. The intermediate accessory may include a determination unit (adapter microcomputer 302) configured to determine whether or not optical information on the combination of the image pickup accessory and the intermediate accessory is stored on the memory unit. The communication unit transmits the determination result by the determination unit to the image pickup apparatus. When the optical information on the combination is stored on the memory unit, the communication unit transmits the optical information on the combination to the image pickup apparatus in response to a request from the image pickup apparatus.

According to each embodiment, for example, in an image pickup accessory in which the transmittance varies from the center of the optical axis in the radial direction and in which a blurring effect is obtained, proper AE control can be realized by the image pickup apparatus managing the variation in the light amount caused by the diaphragm control. Since it is not necessary to perform communication for grasping the variation in the light amount at the time of diaphragm control, the consumption of the communication band can be suppressed. It is possible to acquire the variation in pupil intensity distribution on the lens pupil surface, which is necessary to calculate the defocus amount to realize AF control, and the variation information on the depth of field for in-focus determination and lens driving speed determination. Thereby, proper AE control and AF control can be executed for the image pickup accessory including the lens in which transmittance varies in the radial direction, even if the light amount variation caused by the diaphragm, variation in the pupil intensity distribution, and variation in the depth of field do not change uniformly in the optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above embodiment, it is possible to provide an image pickup apparatus, an image pickup accessory, and an intermediate accessory each of which can realize proper AE control and AF control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-216648, filed on Nov. 29, 2019 which is hereby incorporated by reference herein in its entirety.

What is claimed is:

1. An image pickup apparatus to which an image pickup accessory is detachably attachable, the image pickup accessory having a focus lens and a diaphragm, the image pickup apparatus comprising:

an image pickup unit configured to photoelectrically convert an optical image formed by an image pickup optical system of the image pickup accessory, and to output image data;

at least one processor; and at least one memory coupled to the at least one processor storing instructions that, when executed by the at least one processor, cause the at least one processor to function as a communication unit, an exposure control unit, and a focus control unit, wherein the communication unit communicates with the image pickup accessory, wherein the exposure control unit controls exposure, wherein the focus control unit controls driving of the focus lens based on a defocus amount, wherein the communication unit transmits a request for diaphragm control to the image pickup accessory, wherein the communication unit receives first information on a relationship between a diaphragm position and a variation in a light amount during the diaphragm control, second information corresponding to the diaphragm position, and third information corresponding to the diaphragm position and light transmittance of the image pickup accessory, wherein the exposure control unit controls the exposure based on the first information and the second information, and wherein the focus control unit controls the driving of the focus lens based on the defocus amount calculated based on the third information.

2. The image pickup apparatus according to claim 1, wherein the focus control unit controls the driving of the focus lens by causing the communication unit to transmit a focus control signal based on the defocus amount to the image pickup accessory.

3. The image pickup apparatus according to claim 1, wherein the first information includes information on a correspondence between an F-number and a T-number, and wherein the communication unit acquires the first information when the image pickup accessory is attached.

4. The image pickup apparatus according to claim 3, wherein the first information includes the information on the correspondence between the F-number and the T-number for each of a plurality of focus positions.

5. The image pickup apparatus according to claim 3, wherein the first information includes the information on the correspondence between the F-number and the T-number for each of a plurality of zoom positions.

6. The image pickup apparatus according to claim 1, wherein the communication unit acquires, as the first information, information corresponding to a current diaphragm position at timing of image pickup accumulation or in a cycle of image pickup accumulation.

7. The image pickup apparatus according to claim 1, wherein the communication unit acquires the second information and the third information each of which corresponds to a current diaphragm position in a predetermined cycle.

8. The image pickup apparatus according to claim 1, wherein the communication unit receives fourth information corresponding to at least one of a zoom position, a focus position, and the diaphragm position of the image pickup accessory, and wherein when, based on the fourth information, it is determined that an optical state changes, the exposure control unit switches a reference of the first information.

9. The image pickup apparatus according to claim 1,
wherein the communication unit receives fourth information corresponding to at least one of a zoom position, a focus position, and the diaphragm position of the image pickup accessory, and
wherein when, based on the fourth information, it is determined that an optical state changes, the exposure control unit acquires again at least one of the first information and the third information from the image pickup accessory.

10. The image pickup apparatus according to claim 1,
wherein the third information is information corresponding to an F-number based on pupil intensity distribution.

11. The image pickup apparatus according to claim 1,
wherein the third information is information corresponding to an F-number based on a depth of field.

12. The image pickup apparatus according to claim 7,
wherein the predetermined cycle corresponds to a cycle of image pickup accumulation.

13. The image pickup apparatus according to claim 7,
wherein the predetermined cycle corresponds to a cycle of focus detection.

14. The image pickup apparatus according to claim 1,
wherein the communication unit acquires the second information and the third information corresponding to a current diaphragm position at timing corresponding to image pickup accumulation or at timing of focus detection.

15. The image pickup apparatus according to claim 1,
wherein the communication unit is configured to communicate with an intermediate accessory which is attachable between the image pickup apparatus and the image pickup accessory.

16. The image pickup apparatus according to claim 15,
wherein the communication unit includes a first communication circuit and a second communication circuit that is different from the first communication circuit,
wherein the first communication circuit is a circuit for communication with the image pickup accessory, and
wherein the second communication circuit is a circuit for communication with the intermediate accessory.

17. The image pickup apparatus according to claim 15,
wherein the instructions further cause the at least one processor to function as a determination unit,
wherein the determination unit determines whether the image pickup accessory or on the intermediate accessory store the first information and the second information,
wherein the communication unit receives identification information on the intermediate accessory,
wherein the communication unit transmits the identification information on the intermediate accessory to the image pickup accessory, and
wherein the communication unit receives the first information and the second information from the image pickup accessory or the intermediate accessory, based on a determination result of the determination unit.

18. The image pickup apparatus according to claim 15,
wherein the communication unit receives fourth information corresponding to at least one of a zoom position, a focus position and the diaphragm position of the image pickup accessory, and
wherein when, based on the fourth information, it is determined that an optical state changes, the exposure control unit switches a reference of the first information.

19. The image pickup apparatus according to claim 15,
wherein the communication unit receives fourth information indicating that the first information changes, and
wherein when, based on the fourth information, it is determined that an optical state changes, the exposure control unit acquires the first information again.

20. An image pickup apparatus to which an image pickup accessory is detachably attachable, the image pickup accessory having a focus lens and a diaphragm, the image pickup apparatus comprising:
an image pickup unit configured to output image data by photoelectrically converting an optical image formed by an image pickup optical system of the image pickup accessory;
at least one processor; and
at least one memory coupled to the at least one processor storing instructions that, when executed by the at least one processor, cause the at least one processor to function as a communication unit and a focus control unit,
wherein the communication unit communicates with the image pickup accessory,
wherein the focus control unit controls driving of the focus lens based on a defocus amount,
wherein the communication unit acquires fifth information on a relationship between second information corresponding to a diaphragm position and third information corresponding to the diaphragm position and light transmittance of the image pickup accessory, and
wherein the focus control unit controls driving of the focus lens based on the defocus amount calculated based on the fifth information.

21. The image pickup apparatus according to claim 20,
wherein the communication unit acquires the fifth information at a time the image pickup accessory is attached or periodically.

22. An image pickup accessory detachably attachable to an image pickup apparatus, the image pickup accessory comprising:
a diaphragm and an optical member;
at least one processor; and
at least one memory coupled to the at least one processor storing instructions that, when executed by the at least one processor, cause the at least one processor to function as a communication unit and a diaphragm control unit, and the at least one memory storing optical information,
wherein the communication unit communicates with the image pickup apparatus,
wherein the diaphragm control unit controls the diaphragm based on a request for diaphragm control received from the image pickup apparatus via the communication unit,
wherein as the optical information, the at least one memory stores at least one of first information on a relationship between a diaphragm position and a variation in a light amount during the diaphragm control, and second information corresponding to the diaphragm position and light transmittance of the image pickup accessory,
wherein the communication unit transmits the optical information to the image pickup apparatus, and wherein the second information is (i) information corresponding to an F-number based on pupil intensity distribution and/or (ii) information corresponding to an F-number based on a depth of field.

23. The image pickup accessory according to claim 22, wherein the optical member is a member in which a variation in the diaphragm position caused by the diaphragm control is not equivalent to at least one of a variation in the light amount, a variation in pupil intensity distribution, and a variation in depth of field.

24. The image pickup accessory according to claim 22, wherein the optical member is an optical element in which transmittance varies from a center toward a radial direction.

25. The image pickup accessory according to claim 22, wherein the optical member is detachably attachable to the image pickup accessory, and
wherein the communication unit transmits a signal indicating detachment or attachment of the optical member to the image pickup apparatus.

26. The image pickup accessory according to claim 22, wherein, in the image pickup accessory, the optical member is replaceable with a plurality of optical members having different characteristics,
wherein the at least one memory stores the optical information on each of the plurality of optical members which are replaceable, and
wherein the communication unit transmits the optical information on each of the plurality of optical members to the image pickup apparatus.

27. The image pickup accessory according to claim 22, wherein the communication unit transmits the optical information at a time the image pickup accessory is attached to the image pickup apparatus, or transmits the optical information at predetermined timing in response to a request from the image pickup apparatus.

28. The image pickup accessory according to claim 22, wherein the at least one memory stores, as the optical information, optical information on a combination of the image pickup accessory and each of a plurality of intermediate accessories of different types.

29. The image pickup accessory according to claim 22, wherein as the optical information, the at least one memory further stores third information corresponding to the diaphragm position.

30. An image pickup accessory detachably attachable to an image pickup apparatus, the image pickup accessory comprising:
a diaphragm and an optical member;
at least one processor; and
at least one memory coupled to the at least one processor storing instructions that, when executed by the at least one processor, cause the at least one processor to function as a communication unit and a diaphragm control unit, and the at least one memory storing optical information,
wherein the communication unit communicates with the image pickup apparatus,
wherein the diaphragm control unit controls the diaphragm based on a request for diaphragm control received from the image pickup apparatus via the communication unit,
wherein as the optical information, the at least one memory stores at least one of first information on a relationship between a diaphragm position and a variation in a light amount during the diaphragm control, and second information corresponding to the diaphragm position and light transmittance of the image pickup accessory,
wherein the communication unit transmits the optical information to the image pickup apparatus,
wherein the at least one memory stores, as the optical information, optical information on a combination of the image pickup accessory and each of a plurality of intermediate accessories of different types,
wherein the instructions further cause the at least one processor to function as a determination unit,
wherein the determination unit determines whether or not the at least one memory stores the optical information on the combination of the image pickup accessory and each of the plurality of the intermediate accessories,
wherein the communication unit transmits a determination result by the determination unit to the image pickup apparatus, and
wherein when the at least one memory stores the optical information on the combination, the communication unit transmits the optical information on the combination to the image pickup apparatus in response to a request from the image pickup apparatus.

31. An intermediate accessory attachable between an image pickup apparatus and an image pickup accessory including a diaphragm and an optical member, the intermediate accessory comprising:
at least one processor; and
at least one memory coupled to the at least one processor storing instructions that, when executed by the at least one processor, cause the at least one processor to function as a communication unit, the at least one memory storing optical information,
wherein the communication unit configured to communicate with the image pickup apparatus and the image pickup accessory,
wherein the communication unit transmits information specifying a type of the intermediate accessory to the image pickup apparatus,
wherein the communication unit receives information specifying a type of the image pickup accessory from the image pickup apparatus,
wherein as the optical information, the at least one memory stores at least one of first information on a relationship between a diaphragm position and a variation in a light amount during diaphragm control, second information corresponding to the diaphragm position, and third information corresponding to the diaphragm position and light transmittance of the image pickup accessory, and
wherein the communication unit transmits the optical information to the image pickup apparatus.

32. The intermediate accessory according to claim 31, wherein the third information is information corresponding to an F-number based on pupil intensity distribution.

33. The intermediate accessory according to claim 31, wherein the third information is information corresponding to an F-number based on a depth of field.

34. The intermediate accessory according to claim 31, wherein the instructions further cause the at least one processor to function as a determination unit,
wherein the determination unit determines whether or not the at least one memory stores the optical information on a combination of the image pickup accessory and each of a plurality of intermediate accessories, wherein the communication unit transmits a determination result by the determination unit to the image pickup apparatus, and wherein when the at least one memory stores the optical information on the combination, the communication unit transmits the optical information on the combination to the image pickup apparatus in response to a request from the image pickup apparatus.

35. A control method of an image pickup apparatus to which an image pickup accessory is detachably attachable, the image pickup accessory having a focus lens and a diaphragm, the image pickup apparatus including an image pickup unit configured to photoelectrically convert an optical image formed by an image pickup optical system of the image pickup accessory and to output image data, the control method comprising:

transmitting a request for diaphragm control to the image pickup accessory;

receiving first information on a relationship between a diaphragm position and a variation in a light amount during the diaphragm control, second information corresponding to the diaphragm position, and third information corresponding to the diaphragm position and light transmittance of the image pickup accessory; and controlling exposure based on the first information and the second information and controlling driving of the focus lens based on a defocus amount calculated based on the third information.

36. A control method of an image pickup apparatus to which an image pickup accessory is detachably attachable, the image pickup accessory having a focus lens and a diaphragm, the image pickup apparatus including an image pickup unit configured to output image data by photoelectrically converting an optical image formed by an image pickup optical system of the image pickup accessory, the control method comprising:

acquiring fifth information on a relationship between second information corresponding to a diaphragm position and third information corresponding to the diaphragm position and light transmittance of the image pickup accessory; and controlling driving of the focus lens based on a defocus amount based on the fifth information.

37. A control method of an image pickup accessory detachably attachable to an image pickup apparatus, the image pickup accessory including a diaphragm, an optical member, and at least one memory storing, as optical information, at least one of first information on a relationship between a diaphragm position and a variation in a light amount during the diaphragm control, and second information corresponding to the diaphragm position and light transmittance of the image pickup accessory, the control method comprising:

transmitting the optical information to the image pickup apparatus;

receiving a request for diaphragm control from the image pickup apparatus; and controlling the diaphragm based on the request for the diaphragm control, wherein the second information is (i) information corresponding to an F-number based on pupil intensity distribution and/or (ii) information corresponding to an F-number based on depth of field.

38. A control method of an image pickup accessory detachably attachable to an image pickup apparatus, the image pickup accessory including a diaphragm, an optical member, and at least one memory storing, as optical information, (i) at least one of first information on a relationship between a diaphragm position and a variation in a light amount during the diaphragm control, and second information corresponding to the diaphragm position and light transmittance of the image pickup accessory and (ii) optical information on a combination of the image pickup accessory and each of a plurality of intermediate accessories of different types, the control method comprising:

transmitting the optical information to the image pickup apparatus;

receiving a request for diaphragm control from the image pickup apparatus; and controlling the diaphragm based on the request for the diaphragm control, wherein the control method further includes:
determining whether or not the at least one memory stores the optical information on the combination of the image pickup accessory and each of the plurality of the intermediate accessories; and transmitting a result of the determining to the image pickup apparatus, and wherein when the at least one memory stores the optical information on the combination, the optical information on the combination to the image pickup apparatus is transmitted in response to a request from the image pickup apparatus.

39. A control method of an intermediate accessory attachable between an image pickup apparatus and an image pickup accessory including a diaphragm and an optical member, the intermediate accessory including at least one memory storing, as optical information, at least one of first information on a relationship between a diaphragm position and a variation in a light amount during diaphragm control, second information corresponding to the diaphragm position, and third information corresponding to the diaphragm position and light transmittance of the image pickup accessory, the control method comprising:

transmitting information specifying a type of the intermediate accessory to the image pickup apparatus, receiving information specifying a type of the image pickup accessory from the image pickup apparatus;

transmitting the optical information to the image pickup apparatus.

* * * * *